(12) United States Patent
Chen et al.

(10) Patent No.: US 12,387,331 B2
(45) Date of Patent: Aug. 12, 2025

(54) IMAGE PROCESSING SYSTEMS AND METHODS FOR MAPPING ERRORS OR ARTIFACTS

(71) Applicant: PEKING UNIVERSITY, Beijing (CN)

(72) Inventors: Liangyi Chen, Beijing (CN); Haoyu Li, Beijing (CN); Weisong Zhao, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 18/613,077

(22) Filed: Mar. 21, 2024

(65) Prior Publication Data

US 2024/0281933 A1    Aug. 22, 2024

Related U.S. Application Data

(63) Continuation of application No. PCT/CN2021/122442, filed on Sep. 30, 2021.

(51) Int. Cl.
*G06T 5/50* (2006.01)
*G06T 3/40* (2006.01)
*G06T 5/20* (2006.01)
*G06T 7/11* (2017.01)

(52) U.S. Cl.
CPC .............. *G06T 5/50* (2013.01); *G06T 3/40* (2013.01); *G06T 5/20* (2013.01); *G06T 7/11* (2017.01); *G06T 2207/20084* (2013.01); *G06T 2207/20221* (2013.01)

(58) Field of Classification Search
None
See application file for complete search history.

(56) References Cited

U.S. PATENT DOCUMENTS 10,013,764 B2 *  7/2018  Atanassov ........... H04N 23/957
2015/0093015 A1   4/2015  Liang et al.
(Continued)

FOREIGN PATENT DOCUMENTS

CN    104025567 A    9/2014
CN    107527321 A    12/2017
(Continued)

OTHER PUBLICATIONS

Herbert, Alex. "Single molecule light microscopy ImageJ plugins.", posted Apr. 2016, http://www.sussex.ac.uk/gdsc/intranet/pdfs/SMLM.pdf (Year: 2016).*

(Continued)

*Primary Examiner* — Sarah Le
(74) *Attorney, Agent, or Firm* — METIS IP LLC

(57) ABSTRACT

Systems and methods for image processing are provided in the present disclosure. The systems may obtain a first image and a second image associated with a same object; determine a plurality of first blocks of the first image and a plurality of second blocks of the second image, the plurality of second blocks and the plurality of first blocks being in one-to-one correspondence; determine a plurality of first characteristic values based on the plurality of first blocks and the plurality of second blocks; and/or generate a first target map associated with the first image and the second image based on the plurality of first characteristic values.

19 Claims, 42 Drawing Sheets

(56) References Cited

U.S. PATENT DOCUMENTS

| | | | | |
|---|---|---|---|---|
| 2015/0103181 | A1* | 4/2015 | Mou | H04N 25/671 348/241 |
| 2017/0111622 | A1* | 4/2017 | Guo | H04N 9/3188 |
| 2020/0305806 | A1 | 10/2020 | Tang et al. | |
| 2021/0390747 | A1* | 12/2021 | Feng | G06T 11/60 |
| 2022/0292632 | A1* | 9/2022 | Zhang | G06T 5/50 |

FOREIGN PATENT DOCUMENTS

| | | | |
|---|---|---|---|
| CN | 109064521 | * | 12/2018 |
| CN | 109064521 | A | 12/2018 |
| CN | 109410177 | A | 3/2019 |
| CN | 111476737 | A | 7/2020 |
| WO | 2020252764 | A1 | 12/2020 |

OTHER PUBLICATIONS

Culley, Siân, et al. "Quantitative mapping and minimization of super-resolution optical imaging artifacts." Nature methods 15.4 (2018): 263-266 (including Supplementary Text and Figures) (Year: 2018).*

Nieuwenhuizen, Robert PJ, et al. "Measuring image resolution in optical nanoscopy." Nature methods 10.6 (2013): 557-562. (Year: 2013).*

Lothar Schermelleh et al., Super-Resolution Microscopy Demystified, Nature Cell Biology, 21: 72-84, 2019.

Zeng, Zhi-Ping et al., Computational Methods in Super-Resolution Microscopy, Engineering, 18(9): 1222-1235, 2017.

Eric Betzig et al., Imaging Intracellular Fluorescent Proteins at Nanometer Resolution, Science, 313: 1642-1645, 2006.

Michael J Rust et al., Sub-Diffraction-Limit Imaging by Stochastic Optical Reconstruction Microscopy (STORM), Nature Methods, 3(10): 793-795, 2006.

T. Dertinger et al., Fast, Background-free, 3D Super-Resolution Optical Fluctuation Imaging (SOFI), PNAS, 106 (52): 22287-22292, 2009.

Nils Gustafsson et al., Fast Live-Cell Conventional Fluorophore Nanoscopy with ImageJ Through Super-Resolution Radial Fluctuations, Nature Communications, 1-9, 2016.

Li, Dong et al., Extended-Resolution Structured Illumination Imaging of Endocytic and Cytoskeletal Dynamics, Science, 349(6251): 944& aab3500-1-aab3500-10, 2015.

Huang, Xiaoshuai et al., Fast, Long-term, Super-Resolution Imaging with Hessian Structured Illumination Microscopy, Nature biotechnology, 1-9, 2018.

Andrew G. York et al., Resolution Doubling in Live, Multicellular Organisms via Multifocal Structured Illumination Microscopy, 2012, 16 pages.

Mats G. L. Gustafsson et al., Three-Dimensional Resolution Doubling in Wide-Field Fluorescence Microscopy by Structured Illumination, Biophysical Journal, 94: 4957-4970, 2008.

L.B. Lucy, An iterative technique for the Rectification of Observed Distributions, The Astronomical Journal, 79(6): 745-749, 1974.

Timo Aspelmeier et al., Modern Statistical Challenges in High-Resolution Fluorescence Microscopy, Annual Review of Statistics and Its Application, 2: 163-202, 2015.

William Hadley Richardson, Bayesian-Based Iterative Method of Image Restoration, Journal of The Optical Society of America A, 62(1): 55-59, 1972.

Nour Hafi et al., Fluorescence Nanoscopy by Polarization Modulation and Polarization Angle Narrowing, Nature Methods, 1-6, 2014.

Gordon Wetzstein et al., Inference in Artificial Intelligence with Deep Optics and Photonics, Nature Biotechnology, 588: 39-47, 2020.

Chinmay Belthangady et al., Applications, Promises, and Pitfalls of Deep Learning for Fluorescence Image Reconstruction, Nature Methods, 2019, 11 pages.

Wei, Ouyang et al., Deep Learning Massively Accelerates Super-Resolution Localization Microscopy, Nature biotechnology, 1-9, 2018.

Mehdi Mirza et al., Conditional Generative Adversarial Nets, arxiv.org, 1-7, 2014.

Wang, Hongda et al., Deep Learning Enables Cross-Modality Super-Resolution in Fluorescence Microscopy, Nature Methods, 2018, 11 pages.

Martin Weigert et al., Content-Aware Image Restoration: Pushing the Limits of Fluorescence Microscopy, Nature Methods, 2018, 10 pages.

Graham T Dempsey et al., Evaluation of Fluorophores for Optimal Performance in Localization-Based Super-Resolution Imaging, Nature Methods, 8(12): 1027-1036, 2011.

Robin Diekmann et al., Optimizing Imaging Speed and Excitation Intensity for Single-Molecule Localization Microscopy, Nature Methods, 2020, 19 pages.

Sebastian Van De Linde et al., Direct Stochastic Optical Reconstruction Microscopy with Standard Fluorescent Probes, Nature Protocols, 6(7): 991-1009, 2011.

Pedro Almada et al., PALM and STORM: Into Large Fields and High-Throughput Microscopy with sCMOS Detectors, Methods, 1-13, 2015.

M. Erdélyi et al., Origin and Compensation of Imaging Artefacts in Localization-Based Super-Resolution Microscopy, Methods, 1-11, 2015.

L. H. Schaefer et al., Structured Illumination Microscopy: Artefact Analysis and Reduction Utilizing a Parameter Optimization Approach, Journal of Microscopy, 216: 165-174, 2004.

Justin Demmerle et al., Strategic and Practical Guidelines for Successful Structured Illumination Microscopy, Nature Protocols, 12(5): 988-1010, 2017.

Daniel Sage et al., Quantitative Evaluation of Software Packages for Single-Molecule Localization Microscopy, Nature Methods, 1-8, 2015.

Alex Kendall et al., What Uncertainties Do We Need in Bayesian Deep Learning for Computer Vision?, Advances in Neural Information Processing Systems, 1-12, 2017.

Jervis Vermal Thevathasan et al., Nuclear Pores as Versatile Reference Standards for Quantitative Superresolution Microscopy, Nature Methods,16: 1045-1053, 2019.

Michael Scheckenbach et al., DNA Origami Nanorulers and Emerging Reference Structures, APL Materials, 110902-1-110902-12, 2020.

Hesam Mazidi et al., Quantifying Accuracy and Heterogeneity in Single-Molecule Super-Resolution Microscopy; Nature Communications, 1-11, 2020.

Graeme Ball et al., SIMcheck: a Toolbox for Successful Super-Resolution Structured Illumination Microscopy, Scientific Reports, 1-11, 2015.

Xue, Yujia et al., Reliable Deep-Learning-Based Phase Imaging with Uncertainty Quantification, Optica, 2019, 28 pages.

Sián Culley et al., Quantitative Mapping and Minimization of Super-Resolution Optical Imaging Artifacts, Nature Methods, 2018, 5 pages.

Robert P J Nieuwenhuizen et al., Measuring Image Resolution in Optical Nanoscopy, Nature Methods, 2013, 11 pages.

Huang, Bo et al., Three-Dimensional Super-Resolution Imaging by Stochastic Optical Reconstruction Microscopy, Science, 319: 810-813, 2008.

Jaakko Lehtinen et al., Noise2Noise: Learning Image Restoration without Clean Data, arXiv, 2018, 12 pages.

Caroline A Schneider et al., NIH Image to ImageJ: 25 years of image analysis, Nature Methods, 9(7): 671-675, 2012.

Johannes Schindelin et al., Fiji: an Open-Source Platform for Biological-Image Analysis, Nature Methods, 9(7): 676-682, 2012.

Rainer Heintzmann et al., The Sampling Limit in Fluorescence Microscopy, Micron, 38: 145-149, 2007.

Adolf W. Lohmann et al., Space Bandwidth Product of Optical Signals and Systems, Journal of The Optical Society of America A, 13(3): 470-473, 1996.

(56) References Cited

OTHER PUBLICATIONS

Alessandro Foi et al., Practical Poissonian-Gaussian Noise Modeling and Fitting for Single-Image Raw-Data, IEEE Transactions on Image Processing, 17(10): 1737-1754, 2008.
Mark Stanford Robbins et al., The Noise Performance of Electron Multiplying Charge-Coupled Devices, IEEE Transactions on Electron Devices, 50(5): 1227-1232, 2003.
Michael Hirsch et al., A Stochastic Model for Electron Multiplication Charge-Coupled Devices-From Theory to Practice, PLoS One, 8(1): 1-13, 2013.
Ctibor Skuta et al., sCMOS Noise-Correction Algorithm for Microscopy Images, Nature Methods, 14(8): 760-761, 2017.
Marin Van Heel et al., Fourier Shell Correlation Threshold Criteria, Journal of structural biology, 151: 250-262, 2005.
Fabio Crameri et al., The Misuse of Colour in Science Communication, Nature Communications, 1-10, 2020.
Nobuyuki Otsu, A Threshold Selection Method From Gray-Level Histograms, IEEE transactions on systems, 9(1): 62-66, 1979.
Martin Ovesny et al., ThunderSTORM: a Comprehensive ImageJ Plug-in for PALM and STORM Data Analysis and Super-Resolution Imaging, Bioinformatics, 30(16): 2389-2390, 2014.
International Search Report in PCT/CN2021/122442 mailed on Jun. 23, 2022, 4 pages.
Written Opinion in PCT/CN2021/122442 mailed on Jun. 23, 2022, 4 pages.
Amit Lal et al., A Frequency Domain SIM Reconstruction Algorithm Using Reduced No. of Images, IEEE Transactions on Image Processing, 2018, 16 pages.
Huang, Xiaoshuai et al., Ultra-Sensitive Super Resolution Imaging with Hessian Structured Illumination Microscopy in Live Cells, Bulletin of National Natural Science Foundation of China, 32(4): 367-375, 2018.
Max Born et al., Principles of Optics, 7th (expanded) edition, 1999, 988 pages.
Robert Grover Brown et al., Introduction to Random Signals and Applied Kalman Filtering, Preface to the Third Edition, 1997, 248 pages.
Seyed-Mohsen Moosavi-Dezfooli et al., DeepFool: a simple and accurate method to fool deep neural networks, IEEE Conference on Computer Vision and Pattern Recognition, 2574-2582, 2016.
Jose-Luis Vilas et al., New Measures of Anisotropy of Cryo-EM Maps, Nature Methods, 20: 1021-1024, 2023.
Min, Junhong et al., FALCON: Fast and Unbiased Reconstruction of High-Density Super-Resolution Microscopy Data, Scientific Reports, 4: 1-9, 2014.
Claudia Errico et al., Ultrafast Ultrasound Localization Microscopy for Deep Super Resolution Vascular Imaging, Nature, 2015, 9 pages.
George R. Health et al., Localization Atomic Force Microscopy, Nature, 2021, 20 pages.
Zhao, Kun et al., Two-Photon MINFLUX with Doubled Localization Precision, eLight, 1-10, 2022.
Zhao, Weisong et al., Enhanced Detection of Fluorescence Fluctuations for High Throughput Super-Resolution Imaging, Nature Photonics, 2023, 27 pages.
Yang, Tianjie et al., Advancing Biological Super-Resolution Microscopy Through Deep Learning: a brief review, Biophysics Reports, 7(4): 253-266, 2021.
Loic A Royer et al., ClearVolume: Open-Source Live 3D Visualization for Light-Sheet Microscopy, Nature Methods, 12(6): 480-481, 2015.
Daniel Sage et al., Super-Resolution Fight Club: Assessment of 2D & 3D Single-Molecule Localization Microscopy Software, Nature Methods, 2019, 12 Pages.
Zheng, Guoan et al., Wide-Field, High-Resolution Fourier Ptychographic Microscopy, Nature Photonics, 1-7, 2013.
Leonhard Möckl et al., Deep Learning in Single-Molecule Microscopy: Fundamentals, Caveats, and Recent Developments [Invited], Biomedical optics express, 11(3): 1633-1661, 2020.
Fang, Linjing et al., Deep Learning-Based Point-Scanning Super-Resolution Imaging, Nature Methods, 2021, 27 pages.
Zhang, Yide et al., A Poisson-Gaussian Denoising Dataset with Real Fluorescence Microscopy Images, IEEE Conference on Computer Vision and Pattern Recognition, 2019, 14 pages.
Philipp Zelger et al., Three-Dimensional Single Molecule Localization Close to the Coverslip: A Comparison of Methods Exploiting Supercritical Angle Fluorescence. Biomedical Optics Express, 12(2): 802-822, 2021.
You, Sungyong et al., Microscope Calibration Protocol for Single-Molecule Microscopy, Optics express, 29 (1): 182-207, 2021.
Wiktor Beker et al., Minimal-Uncertainty Prediction of General Drug-Likeness Based on Bayesian Neural Networks, Nature Machine Intelligence, 2020, 16 pages.
Balaji Lakshminarayanan et al., Simple and Scalable Predictive Uncertainty Estimation Using Deep Ensembles, arXiv, 1-15, 2017.
Xu, Ke et al., Dual-objective STORM Reveals Three-Dimensional Filament Organization in the Actin Cytoskeleton, Nature Methods, 2012, 9 pages.
G. Vicidomini et al., Sharper Low-Power STED Nanoscopy by Time Gating, Nature Methods, 2011, 14 pages.
Corinna Blasse et al., PreMosa: Extracting 2D Surfaces from 3D Microscopy Mosaics, Bioinformatics, 1-7, 2017.
C. M. Galloway et al., An Iterative Algorithm for Background Removal in Spectroscopy by Wavelet Transforms, Applied Spectroscopy, 63(12): 1370-1376, 2009.
Olaf Ronneberger et al., U-net: Convolutional Networks for Biomedical Image Segmentation, International Conference on Medical Image Computing and Computer-Assisted Intervention, 234-241, 2015.
Sergey Ioffe et al., Batch normalization: Accelerating Deep Network Training by Reducing Internal Covariate Shift, International Conference on Machine Learning, 2015, 9 pages.
Diederik P. Kingma et al., Adam: A Method for Stochastic Optimization, arXiv, 1-13, 2015.
Abadi, M. et al., Tensorflow: A System for Large-Scale Machine Learning, 12th USENIX Symposium On Operating Systems Design And Implementation (OSDI), 1-18, 2016.
Wang, Zhou et al., Image Quality Assessment: From Error Visibility to Structural Similarity, IEEE Transactions on Image Processing, 13(4): 600-612, 2004.
Alexis Rohou, Fourier Shell Correlation Criteria for Local Resolution Estimation, arXiv, 1-10, 2020.
Giorgio Tortarolo et al., Evaluating Image Resolution in Stimulated Emission Depletion Microscopy, Optica, 5(1): 32-35, 2018.
Manuel Guizar-Sicairos et al., Efficient Subpixel Image Registration Algorithms, Optics Letters, 33(2): 156-158, 2008.
Poli, R. et al., Particle swarm optimization, Swarm Intelligence, 1-10, 2007.
Robert Michael Lewis et al., Direct Search Methods: then and now, Journal of computational Applied Mathematics, 124: 191-207, 2000.
Sami Koho et al., Fourier Ring Correlation Simplifies Image Restoration in Fluorescence Microscopy, Nature communications, 10: 1-9, 2019.
Cameron Buckner, Understanding Adversarial Examples Requires a Theory of Artefacts for Deep Learning, Nature Machine Intelligence, 2020, 6 pages.
Bradley Efron, Biased Versus Unbiased Estimation, Advances in Mathematics, 16: 259-277, 1975.
Xu, Fan et al., Three-Dimensional Nanoscopy of Whole Cells and Tissues with in Situ Point Spread Function Retrieval, Nature methods, 2020, 33 pages.
William Hadley Richardson et al., Bayesian-Based Iterative Method of Image Restoration, Journal of The Optical Society of America A, 62(1): 55-59, 1972.
Stefan W. Hell et al., Breaking the Diffraction Resolution Limit by Stimulated Emission: Stimulated-Emission- Depletion Fluorescence Microscopy, Optics Letters, 19(11): 780-782, 1994.
Zoubin Ghahramani, Probabilistic Machine Learning and Artificial Intelligence, Nature, 521: 452-459, 2015.
Ethan Goan, Bayesian Neural Networks: An Introduction and Survey, arXiv, 1-44. 2020.

(56) References Cited

OTHER PUBLICATIONS

John S. Denker et al., Transforming Neural-Net Output Levels to Probability Distributions, Proceedings of the 3rd International Conference on Neural Information Processing Systems, 853-859, 1990.
Li, Chunyuan et al., Preconditioned Stochastic Gradient Langevin Dynamics for Deep Neural Networks, arXiv, 2016, 7 pages.
Geoffrey E. Hinton et al., Keeping Neural Networks Simple by Minimizing the Description Length of the Weights, Proceedings of the sixth annual conference on Computational learning theory, 5-13, 1993.
Yarin Gal et al., Dropout as a Bayesian Approximation: Representing Model Uncertainty in Deep Learning, arXiv, 1-10, 2016.
Gao, Peng et al., Resolution Enhancement of Digital Holographic Microscopy via Synthetic Aperture: a review, Light: Advanced Manufacturing, 3(1): 105-120, 2022.
Liu, Yuanhua et al., Contrast-Enhanced Fluorescence Microscope by LED Integrated Excitation Cubes, Light: Advanced Manufacturing, 1-10, 2023.
Dominic A. Helmerich et al., Photoblueing of Organic Dyes can Cause Artifacts in Super-Resolution Microscopy, Nature Methods, 2021, 8 pages.
Mo, Yanquan et al., Structured Illumination Microscopy Artefacts Caused by Illumination Scattering, Philos. Trans. R. Soc. A: Math., Phys. Eng. Sci., 1-18, 2021.
Zhao, Weisong et al., Sparse Deconvolution Improves the Resolution of Live Cell Super-Resolution Fluorescence Microscopy, Nature Biotechnology, 2022, 27 pages.
Luo, Yi et al., Computational Imaging without a Computer: Seeing Through Random Diffusers at the Speed of Light, eLight, 1-35, 2022.
Richard J. Marsh et al., Sub-Diffraction Error Mapping for Localisation Microscopy Images, Nature Communications, 12: 1-13, 2021.
Francisco Balzarotti et al., Nanometer Resolution Imaging and Tracking of Fluorescent Molecules with Minimal Photon Fluxes, Science, 1-12, 2016.
William T. Baxter et al., Determination of Signal-to-Noise Ratios and Spectral SNRs in cryo-EM Low-Dose Imaging of Molecules, Journal of Structural Biology, 166: 126-132, 2009.
Zhai, Guangtao et al., Perceptual Image Quality Assessment: A Survey, Science China, 63: 211301:1-211301:52, 2020.
Orestis Faklaris et al., Quality Assessment in Light Microscopy for Routine Use Through Simple tools and Robust Metrics, Journal of Cell Biology, 2022, 46 pages.
Daniel Sage et al., Super-Resolution Fight Club: Assessment of 2D and 3D Single Molecule Localization Microscopy Software, Nature Methods, 2019, 12 pages.
Christopher J. Obara et al., Structural Diversity within the Endoplasmic Reticulum-From the Microscale to the Nanoscale, Cold Spring Harbor Laboratory Press, 2023, 21 pages.
Notice of Reasons for Refusal in Japanese Application No. 2024-519717 mailed on Sep. 17, 2024, 7 pages.
The Extended European Search Report in European Application No. 21958989.2 mailed on Oct. 4, 2024, 10 pages.
Sian Culley et al., Quantitative Mapping and Minimization of Super-Resolution Optical Imaging Artifacts, Nature Methods, 2018, 10 pages.
Lu, Yongchun et al., Spark-based parallel calculation of 3D fourier shell correlation for macromolecule structure local resolution estimation, BMC Bioinformatics, 21(13): 1-18, 2020.
Giovanni Cardone et al., One number does not fit all: Mapping local variations in resolution in cryo-EM reconstructions, Journal of Structural Biology, 184: 226-236, 2013.
Zhao, Weisong et al., Extending resolution of structured illumination microscopy with sparse deconvolution, Research Square, 2021, 68 pages.

\* cited by examiner

620

- Determining a first relationship between a plurality of correlation values and a plurality of frequencies based on the first intermediate image and the second intermediate image ⌇ 621
- Determining a second relationship between the plurality of correlation values and the plurality of frequencies based on a predetermined function ⌇ 622
- Determining the target frequency based on the first relationship and the second relationship ⌇ 623

- Determining, from the first intermediate image, a first ring image based on a frequency of the plurality of frequencies ⌇ 631
- Determining, from the second intermediate image, a second ring image based on the frequency ⌇ 632
- Determining a correlation value corresponding to the frequency based on the first ring image and the second ring image ⌇ 633

FIG. 6D

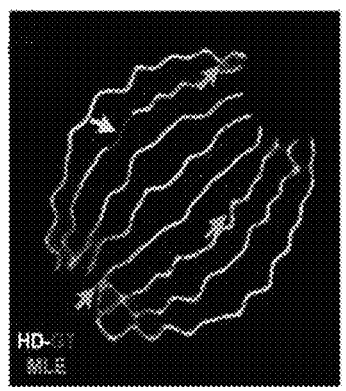 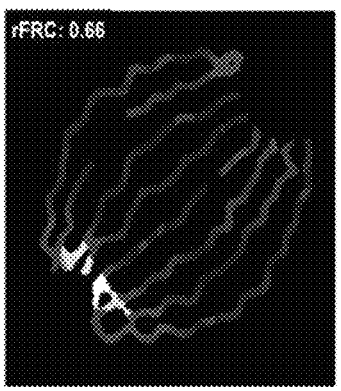 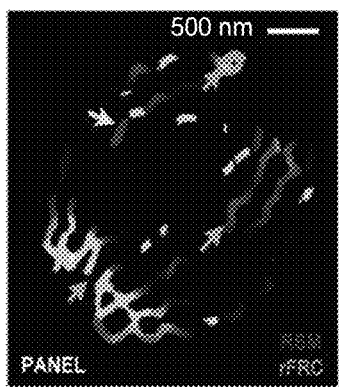
FIG. 17A    FIG. 17B    FIG. 17C
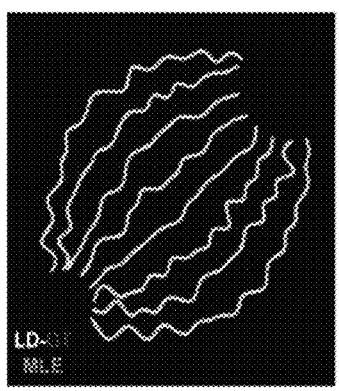 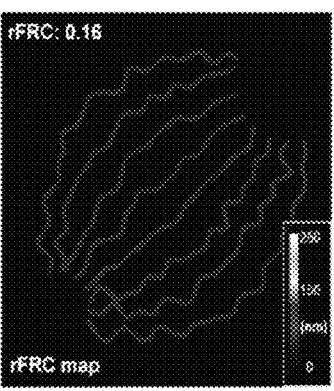 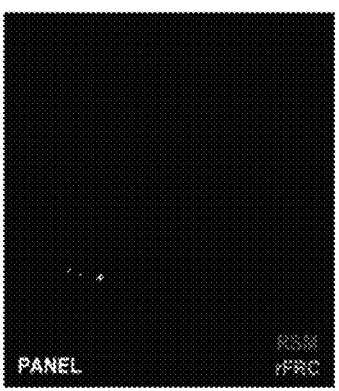
FIG. 17D    FIG. 17E    FIG. 17F
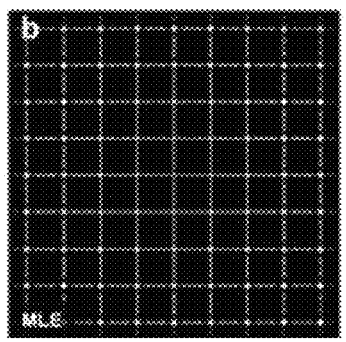 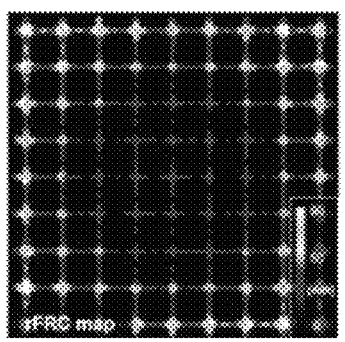
FIG. 17G    FIG. 17H
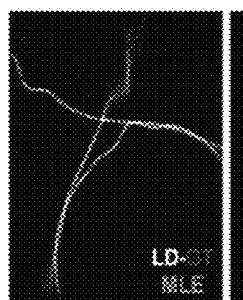 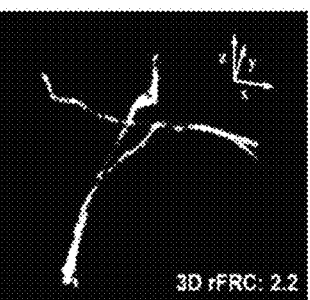 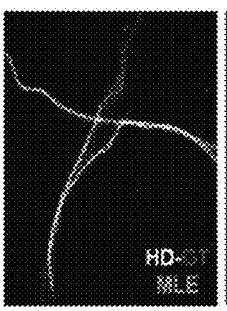 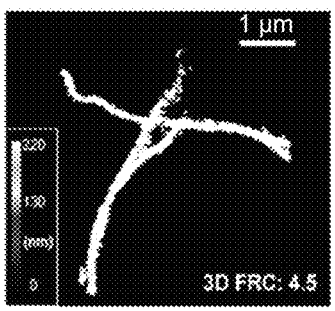
FIG. 17I    FIG. 17J    FIG. 17K    FIG. 17L

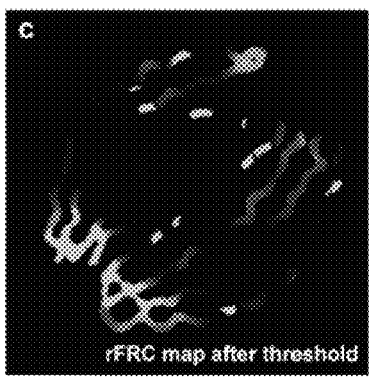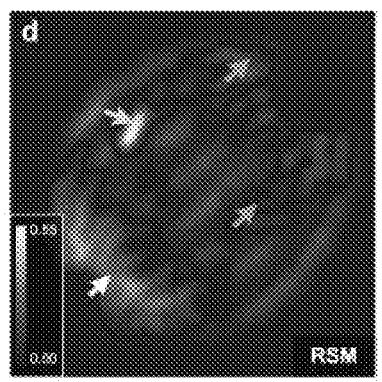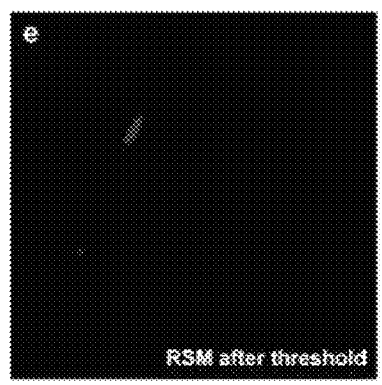
FIG. 17R          FIG. 17S          FIG. 17T
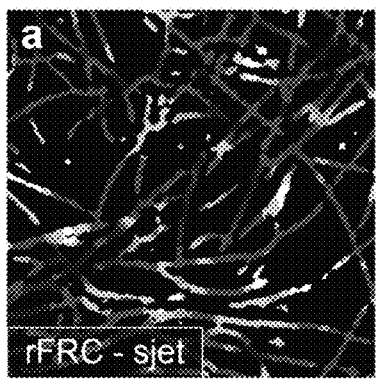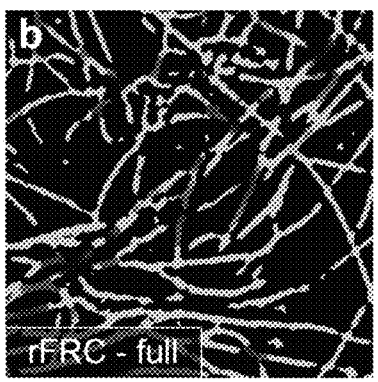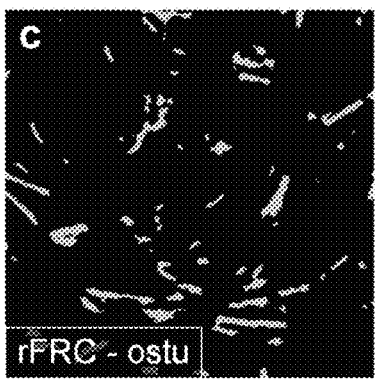
FIG. 17U          FIG. 17V          FIG. 17W
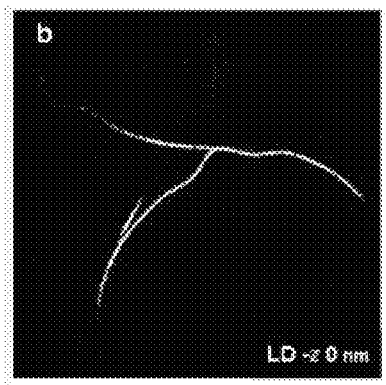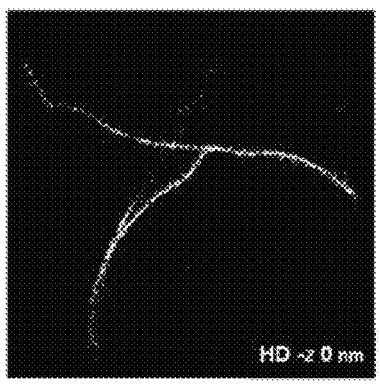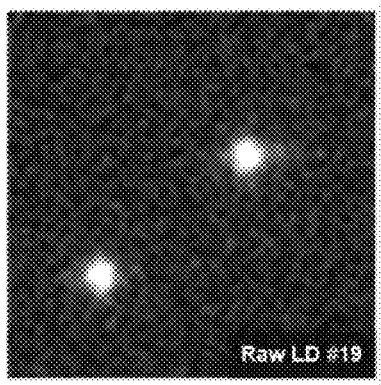
FIG. 17X
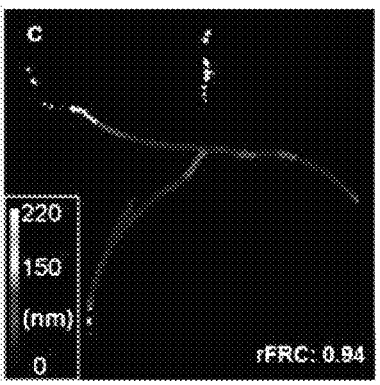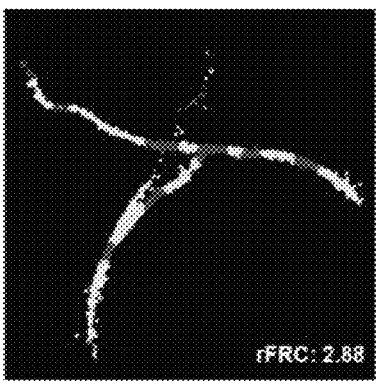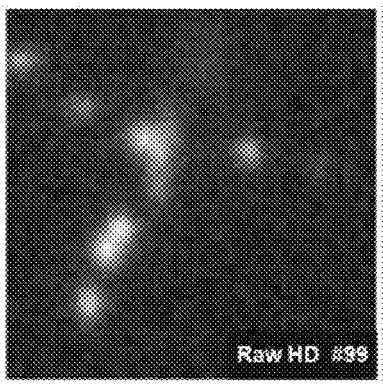
FIG. 17Y

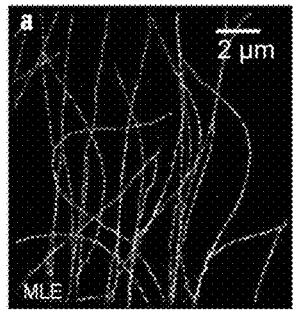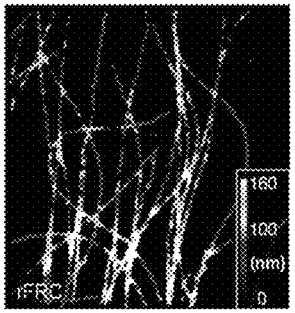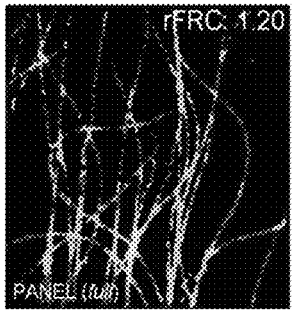
FIG. 18A  FIG. 18B  FIG. 18C  FIG. 18D
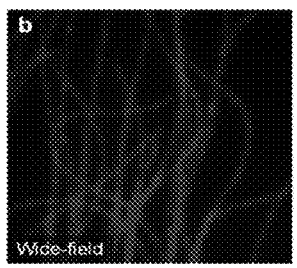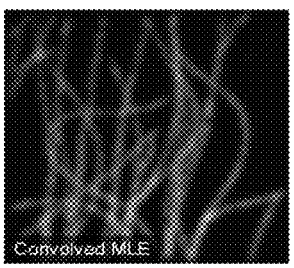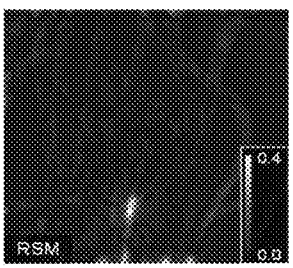
FIG. 18E  FIG. 18F  FIG. 18G  FIG. 18H
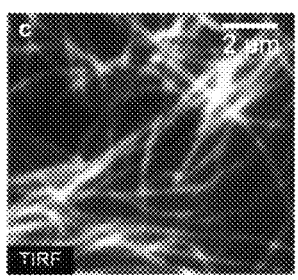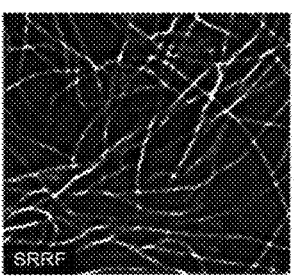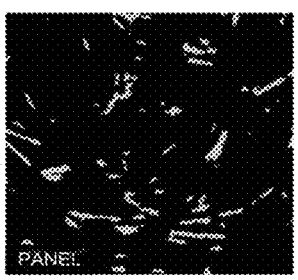
FIG. 18I  FIG. 18J  FIG. 18K  FIG. 18L

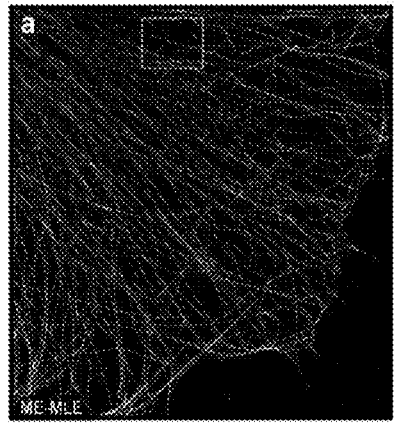 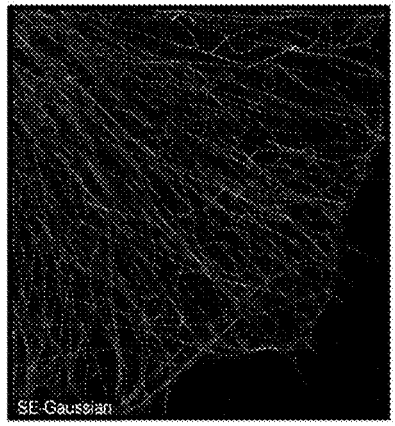 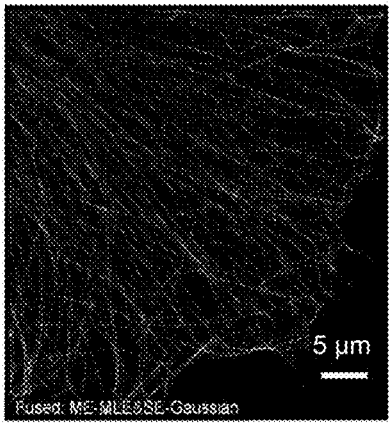
FIG. 19A      FIG. 19B      FIG. 19C
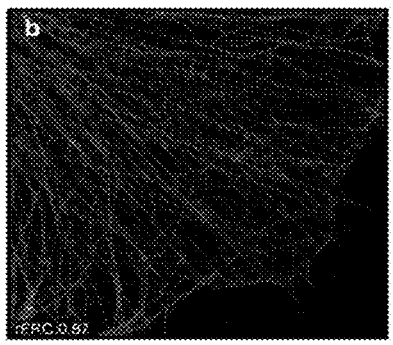 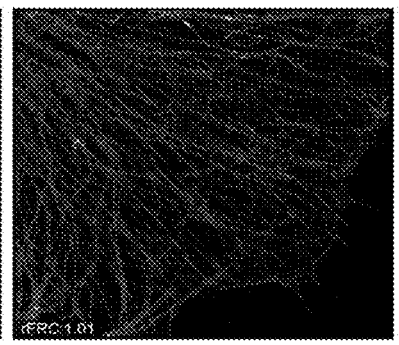 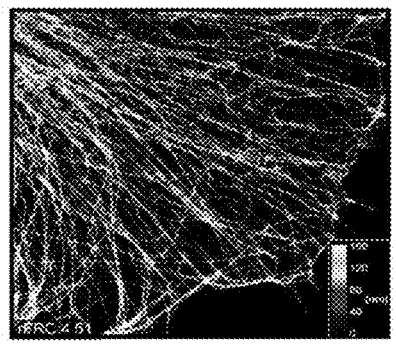
FIG. 19D
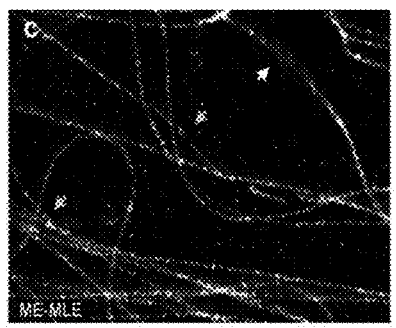 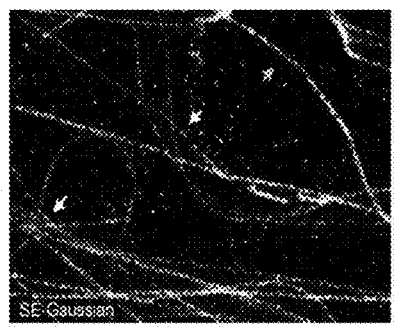 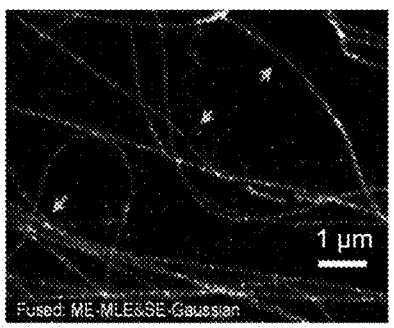
FIG. 19E

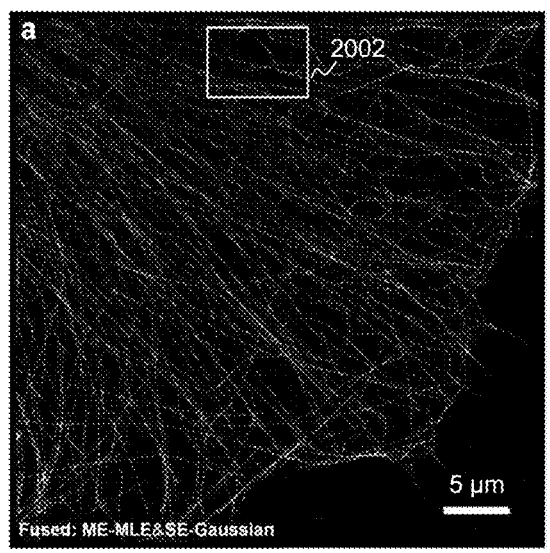
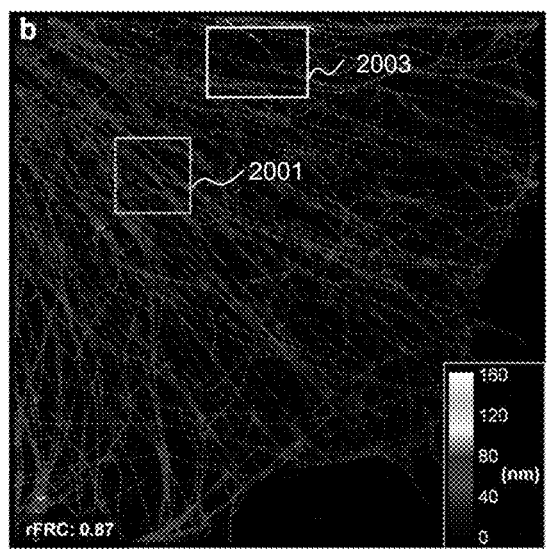
FIG. 20A  FIG. 20B
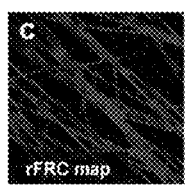  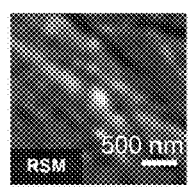  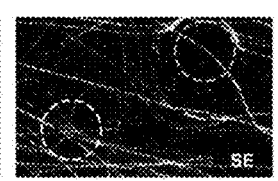
FIG. 20C  FIG. 20D  FIG. 20E  FIG. 20F  FIG. 20G
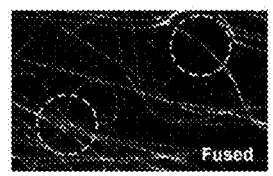 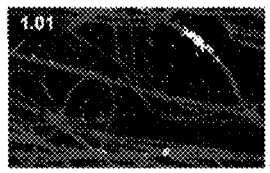 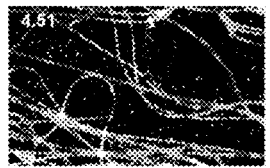 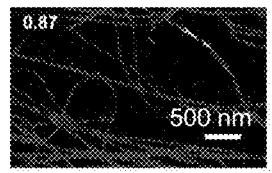
FIG. 20H  FIG. 20I  FIG. 20J  FIG. 20K
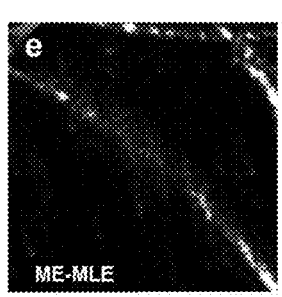  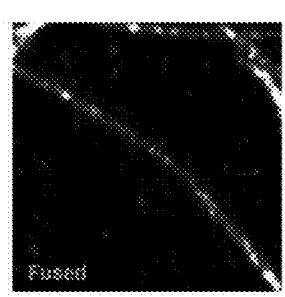
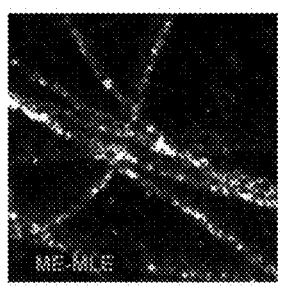  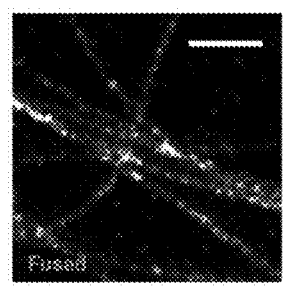
FIG. 20L

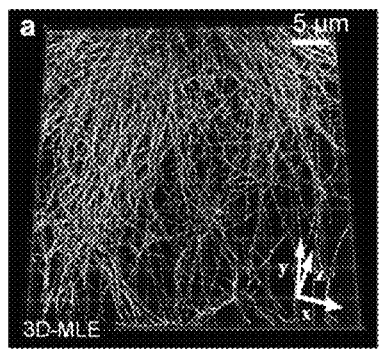
FIG. 21A
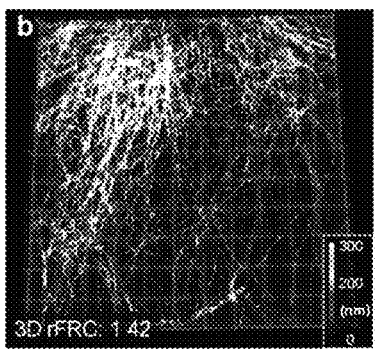
FIG. 21B
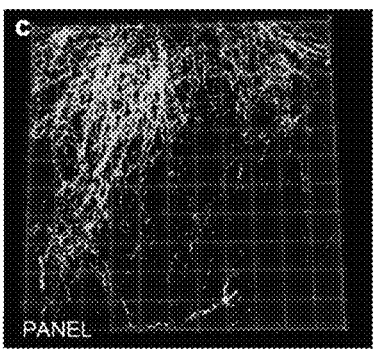
FIG. 21C
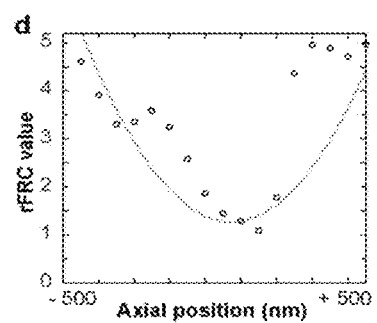
FIG. 21D
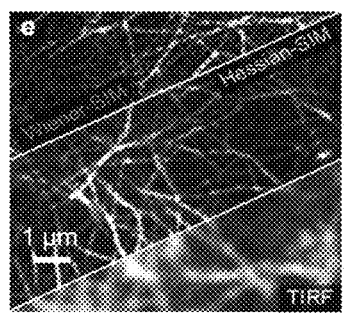
FIG. 21E
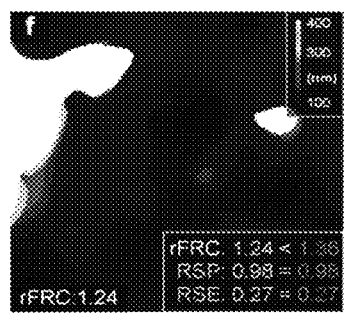
FIG. 21F
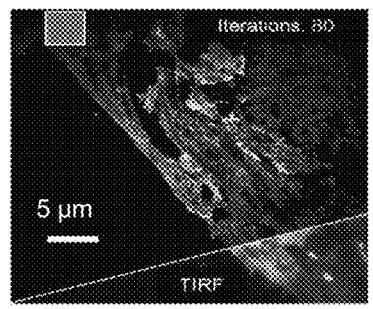
FIG. 21G
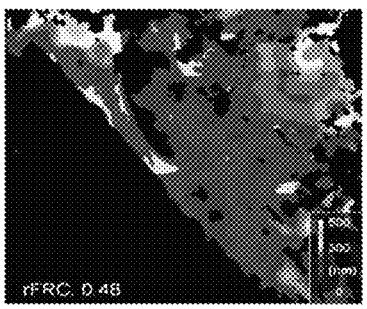
FIG. 21H
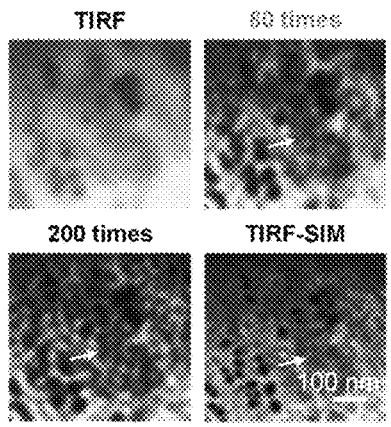
FIG. 21I
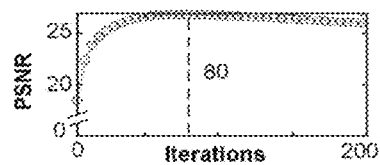
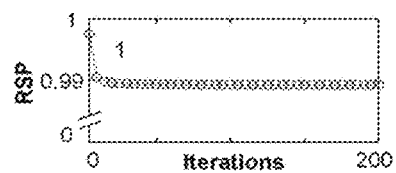
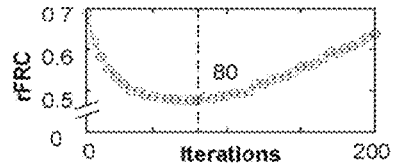
FIG. 21J

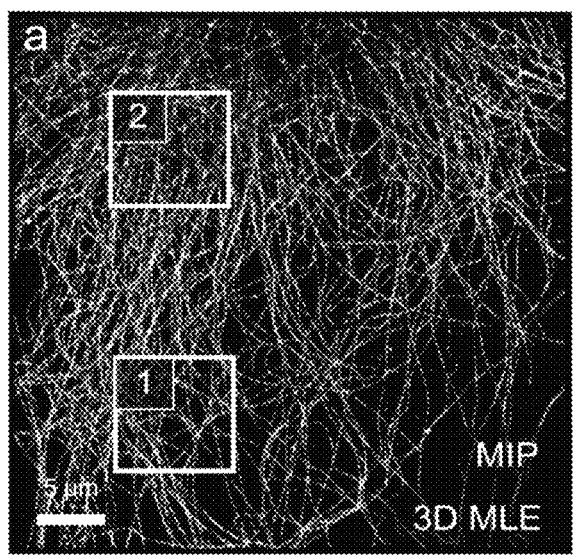
FIG. 22A
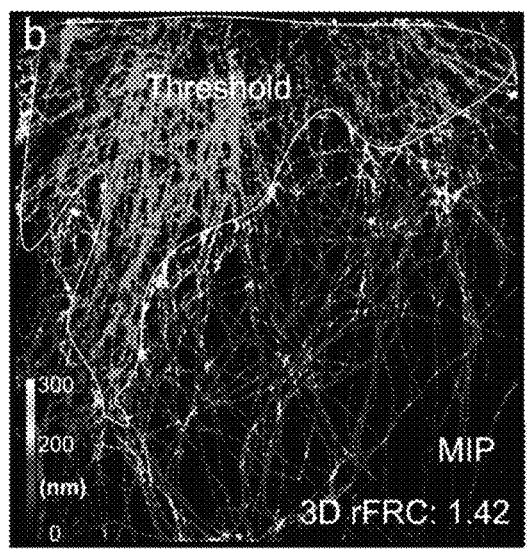
FIG. 22B
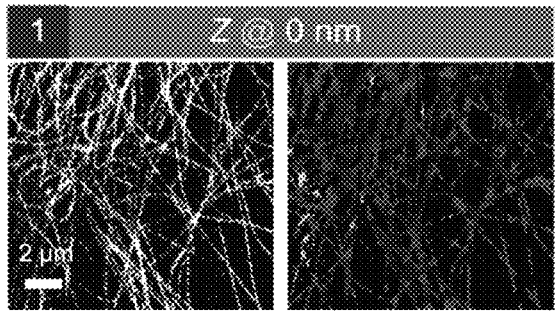
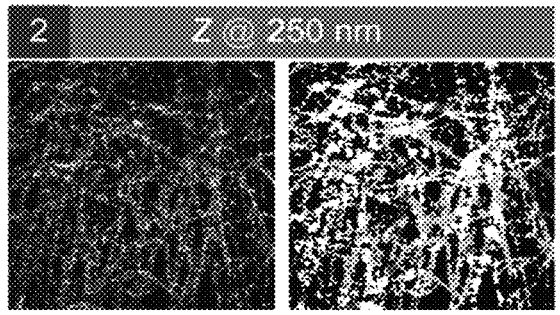
FIG. 22C
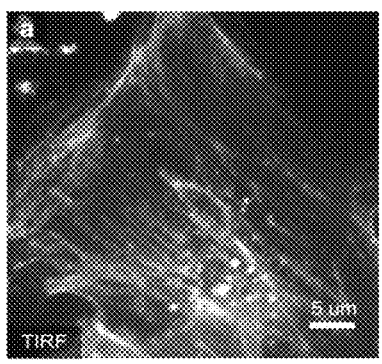
FIG. 23A
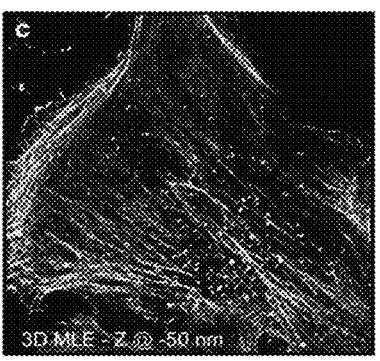
FIG. 23C
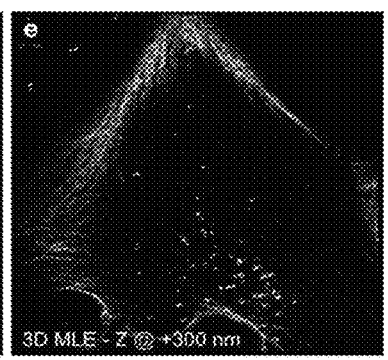
FIG. 23E
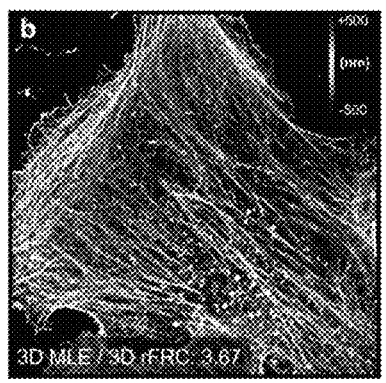
FIG. 23B
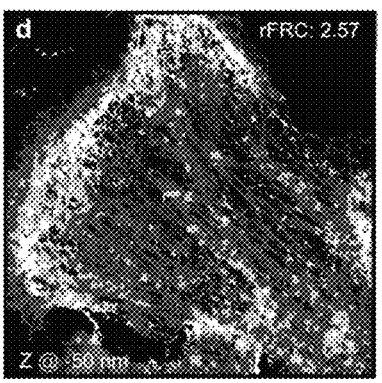
FIG. 23D
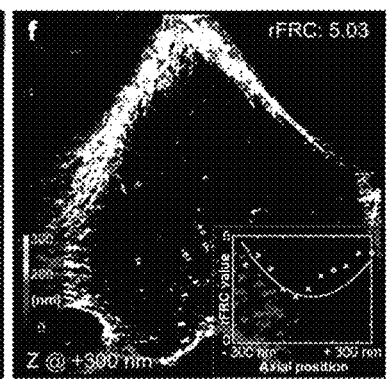
FIG. 23F ANNA-PALM
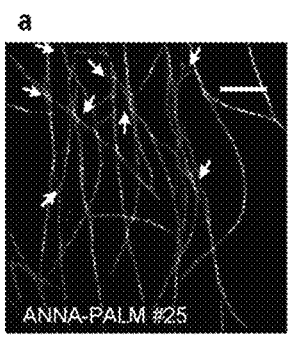  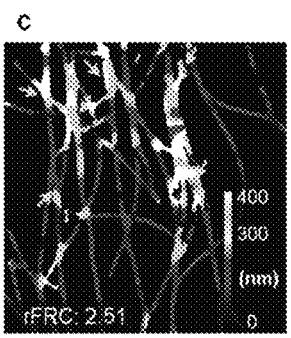 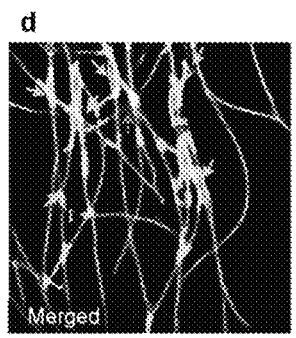
FIG. 28A     FIG. 28B     FIG. 28C     FIG. 28D
CARE
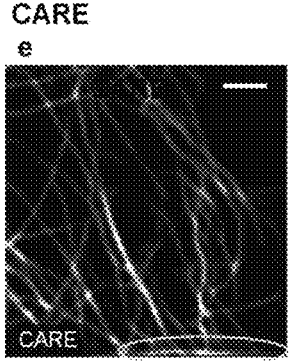  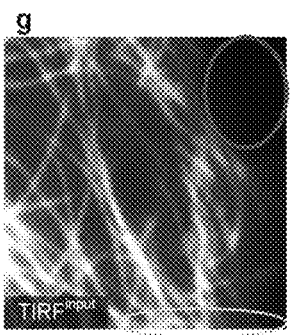 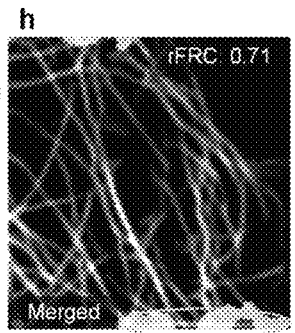
FIG. 28E     FIG. 28F     FIG. 28G     FIG. 28H
TIRF2SIM
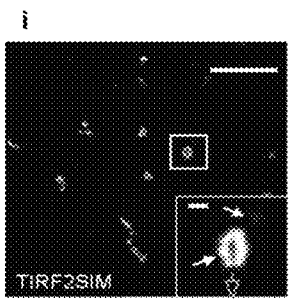 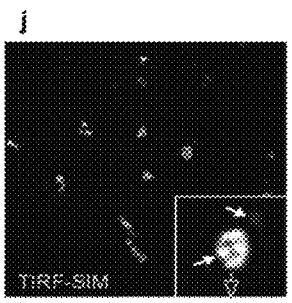 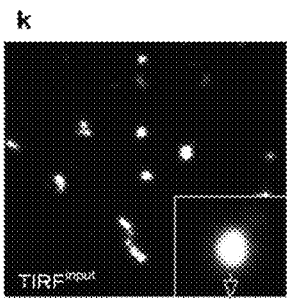 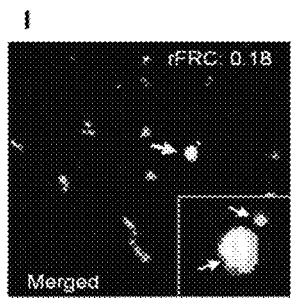
FIG. 28I     FIG. 28J     FIG. 28K     FIG. 28L
Noise2Noise
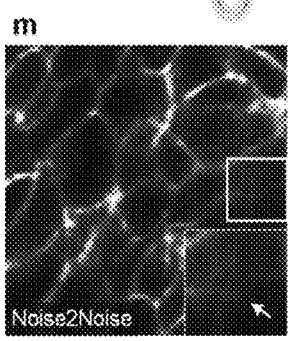 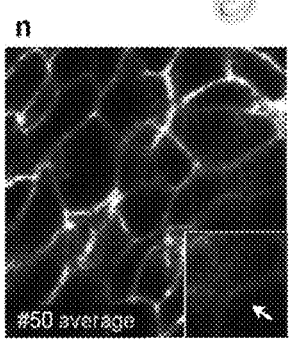 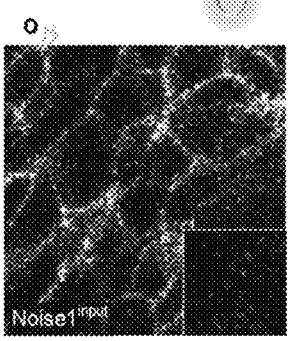 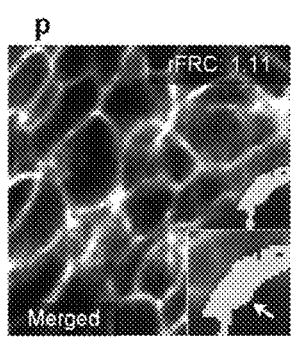
FIG. 28M     FIG. 28N     FIG. 28O     FIG. 28P

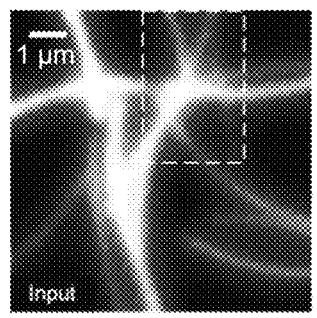
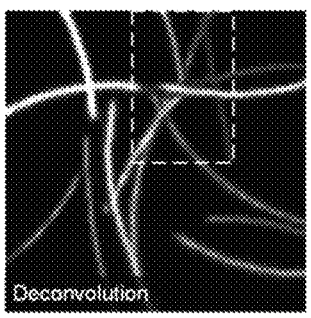
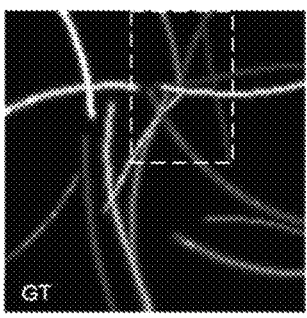
FIG. 32A　　　　　FIG. 32B　　　　　FIG. 32C
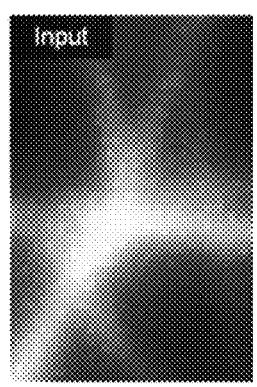
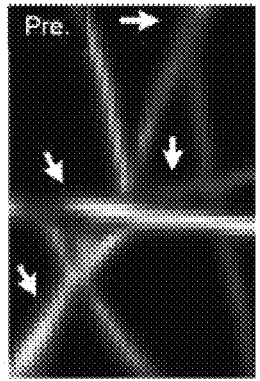
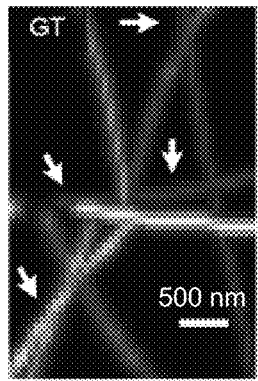
FIG. 32D
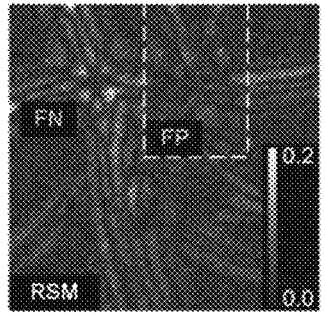
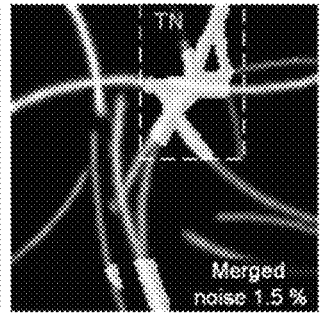
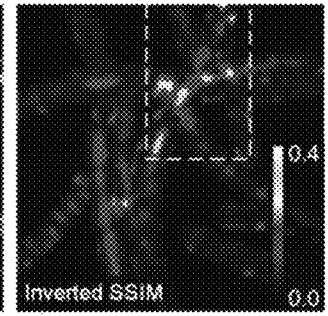
FIG. 32E　　　　　FIG. 32F　　　　　FIG. 32G
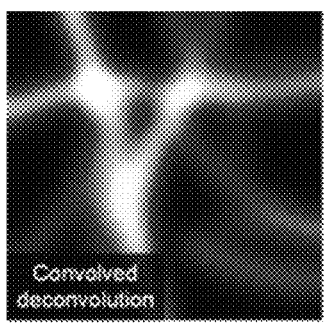
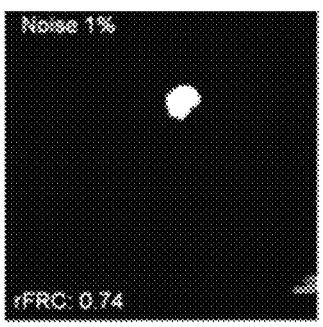
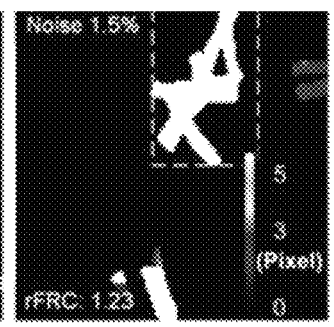
FIG. 32H　　　　　FIG. 32I　　　　　FIG. 32J

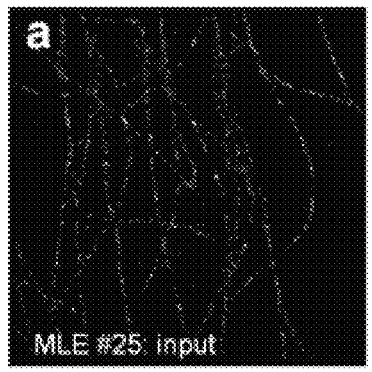 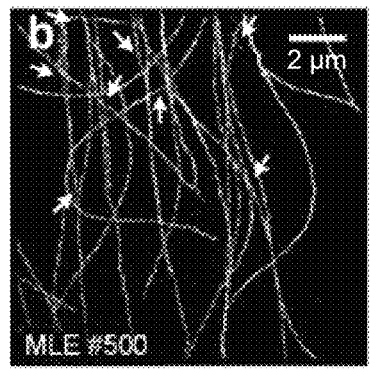 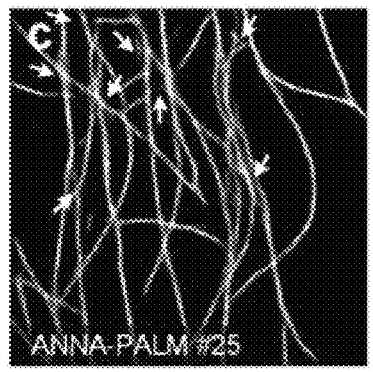
FIG. 33A  FIG. 33B  FIG. 33C
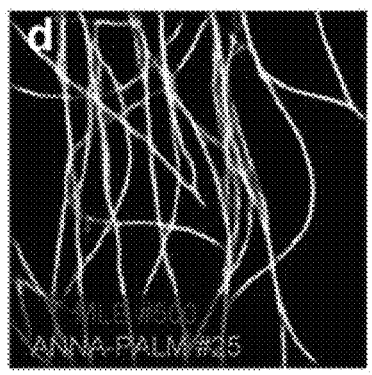 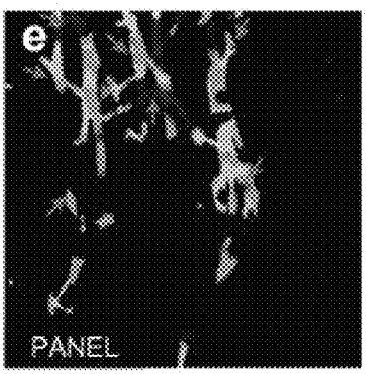 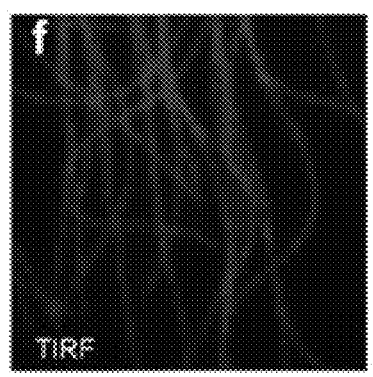
FIG. 33D  FIG. 33E  FIG. 33F
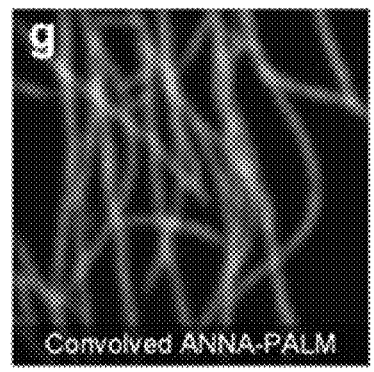 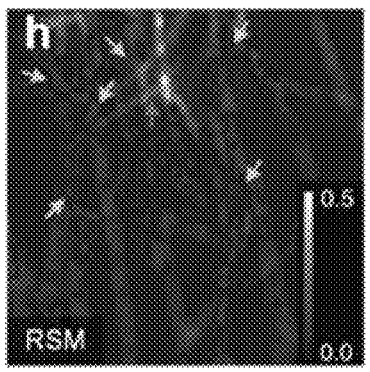 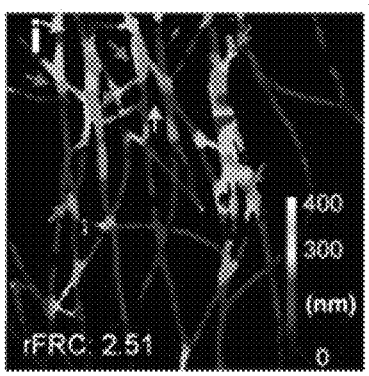
FIG. 33G  FIG. 33H  FIG. 33I

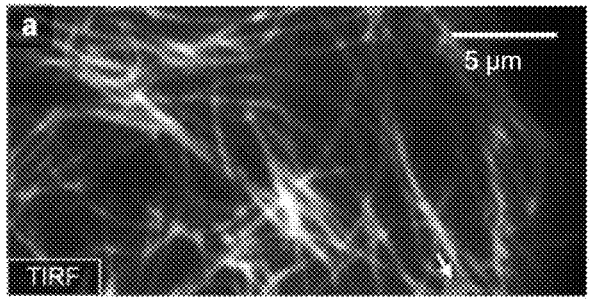
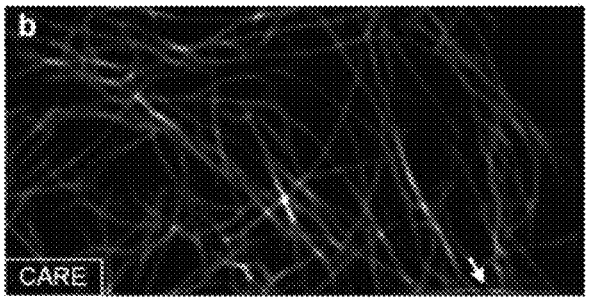
FIG. 34A    FIG. 34B
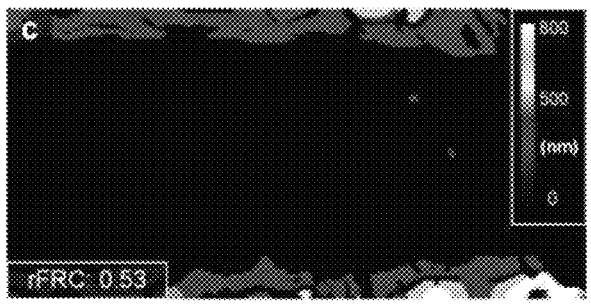
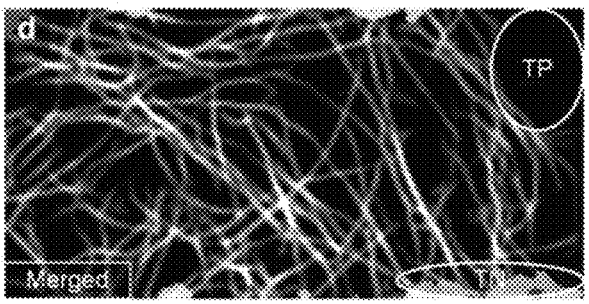
FIG. 34C    FIG. 34D
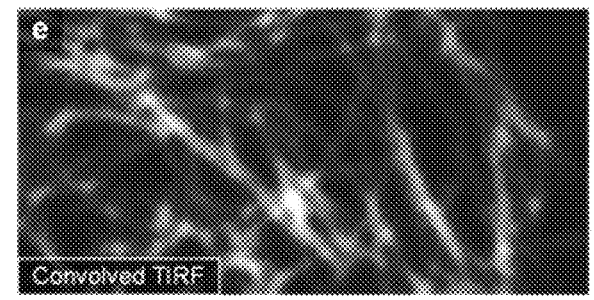
FIG. 34E    FIG. 34F

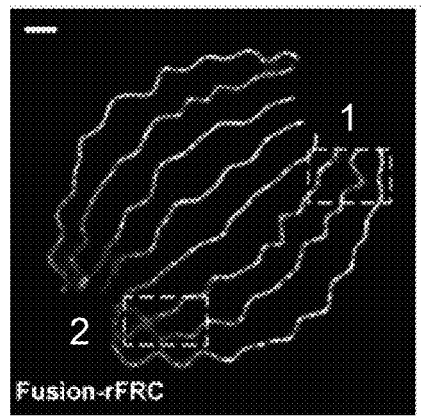
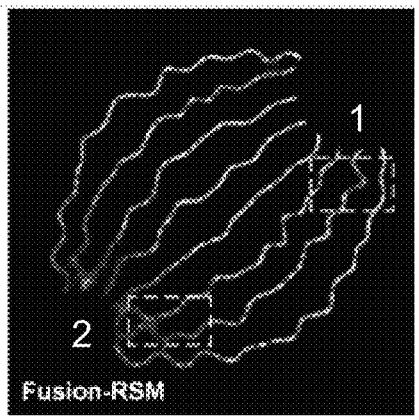
FIG. 38A  FIG. 38B
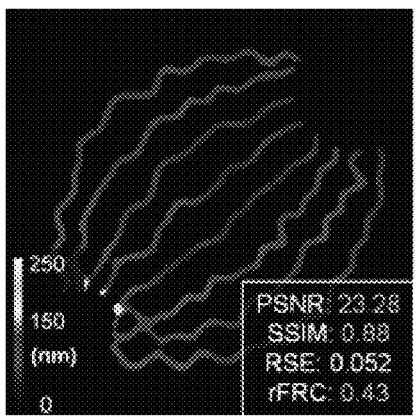
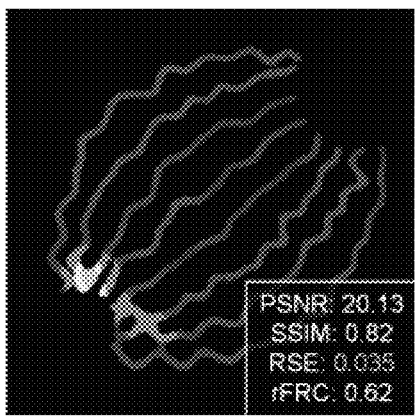
FIG. 38C  FIG. 38D
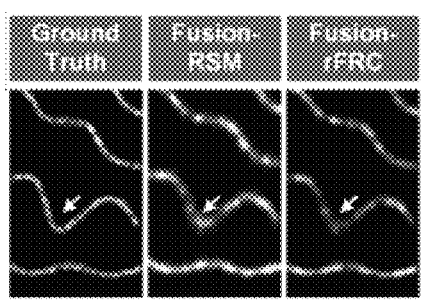
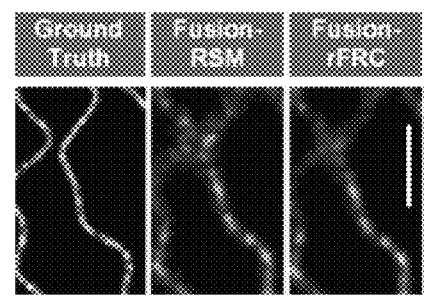
FIG. 38E  FIG. 38F

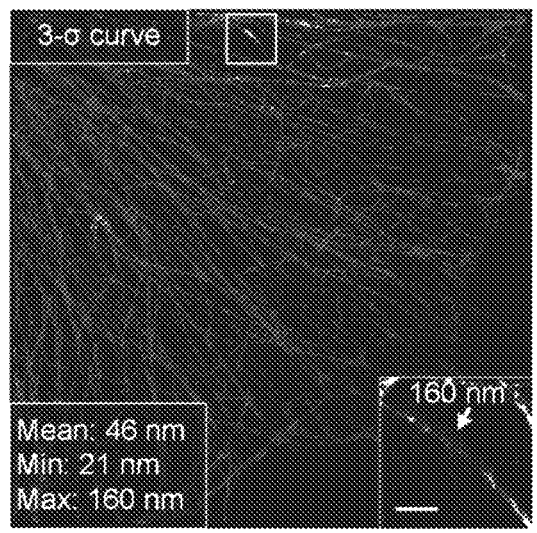 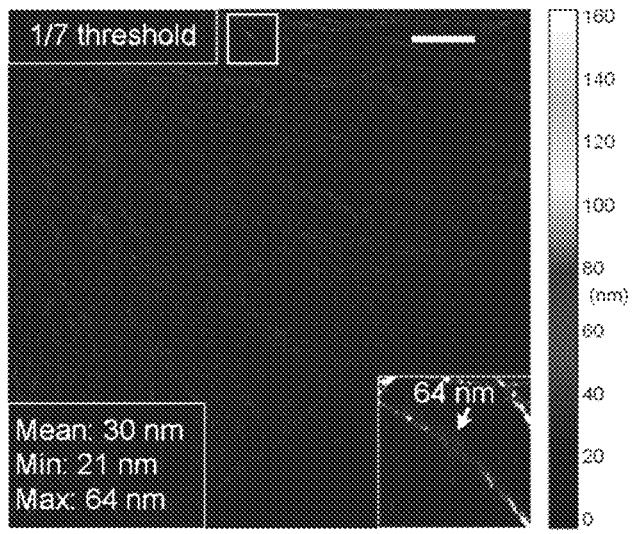
FIG. 41A  FIG. 41B
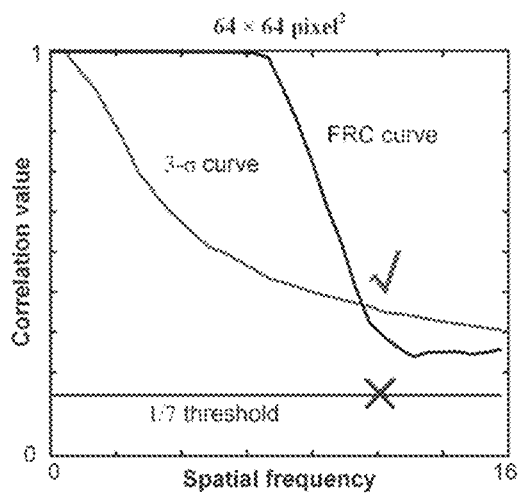 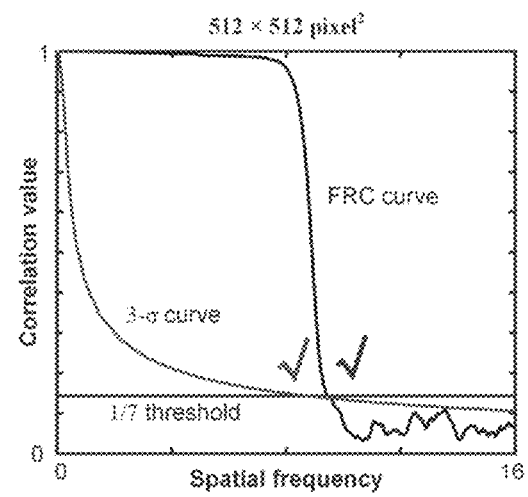
FIG. 41C  FIG. 41D

IMAGE PROCESSING SYSTEMS AND METHODS FOR MAPPING ERRORS OR ARTIFACTS

CROSS-REFERENCE TO RELATED APPLICATION

This application is a Continuation of International Application No. PCT/CN2021/122442, filed on Sep. 30, 2021, the contents of which are incorporated herein by reference.

TECHNICAL FIELD

The present disclosure relates to the field of image processing, and in particular, to systems and methods for determining an error or artifact generated during image reconstruction.

BACKGROUND

Original images generated or collected by an image acquisition device (e.g., a microscope, a telescope, a camera, a webcam) are usually reconstructed using reconstruction techniques (e.g., physics-based reconstruction, learning-based reconstruction). However, the reconstruction process may introduce image errors or artifacts, and a relatively low image quality may lead to misinterpretation of information in the image. Therefore, it is desirable to provide systems and methods for efficient image processing to determine errors/artifacts more precisely and effectively.

SUMMARY

In one aspect of the present disclosure, a method for image processing is provided. The method may include: obtaining a first image and a second image associated with a same object; determining a plurality of first blocks of the first image and a plurality of second blocks of the second image, the plurality of second blocks and the plurality of first blocks being in one-to-one correspondence; determining a plurality of first characteristic values based on the plurality of first blocks and the plurality of second blocks; and/or generating a first target map associated with the first image and the second image based on the plurality of first characteristic values.

In another aspect of the present disclosure, a system for image processing is provided. The system may include: at least one storage device storing executable instructions, and at least one processor in communication with the at least one storage device. When executing the executable instructions, the at least one processor may cause the system to perform operations including: obtaining a first image and a second image associated with a same object; determining a plurality of first blocks of the first image and a plurality of second blocks of the second image, the plurality of second blocks and the plurality of first blocks being in one-to-one correspondence; determining a plurality of first characteristic values based on the plurality of first blocks and the plurality of second blocks; and/or generating a first target map associated with the first image and the second image based on the plurality of first characteristic values.

In another aspect of the present disclosure, a non-transitory computer readable medium is provided. The non-transitory computer readable medium may include at least one set of instructions for image processing, wherein when executed by one or more processors of a computing device, the at least one set of instructions may cause the computing device to perform the method for image processing.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in detail of exemplary embodiments. These exemplary embodiments are described in detail with reference to the drawings. These embodiments are not limiting, and in these embodiments, the same number indicates the same structure, wherein:

FIGS. 6A-6D are flowcharts illustrating an exemplary process for determining a characteristic value according to some embodiments of the present disclosure;

Figure 20M:
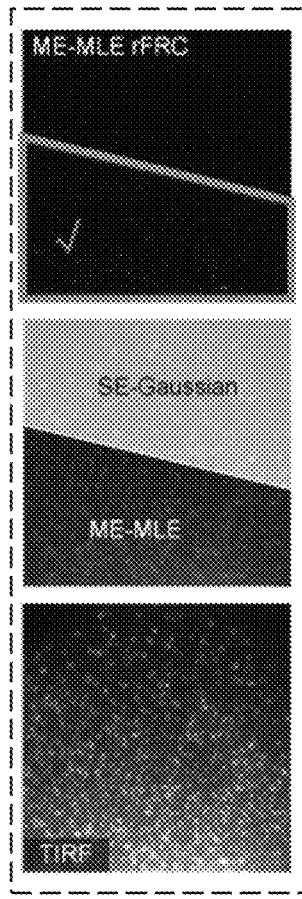
Figure 20N:
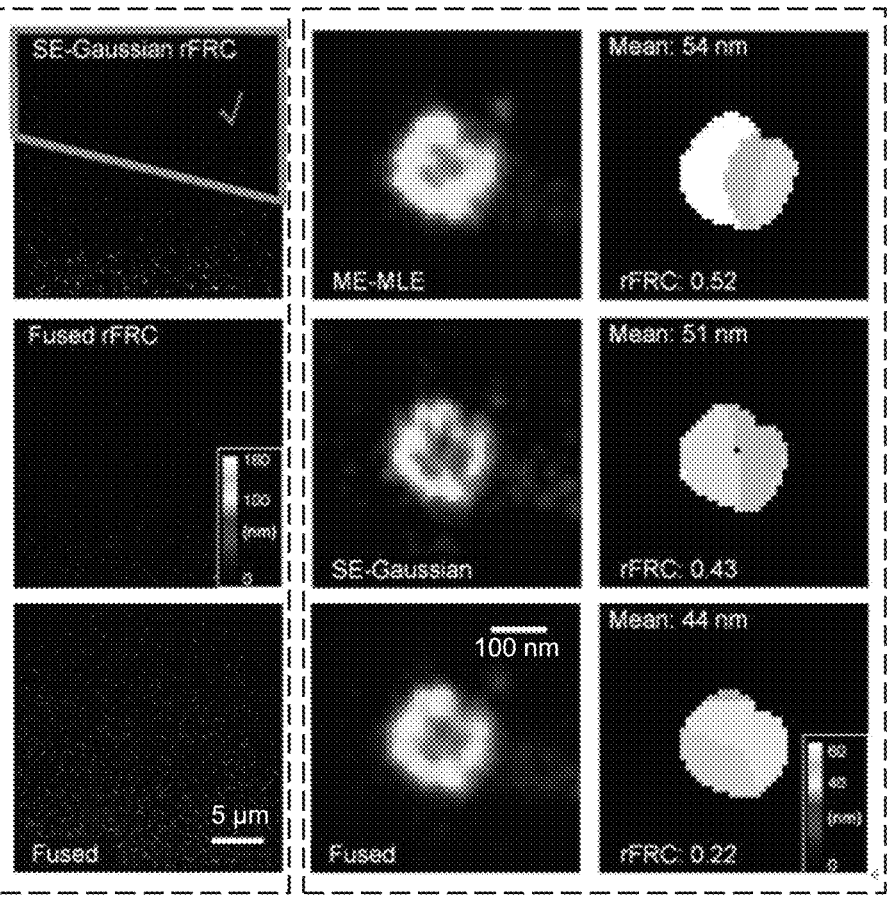
Figure 26:
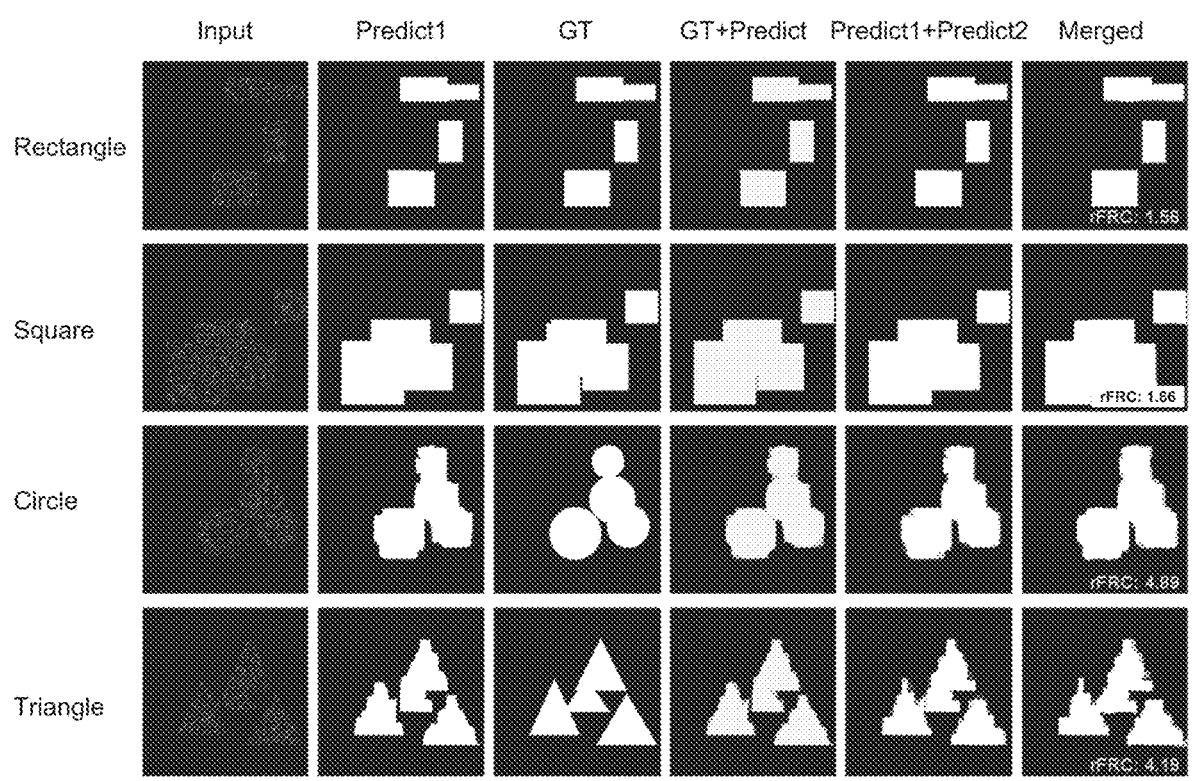
Figure 40A:
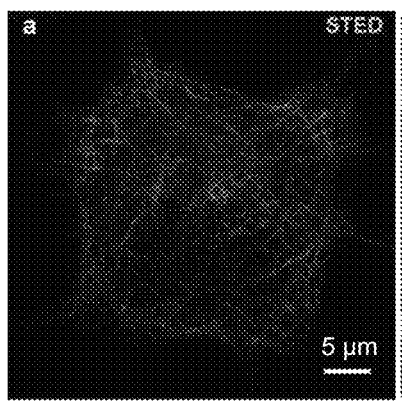
Figure 40B:
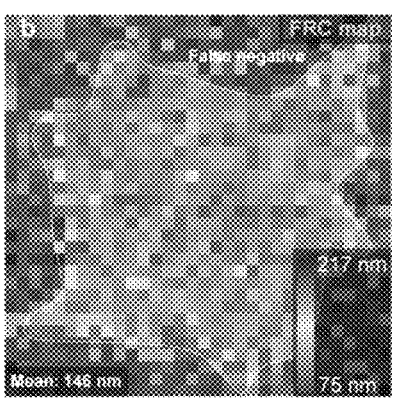
Figure 40C:
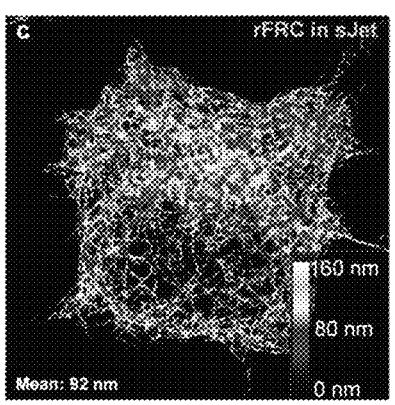
Figure 42:
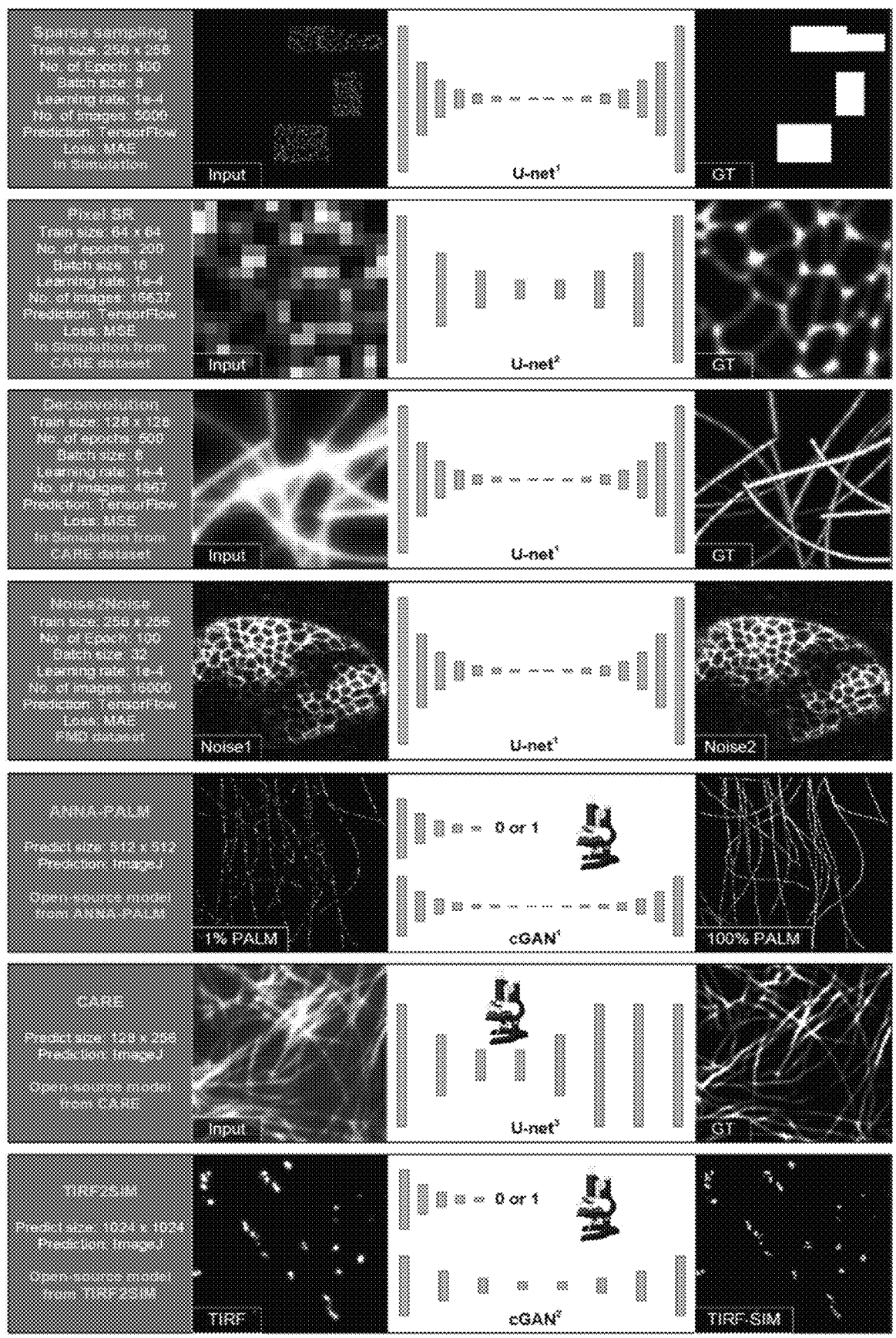
Figure 43:
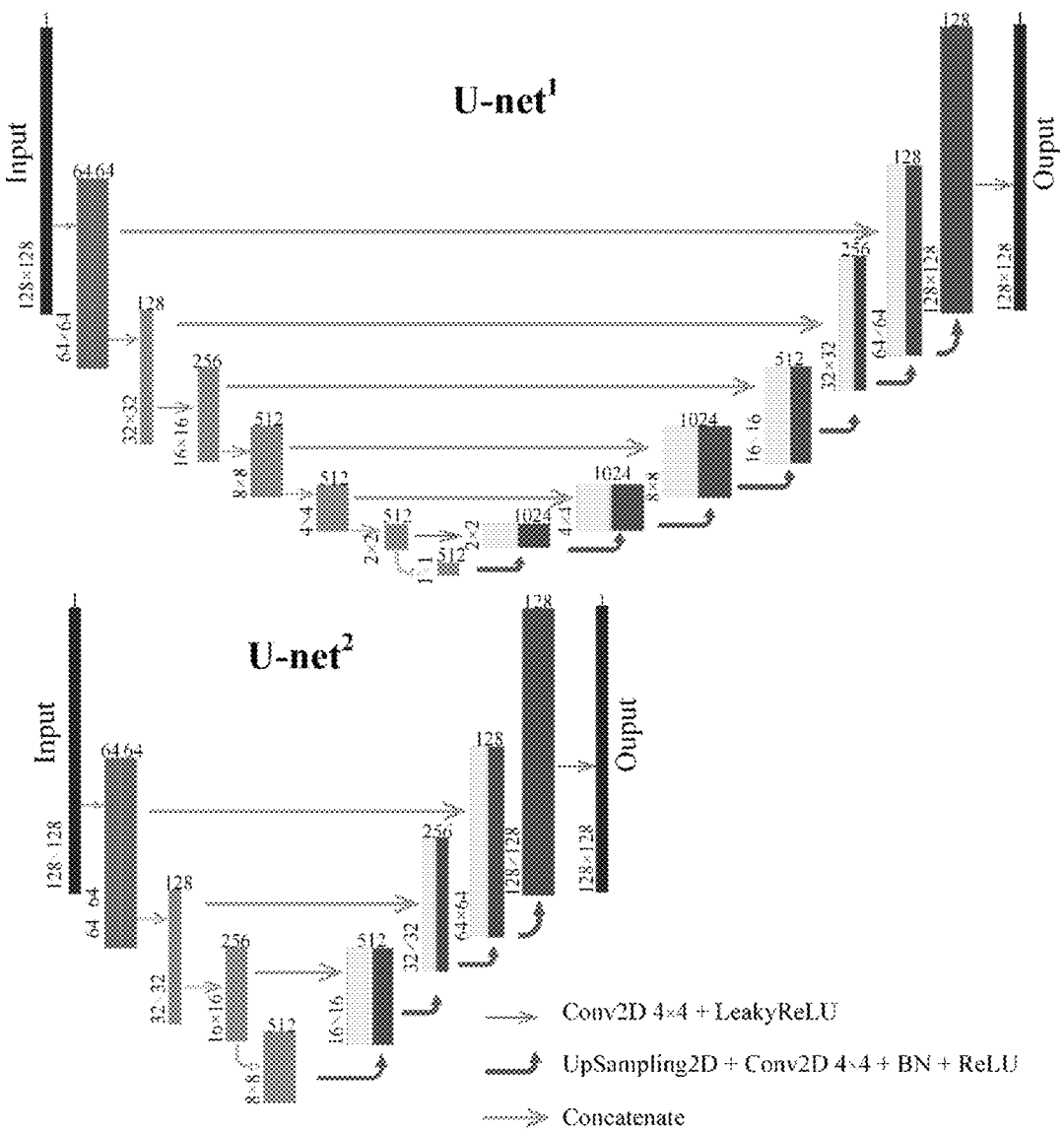

evaluated by pixel-level analysis of error locations (PANEL) according to some embodiments of the present disclosure;

FIGS. 18A-18L illustrate exemplary results of open-source 2D-SMLM and SRRF experimental dataset evaluated by PANEL according to some embodiments of the present disclosure;

FIGS. 19A-19E illustrate exemplary results of full data of a 2D-SMLM experiment evaluated and fused by rFRC map according to some embodiments of the present disclosure;

FIGS. 20A-20L illustrate exemplary results of STORM fusion using rFRC map according to some embodiments of the present disclosure;

FIGS. 20M-20N illustrate an example for STORM fusion according to some embodiments of the present disclosure;

FIGS. 21A-21J illustrate exemplary results of diverse physical-based imaging approaches assisted by an rFRC map according to some embodiments of the present disclosure;

FIGS. 22A-22C illustrate exemplary results of full data of a 3D-STORM experiment according to some embodiments of the present disclosure;

FIGS. 23A-23F illustrate exemplary results of another example of 3D-STORM experiment evaluated by rFRC volume according to some embodiments of the present disclosure;

FIGS. 24A-24F illustrate exemplary results of PANEL evaluating the coherent computational imaging method and Fourier ptychographic microscopy (FPM) according to some embodiments of the present disclosure;

FIGS. 25A-25I illustrate exemplary results of a single frame rFRC computation for 3D-SIM according to some embodiments of the present disclosure;

FIG. 26 illustrates exemplary results of full sparse sampling simulation according to some embodiments of the present disclosure;

FIGS. 27A-27L illustrate exemplary results of simulations of learning-based applications evaluated by PANEL according to some embodiments of the present disclosure;

FIGS. 28A-28P illustrate experiment results of learning-based applications evaluated by PANEL according to some embodiments of the present disclosure;

FIGS. 29A-29I illustrate exemplary results of full data of TIRF-SIM experiment according to some embodiments of the present disclosure;

FIGS. 30A-30I illustrate exemplary results of a full TIRF deconvolution experiment according to some embodiments of the present disclosure;

FIGS. 31A-31G illustrate exemplary results of full pixel super-resolution simulation according to some embodiments of the present disclosure;

FIGS. 32A-32J illustrate exemplary results of a single frame rFRC computation for learning-based deconvolution according to some embodiments of the present disclosure;

FIGS. 33A-33I illustrate exemplary results of full ANNA-PALM experiment according to some embodiments of the present disclosure;

FIGS. 34A-34F illustrate exemplary results of full CARE experiment according to some embodiments of the present disclosure;

FIGS. 35A-35E illustrate exemplary results of full Noise2Noise experiment according to some embodiments of the present disclosure;

FIGS. 36A-36F illustrate exemplary results of an adaptive low pass filter for Richardson-Lucy deconvolution (RLD) according to some embodiments of the present disclosure;

FIGS. 37A-37I illustrate exemplary SMLM result fusion of MLE and FALCON according to some embodiments of the present disclosure;

FIGS. 38A-38F illustrate the comparison between exemplary fusion results using RSM or rFRC map according to some embodiments of the present disclosure;

FIGS. 39A-39F illustrate exemplary results of simulation of different noise amplitudes to evaluate the performance of SSIM and rFRC according to some embodiments of the present disclosure;

FIGS. 40A-40C illustrate exemplary results indicating false negative induced by background according to some embodiments of the present disclosure;

FIGS. 41A-41D illustrate exemplary results of resolution mapping using 3σ-curve versus 1/7 hard threshold according to some embodiments of the present disclosure;

FIG. 42 illustrates overview of network architecture, training parameters configuration, and data used for different applications according to some embodiments of the present disclosure; and FIG. 43 illustrates exemplary neural network backbone used for image restoration according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that the term "object" and "subject" may be used interchangeably as a reference to a thing that undergoes an imaging procedure of the present disclosure.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
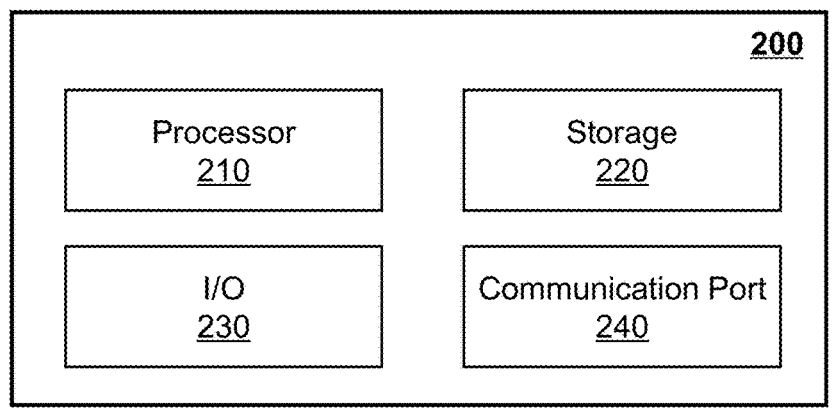
FIG. 2 is a schematic diagram illustrating an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

It should be noted that when an operation is described to be performed on an image, the term "image" used herein may refer to a dataset (e.g., a matrix) that contains values of pixels (pixel values) in the image. As used herein, a representation of an object (e.g., a person, an organ, a cell, or a portion thereof) in an image may be referred to as the object for brevity. For instance, a representation of a cell or organelle (e.g., mitochondria, endoplasmic reticulum, centrosome, Golgi apparatus, etc.) in an image may be referred to as the cell or organelle for brevity. As used herein, an operation on a representation of an object in an image may be referred to as an operation on the object for brevity. For instance, a segmentation of a portion of an image including a representation of a cell or organelle from the image may be referred to as a segmentation of the cell or organelle for brevity.

It should be understood that the term "resolution" as used herein, refers to a measure of the sharpness of an image. The term "superresolution" or "super-resolved" or "SR" as used herein, refers to an enhanced (or increased) resolution, e.g., which may be obtained by a process of combining a sequence of low-resolution images to generate a higher resolution image or sequence.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood the operations of the flowcharts may be implemented not in order. Conversely, the operations may be implemented in inverted order, or simultaneously. Moreover, one or more other operations may be added to the flowcharts. One or more operations may be removed from the flowcharts.

With the development of technology, a series of super-resolution approaches may break the diffraction-limit (e.g., 200-300 nm) by use of computational processes. Such computational operations may be generally performed on images generated based on several categories of techniques including, for example, (i) molecular localization such as photo-activated localization microscopy (PALM) and stochastic optical reconstruction microscopy (STORM); (ii) molecular intensity fluctuation such as super-resolution fluctuation imaging (SOFI) and super-resolution radial fluctuations (SRRF); (iii) high-frequency information mixing such as structured illumination microscopy (SIM); (iv) deconvolution, or the like, or any other technique which relies on highly computational reconstructions to extend the spatial resolution of image(s). In addition to original physical implements, a plurality of learning-based algorithms may be positively developed to decrease the photon/hardware budgets in image generation, reconstruction, and/or processing. For example, artificial neural network accelerated PALM (ANNA-PALM) may be applied to reduce a total number or count of frames (or images, or image frames) without trading off the spatial resolution of PALM. As another example, using a conditional generative adversarial network (cGAN), the total internal reflection fluorescence (TIRF) microscopy images may be directly transformed to match the results obtained with the TIRF-SIM. As a further example, content-aware image restoration (CARE) network framework may enable to do denoising and deconvolution applications more effectively.

Such computational modality may be regarded as a promising imaging technique. In some embodiments, image errors or artifacts may be introduced during reconstruction of image(s), and a relatively low image quality may lead to misunderstanding of biological information. In some embodiments, the image quality and resolution achieved may relate to one or more comprehensive factors, including for example, the photo physics of fluorophores used in imaging, chemical environment of the sample that is imaged, optical setup conditions, analytical approaches used to produce image(s) (e.g., super-resolution image(s)), network training procedures, or the like, or a combination thereof. To quantitatively map and minimize the imaging defects, most existing quality assessments may rely on subjective comparison of the reconstructed images relative to the standard reference structures, benchmarking of the data of reconstructed images against other higher resolution imaging techniques such as electron microscopy, or corresponding specific designed analytical algorithms. Merely by way of example, for the case of STORM/PLAM, considering with the input of precise imaging model and noise statistics, the confidence of an individual localization within a STORM/PLAM dataset without knowledge of the ground-truth may be accessible based on Wasserstein-induced flux computational process. In some embodiments, to identify sources of errors and artifacts in SIM systems, an SIM-check which requires a complex pipeline and specialist usage may be used. In some embodiments, to obtain the uncertainty of learning-based approaches (e.g., the Bayesian neural networks (BNNs) framework, learning a distribution over weights, etc.), modifications may be required to the existing training procedure of the learning-based approaches. In some embodiments, the modifications may be complicated in application and computationally expensive compared to standard techniques (e.g., general learning-based approaches).

In some embodiments, to evaluate the local errors/artifacts generally and precisely, a resolution scaled error map (RSM) (e.g., a reference map) may be used as an evaluation tool for super-resolution images. In some embodiments, a wide-field reference image may be used to generate the RSM. In some embodiments, the RSM may be generated based on one or more assumptions including for example, (i) the wide-field reference image may have a relatively high SNR; (ii) a Gaussian kernel convolution process performed in the generation of the RSM map may be spatially invariant; (iii) the illumination used in generating raw data of a super-resolution image may be homogenous. According to these assumptions, in some embodiments, the RSM may suffer considerable potential to induce false negative in the estimated error maps. On the other hand, in the transforming of a super-resolution image to its low-resolution domain, a detectable scale of the errors of RSM may be limited by the Abbe diffraction. In some embodiments, to detect the errors/artifacts in a super-resolution scale, a reference-free process (e.g., a pixel-level analysis of error locations (PANEL)) may be used. In some embodiments, the PANEL technique may be built up on the rolling Fourier ring correlation (rFRC) employing one or more individual reconstructed super-resolution frames and/or further collaborated with a modified RSM. In some embodiments, one or more strategies achieving single-frame rFRC computation may be involved in the PANEL framework for physical-based and/or learning-based applications.

In some embodiments, in the PANEL framework, the RSM and rFRC map may be merged together, and the PANEL framework may be developed as a multi-functional and model-free metric. Therefore, the PANEL framework may have the ability to infer the errors contained in multi-dimensional signals up to super-resolution scale and meanwhile moderate the possible false negative defect(s). The PANEL framework may be used in various scenarios such as physical super-resolution imaging approaches (2D- or 3D-STORM, TIRF- or 3D-SIM, SRRF, Richardson-Lucy deconvolution, etc.), various learning-based image restoration techniques (ANNA-PALM, TIRF to TIRF-SIM, CARE, etc.), and/or non-super-resolution applications such as a denoising task. In some embodiments, utilizing one or more subtle quantitative error maps generated using the PANEL framework, the design of a plurality of computational processes (e.g., STORM image fusion, adaptive low-pass filtering, automatic deconvolution iteration determination, etc.) may be advanced. In some embodiments, the PANEL framework may be used as a tool for robust and detailed evaluations of the image quality of physical- or learning-based super-resolution imaging approaches, which may facilitate the optimizing of super-resolution imaging and network learning procedures.

Extensive super-resolution microscopy may rely on corresponding computational operations that may form reconstruction errors in one or more scales. The reconstruction errors of images may result in misconception of biomedical information. Quantitative mapping for such errors in super-resolution reconstructions may be limited to identify subtle errors due to inevitably employing diffraction-limited image(s) as reference. According to some embodiments of the present disclosure, rolling Fourier ring correlation (rFRC) computation may be used to trace pixels within a reconstructed image, and a relatively precise model-free metric enabling pixel-level analysis of error locations (PANEL) may be provided. In some embodiments, a target image or map (e.g., an rFRC map) may be generated according to the pixel-level analysis of error locations (PANEL). The target image or map may illustrate the defects of the reconstructed image up to super-resolution scale. In some embodiments, the reliability assessment of the PANEL approach may be performed on images reconstructed based on one or more computational modalities (e.g., physical super-resolution microscopes, deep-learning super-resolution microscopes, etc.).

The present disclosure relates to systems and methods for image processing. The systems and methods may obtain a first image and a second image associated with a same object. The systems and methods may determine a plurality of first blocks of the first image and a plurality of second blocks of the second image. The plurality of second blocks and the plurality of first blocks may be in one-to-one correspondence. The systems and methods may determine a plurality of first characteristic values based on the plurality of first blocks and the plurality of second blocks. The systems and methods may generate a target map (e.g., a first target map) associated with the first image and the second image based on the plurality of first characteristic values. The first target map may quantitatively map errors in the first and/or second images generated by an image acquision device, without using reference (e.g., ground-truth) and/or any prior information of the image acquision device. According to some embodiments of the present disclosure, the first target map may be used as a tool for quantitative assessment of image quality.

Moreover, although the systems and methods disclosed in the present disclosure are described primarily regarding generating an rFRC map reflecting errors of an image reconstructed by physical super-resolution microscopes and/or deep-learning super-resolution microscopes, it should be understood that the descriptions are merely provided for the purposes of illustration, and not intended to limit the scope of the present disclosure. The systems and methods of the present disclosure may be applied to any other kind of systems including an image acquisition device for image processing. For example, the systems and methods of the present disclosure may be applied to microscopes, telescopes, cameras (e.g., surveillance cameras, camera phones, wedcams), unmanned aerial vehicles, medical imaging devices, or the like, or any combination thereof.

Merely by way of example, the methods disclosed in the present disclosure may be used to generate an rFRC map based on two-frames (e.g., a first image and a second image in sequential) or a single-frame (e.g., an initial image) generated by physical super-resolution imaging and/or deep-learning super-resolution reconstruction.

It should be understood that application scenarios of systems and methods disclosed herein are only some exemplary embodiments provided for the purposes of illustration, and not intended to limit the scope of the present disclosure.

For persons having ordinary skills in the art, multiple variations and modifications may be made under the teachings of the present disclosure.

Figure 1:
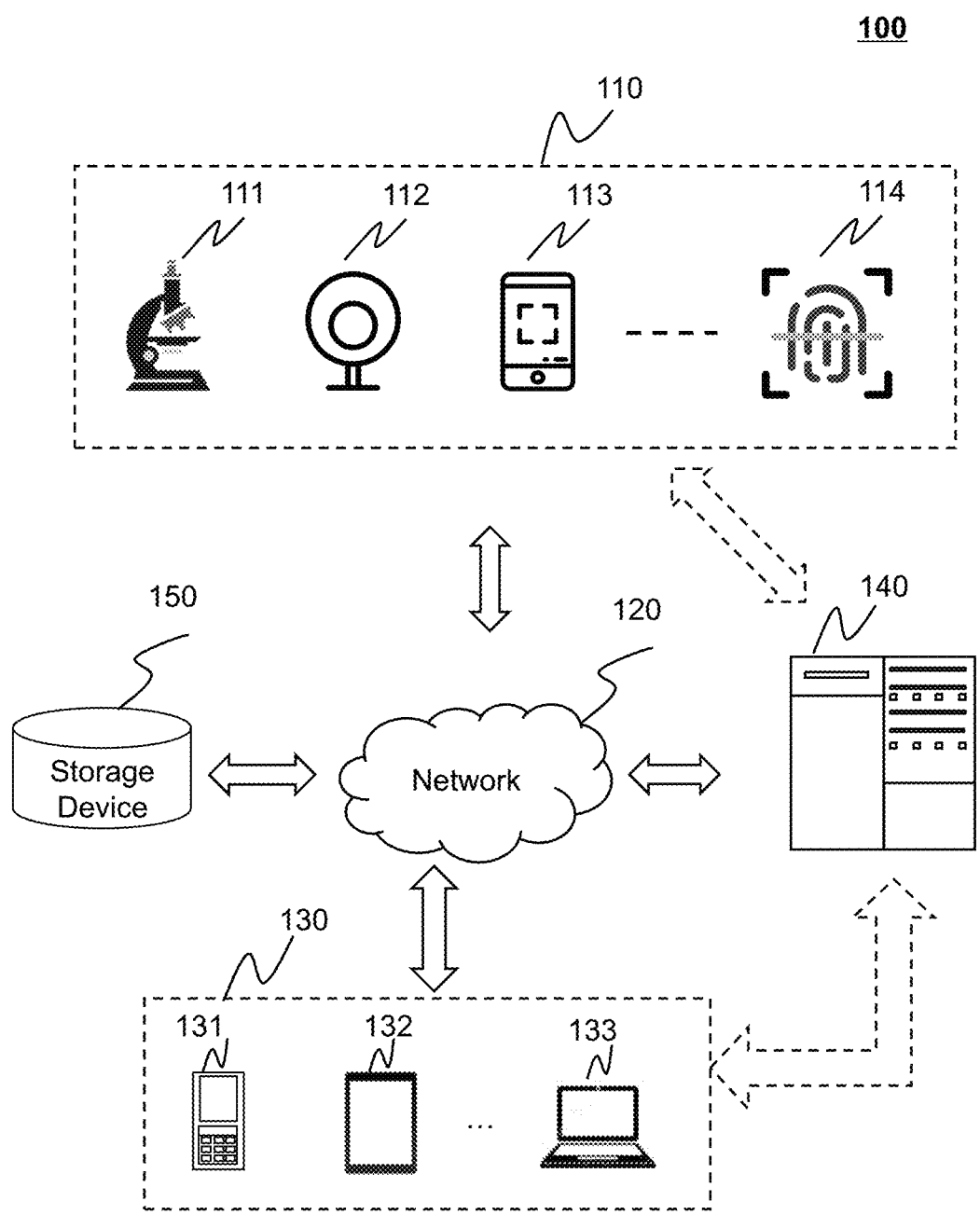
FIG. 1 is a schematic diagram illustrating an exemplary application scenario of an image processing system according to some embodiments of the present disclosure.

FIG. 1 is a schematic diagram illustrating an exemplary application scenario of an image processing system according to some embodiments of the present disclosure. As shown in FIG. 1, the image processing system 100 may include an image acquisition device 110, a network 120, one or more terminals 130, a processing device 140, and a storage device 150.

The components in the image processing system 100 may be connected in one or more of various ways. Merely by way of example, the image acquisition device 110 may be connected to the processing device 140 through the network 120. As another example, the image acquisition device 110 may be connected to the processing device 140 directly as indicated by the bi-directional arrow in dotted lines linking the image acquisition device 110 and the processing device 140. As still another example, the storage device 150 may be connected to the processing device 140 directly or through the network 120. As a further example, the terminal 130 may be connected to the processing device 140 directly (as indicated by the bi-directional arrow in dotted lines linking the terminal 130 and the processing device 140) or through the network 120.

Figure 5:
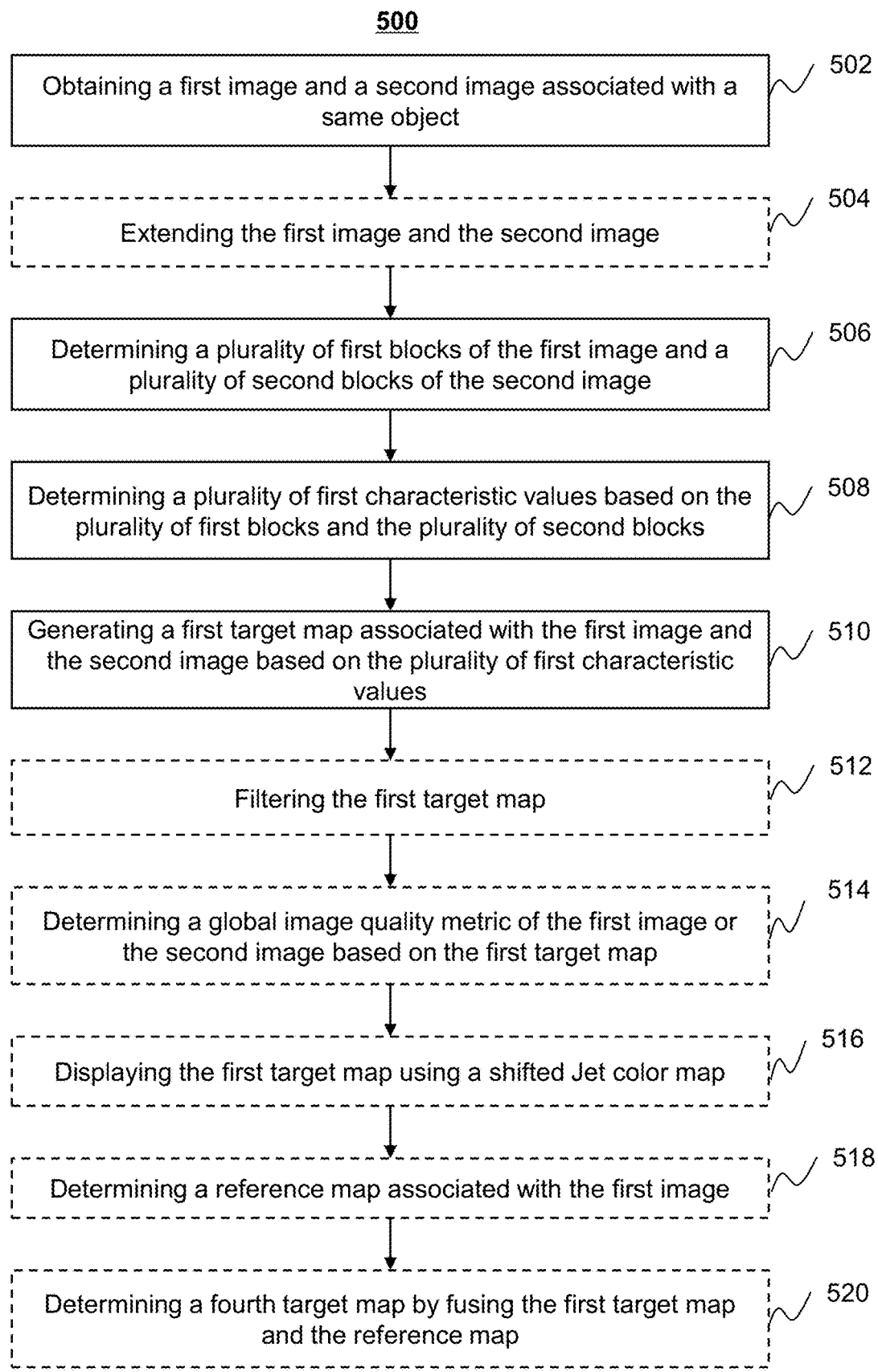
FIG. 5 is a flowchart illustrating an exemplary process for determining a target map according to some embodiments of the present disclosure.

The image processing system 100 may be configured to generate a first target map (e.g., an rFRC map) based on a first image and a second image using an rFRC process (e.g., one or more operations shown in FIG. 5). The first target map may illustrate or indicate errors and/or artifacts and/or reflect image quality (e.g., the degree of errors) of the first image and/or the second image generated by the image acquisition device 110. The image processing system 100 may be configured to determine a reference map associated with the first image. In some embodiments, the reference map may be used to identify an error that is not reported by the first target map. The image processing system 100 may be configured to determine a fourth target map by fusing the first target map and the reference map. The fourth target map may be configured to comprehensively illustrate or indicate the errors and/or artifacts of the first image and/or the second image. In some embodiments, the errors and/or artifacts indicated by the target map (e.g., the first target map, the fourth target map) may relate to or include the errors generated in the reconstruction of the first image and/or the second image.

The image acquisition device 110 may be configured to obtain one or more images (e.g., a first image, a second image, an initial image, etc.) associated with an object within its detection region. The object may include one or more biological or non-biological objects. In some embodiments, the image acquisition device 110 may be an optical imaging device, a radioactive-ray-based imaging device (e.g., a computed tomography device), a nuclide-based imaging device (e.g., a positron emission tomography device, a magnetic resonance imaging device), etc. Exemplary optical imaging devices may include a microscope 111 (e.g., a fluorescence microscope), a surveillance device 112 (e.g., a security camera), a mobile terminal device 113 (e.g., a camera phone), a scanning device 114 (e.g., a flatbed scanner, a drum scanner, etc.), a telescope, a webcam, or the like, or any combination thereof. In some embodiments, the optical imaging device may include a capture device (e.g., a detector or a camera) for collecting the image data. For illustration purposes, the present disclosure may take the microscope 111 as an example for describing exemplary functions of the image acquisition device 110. Exemplary microscopes may include a structured illumination microscope (SIM) (e.g., a two-dimensional SIM (2D-SIM), a three-dimensional SIM (3D-SIM), a total internal reflection SIM (TIRF-SIM), a spinning-disc confocal-based SIM (SD-SIM), etc.), a photoactivated localization microscopy (PALM), a stimulated emission depletion fluorescence microscopy (STED), a stochastic optical reconstruction microscopy (STORM), etc. The SIM may include a detector such as an EMCCD camera, an sCMOS camera, etc. The objects detected by the SIM may include one or more objects of biological structures, biological issues, proteins, cells, microorganisms, or the like, or any combination. Exemplary cells may include INS-1 cells, COS-7 cells, Hela cells, liver sinusoidal endothelial cells (LSECs), human umbilical vein endothelial cells (HUVECs), HEK293 cells, or the like, or any combination thereof. In some embodiments, the one or more objects may be fluorescent or fluorescent-labeled. The fluorescent or fluorescent-labeled objects may be excited to emit fluorescence for imaging.

The network 120 may include any suitable network that can facilitate the image processing system 100 to exchange information and/or data. In some embodiments, one or more of components (e.g., the image acquisition device 110, the terminal(s) 130, the processing device 140, the storage device 150, etc.) of the image processing system 100 may communicate information and/or data with one another via the network 120. For example, the processing device 140 may acquire image data (e.g., a first image, a second image) from the image acquisition device 110 via the network 120. As another example, the processing device 140 may obtain user instructions from the terminal(s) 130 via the network 120. The network 120 may be and/or include a public network(e.g., the Internet), a private network (e.g., a local area network (LAN), a wide area network (WAN), etc.), a wired network (e.g., an Ethernet), a wireless network (e.g., an 802.11 network, a Wi-Fi network, etc.), a cellular network (e.g., a Long Term Evolution (LTE) network), an image relay network, a virtual private network ("VPN"), a satellite network, a telephone network, a router, a hub, a switch, a server computer, and/or a combination of one or more thereof. For example, the network 120 may include a cable network, a wired network, a fiber network, a telecommunication network, a local area network, a wireless local area network (WLAN), a metropolitan area network (MAN), a public switched telephone network (PSTN), a Bluetooth™ network, a ZigBee™ network, a near field communication network (NFC), or the like, or a combination thereof. In some embodiments, the network 120 may include one or more network access points. For example, the network 120 may include wired and/or wireless network access points, such as base stations and/or network switching points, through which one or more components of the image processing system 100 may access the network 120 for data and/or information exchange.

In some embodiments, a user may operate the image processing system 100 through the terminal(s) 130. The terminal(s) 130 may include a mobile device 131, a tablet computer 132, a laptop computer 133, or the like, or a combination thereof. In some embodiments, the mobile device 131 may include a smart home device, a wearable device, a mobile device, a virtual reality device, an augmented reality device, or the like. In some embodiments, the smart home device may include a smart lighting device, a control device of an intelligent electrical apparatus, a smart monitoring device, a smart television, a smart video camera, an interphone, or the like, or a combination thereof. In some embodiments, the wearable device may include a bracelet, footgear, glasses, a helmet, a watch, clothing, a backpack, a smart accessory, or the like, or a combination thereof. In some embodiments, the mobile device may include a mobile phone, a personal digital assistant (PDA), a gaming device, a navigation device, a point of sale (POS) device, a laptop, a tablet computer, a desktop, or the like, or a combination thereof. In some embodiments, the virtual reality device and/or augmented reality device may include a virtual reality helmet, virtual reality glasses, a virtual reality eyewear, an augmented reality helmet, augmented reality glasses, an augmented reality eyewear, or the like, or a combination thereof. For example, the virtual reality device and/or augmented reality device may include a Google Glass™, an Oculus Rift™, a Hololens™, a Gear VR™, or the like. In some embodiments, the terminal(s) 130 may be part of the processing device 140.

The processing device 140 may process data and/or information obtained from the image acquisition device 110, the terminal(s) 130, and/or the storage device 150. For example, the processing device 140 may process one or more images (e.g., a first image, a second image, etc.) generated by the image acquisition device 110 to generate an rFRC map (e.g., a first target map, a third target map, etc.). In some embodiments, the processing device 140 may be a server or a server group. The server group may be centralized or distributed. In some embodiments, the processing device 140 may be local or remote. For example, the processing device 140 may access information and/or data stored in the image acquisition device 110, the terminal(s) 130, and/or the storage device 150 via the network 120. As another example, the processing device 140 may be directly connected to the image acquisition device 110, the terminal(s) 130, and/or the storage device 150 to access stored information and/or data. In some embodiments, the processing device 140 may be implemented on a cloud platform. For example, the cloud platform may include a private cloud, a public cloud, a hybrid cloud, a community cloud, a distributed cloud, an interconnected cloud, a multiple cloud, or the like, or a combination thereof. In some embodiments, the processing device 140 may be implemented by a computing device 200 having one or more components as described in FIG. 2.

The storage device 150 may store data, instructions, and/or any other information. In some embodiments, the storage device 150 may store data obtained from the terminal(s) 130, the image acquisition device 110, and/or the processing device 140. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be executed on a cloud platform. For example, the cloud platform may include a private cloud, a public cloud, a hybrid cloud, a community cloud, a distributed cloud, an interconnected cloud, a multiple cloud, or the like, or a combination thereof.

In some embodiments, the storage device 150 may be connected to the network 120 to communicate with one or more other components (e.g., the processing device 140, the terminal(s) 130, etc.) of the image processing system 100. One or more components of the image processing system 100 may access data or instructions stored in the storage device 150 via the network 120. In some embodiments, the storage device 150 may be directly connected to or communicate with one or more other components (e.g., the processing device 140, the terminal(s) 130, etc.) of the image processing system 100. In some embodiments, the storage device 150 may be part of the processing device 140.

FIG. 2 is a schematic diagram illustrating an exemplary computing device according to some embodiments of the present disclosure. The computing device 200 may be used to implement any component of the image processing system 100 as described herein. For example, the processing device 140 and/or the terminal(s) 130 may be implemented on the computing device 200, respectively, via its hardware, software program, firmware, or a combination thereof. Although only one such computing device is shown, for convenience, the computer functions relating to the image processing system 100 as described herein may be implemented in a distributed manner on a number of similar platforms, to distribute the processing load.

As shown in FIG. 2, the computing device 200 may include a processor 210, a storage 220, an input/output (I/O) 230, and a communication port 240.

The processor 210 may execute computer instructions (e.g., program code) and perform functions of the image processing system 100 (e.g., the processing device 140) in accordance with the techniques described herein. The computer instructions may include, for example, routines, programs, objects, components, data structures, procedures, modules, and functions, which perform particular functions described herein. For example, the processor 210 may process image data obtained from any components of the image processing system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or a combination thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from any component of the image processing system 100. In some embodiments, the storage 220 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

In some embodiments, the storage 220 may store one or more programs and/or instructions to perform exemplary methods described in the present disclosure. For example, the storage 220 may store a program for the processing device 140 to process images generated by the image acquisition device 110.

The I/O 230 may input and/or output signals, data, information, etc. In some embodiments, the I/O 230 may enable user interaction with the image processing system 100 (e.g., the processing device 140). In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network to facilitate data communications. The communication port 240 may establish connections between the processing device 140 and the image acquisition device 110, the terminal(s) 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or a combination thereof. The wireless connection may include a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
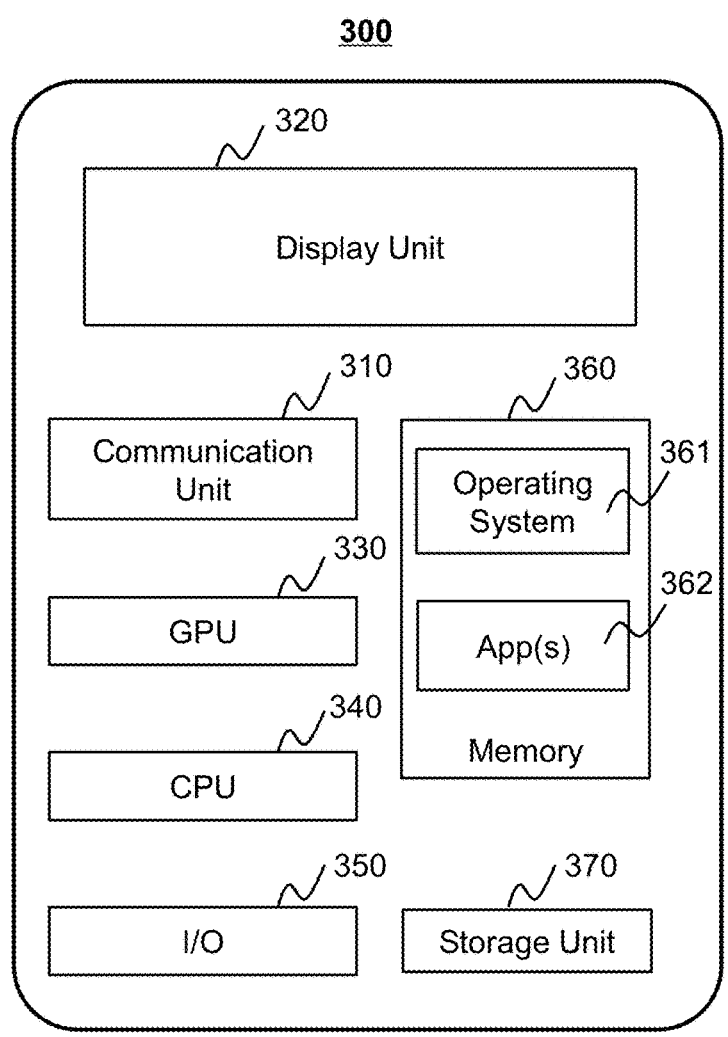
FIG. 3 is a block diagram illustrating an exemplary mobile device on which the terminal(s) may be implemented according to some embodiments of the present disclosure.

FIG. 3 is a block diagram illustrating an exemplary mobile device on which the terminal(s) 130 may be implemented according to some embodiments of the present disclosure.

As shown in FIG. 3, the mobile device 300 may include a communication unit 310, a display unit 320, a graphics processing unit (GPU) 330, a central processing unit (CPU) 340, an I/O 350, a memory 360, a storage unit 370, etc. In some embodiments, any other suitable component, including but not limited to a system bus or a controller (not shown), may also be included in the mobile device 300. In some embodiments, an operating system 361 (e.g., iOS™, Android™ Windows Phone™, etc.) and one or more applications (apps) 362 may be loaded into the memory 360 from the storage unit 370 in order to be executed by the CPU 340. The application(s) 362 may include a browser or any other suitable mobile apps for receiving and rendering information relating to imaging, image processing, or other information from the image processing system 100 (e.g., the processing device 140). User interactions with the information stream may be achieved via the I/O 350 and provided to the processing device 140 and/or other components of the image processing system 100 via the network 120. In some embodiments, a user may input parameters to the image processing system 100, via the mobile device 300.

In order to implement various modules, units and their functions described above, a computer hardware platform may be used as hardware platforms of one or more elements (e.g., the processing device 140 and/or other components of the image processing system 100 described in FIG. 1). Since these hardware elements, operating systems and program languages are common; it may be assumed that persons skilled in the art may be familiar with these techniques and they may be able to provide information needed in the imaging and assessing according to the techniques described in the present disclosure. A computer with the user interface may be used as a personal computer (PC), or other types of workstations or terminal devices. After being properly programmed, a computer with the user interface may be used as a server. It may be considered that those skilled in the art may also be familiar with such structures, programs, or general operations of this type of computing device.

Figure 4:
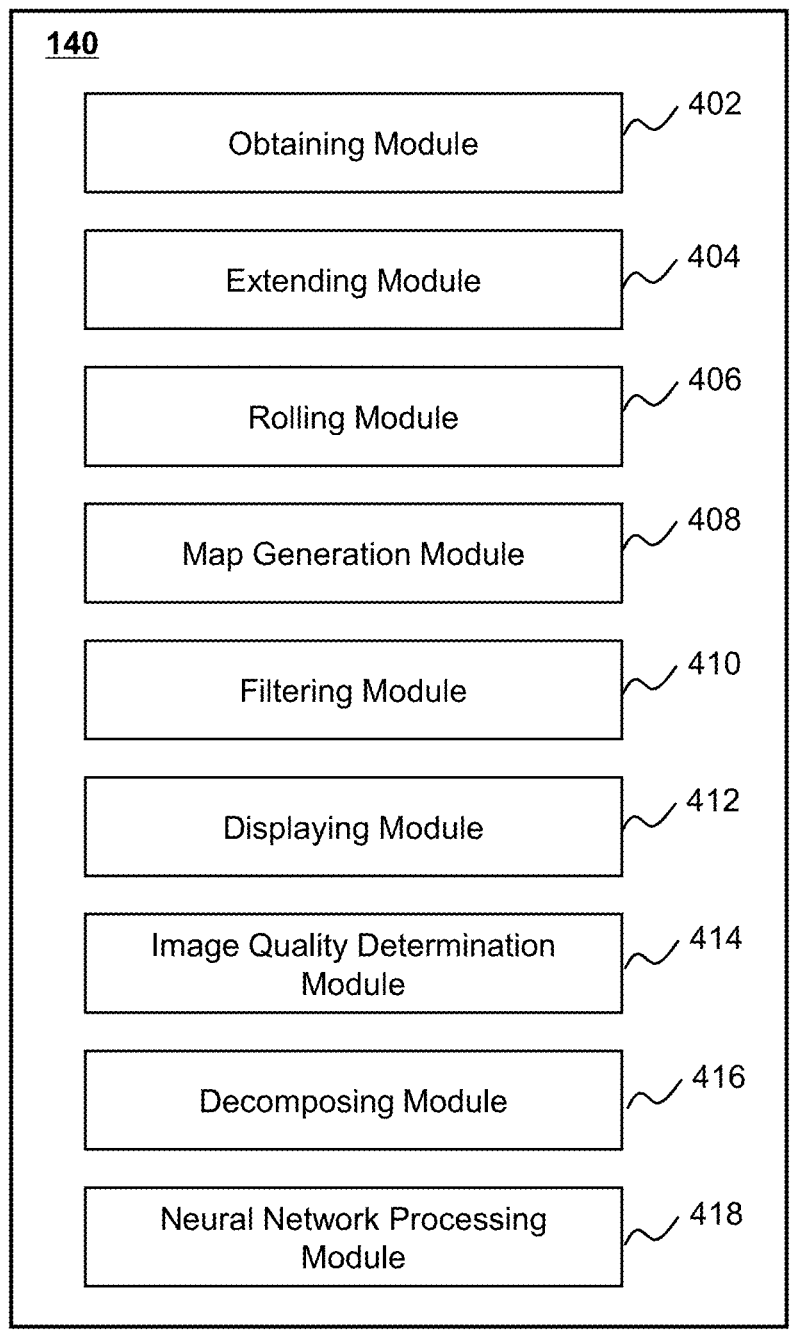
FIG. 4 is a schematic diagram illustrating an exemplary processing device according to some embodiments of the present disclosure.

FIG. 4 is a schematic diagram illustrating an exemplary processing device according to some embodiments of the present disclosure. As shown in FIG. 4, the processing device 140 may include an obtaining module 402, an extending module 404, a rolling module 406, a map generation module 408, a filtering module 410, a displaying module 412, an image quality determination module 414, a decomposing module 416, and a neural network processing module 418.

The obtaining module 402 may be configured to obtain one or more images (e.g., a first image and/or a second image associated with a same object, an initial image).

The extending module 404 may be configured to extend one or more images (e.g., the first image, the second image, the third image, and/or the fourth image).

The rolling module 406 may be configured to generated one or more image blocks (e.g., a plurality of first blocks of the first image, a plurality of second blocks of the second image, a plurality of third blocks of the third image, a plurality of fourth blocks of the fourth image, etc.).

The map generation module 408 may be configured to determine a plurality of first characteristic values based on the plurality of first blocks and the plurality of second blocks, generate a first target map associated with the first image and the second image based on the plurality of first characteristic values, determine a reference map associated with the first image or the second image, determine a fourth target map by fusing the first target map and the reference map. In some embodiments, the map generation module 408 may determine a plurality of second characteristic values based on the plurality of third blocks and the plurality of fourth blocks, generate a second target map associated with the third image and the fourth image based on the plurality of second characteristic values, generate a third target map based on the first target map and the second target map.

The filtering module 410 may be configured to filter one or more images (e.g., the first target map, the second target map, the third target map, the fourth target map, etc.).

The displaying module 412 may be configured to display one or more images (e.g., the first target map, the second target map, the third target map, the fourth target map, the reference map, or the like, or any other image generated by image processing or used for image processing). In some embodiments, the displaying module 412 may display the one or more images using a shifted Jet color map.

The image quality determination module 414 may be configured to determine an image quality of one or more images. For example, the image quality determination module 414 may determine a global image quality metric of the first image and/or the second image based on the first target map.

The decomposing module 416 may be configured to decompose one or more images. For example, the decomposing module 416 may decompose the initial image into a first image, a second image, a third image, and a fourth image.

The neural network processing module 418 may be configured to generate one or more images by processing one or more initial images using a neural network.

More descriptions of the modules of the processing device 140 may be found elsewhere in the present disclosure (e.g., FIGS. 5-8 and descriptions thereof).

It should be noted that the above description of modules of the processing device 140 is merely provided for the purposes of illustration, and not intended to limit the present disclosure. For persons having ordinary skills in the art, the modules may be combined in various ways or connected with other modules as sub-systems under the teaching of the present disclosure and without departing from the principle of the present disclosure. In some embodiments, one or more modules may be added or omitted in the processing device 140. For example, the extending module 404 and the rolling module 406 may be integrated into a single module.

FIG. 5 is a flowchart illustrating an exemplary process for determining a target map according to some embodiments of the present disclosure. In some embodiments, process 500 may be executed by the image processing system 100. For example, the process 500 may be implemented as a set of instructions (e.g., an application) stored in a storage device (e.g., the storage device 150, the storage 220, and/or the storage unit 370). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

Figure 15:
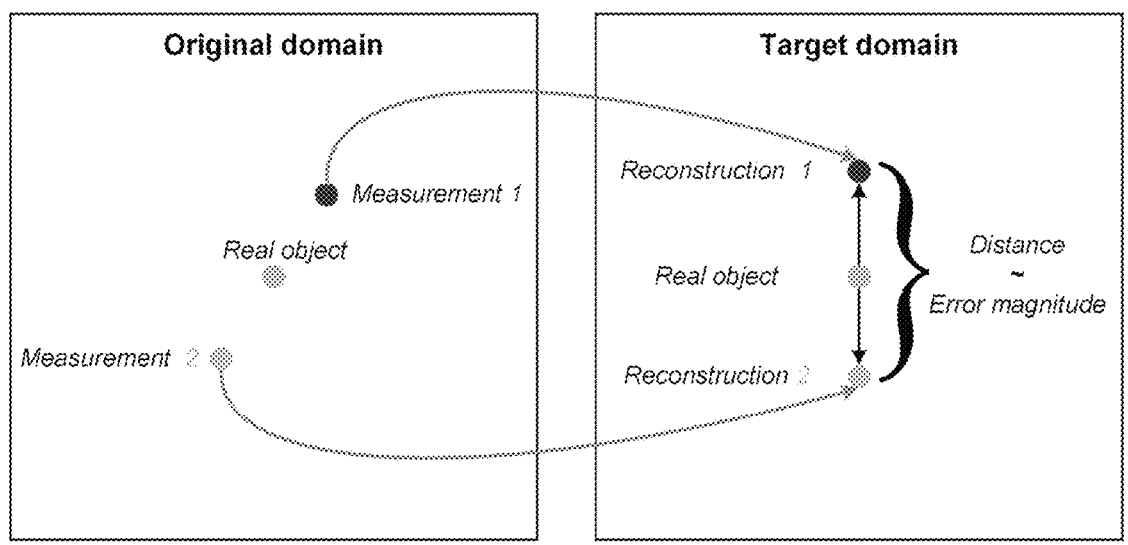
FIG. 15 illustrates an exemplary principle of a target map according to some embodiments of the present disclosure.

In some embodiments, imaging systems (e.g., the image processing system 100) may use an optical device that is mathematically expressed as a transfer function, to observe one or more objects and collect corresponding signals using one or more sensors. In some embodiments, the signals may be sampled by the sensor(s) and/or mixed with noise(s). In some embodiments, artificial observations may deviate from the real-world object(s) in a relatively high dimensional space (e.g., as shown in the left panel of FIG. 15). Under such circumstances, recovering hidden real signals from measured data may be regarded as an ill-posed problem, and reconstructions from these observations may be deviated from the real-world object(s). If two individually measured signals are captured on the same object, these two signals may relate to the identical object. It may be conceivable that the larger the distance between reconstructions of these two signals, the more deviation the reconstructions may exhibit from the real object (e.g., as shown in the right panel of FIG. 15). If this distance (e.g., the distance between Reconstruction 1 and Reconstruction 2) is related to the error of reconstruction (e.g., the deviation of Reconstruction from Real object) and follow the above intuition, a vital hypothesis is that the distance between two reconstructions is in positive correlation to the error magnitude of the reconstructions.

To convincingly verify the hypothesis, the derivation may be restricted under a specific and common circumstance for the fluorescent imaging by a wide-field (WF) microscope, in which the corresponding image may be processed by e.g., a minimalist form of Wiener deconvolution.

A lemma may be described as follows. Under ideal conditions, the object may be observed using an aberration-free optical system, and such observation may be sampled with a infinite sampling rate for noise-free. The minimalist form of Wiener deconvolution may be used to recover the object, as expressed by Equation (1):

$$\text{image}_{decon} = \mathscr{F}\mathscr{i}\left\{\frac{\mathscr{F}^*[h(\omega)]\mathscr{F}^*[\text{image}_{WF}]}{\mathscr{F}^*[h(\omega)]\mathscr{F}^*[h(\omega)]}\right\} \quad (1)$$
$$= \mathscr{F}\mathscr{i}\left\{\frac{\mathscr{F}[(I(\omega) \times o(\omega)) \otimes h(\omega)]}{\mathscr{F}[h(\omega)]}\right\},$$
$$= I(\omega) \times o(\omega)$$

where the ω denotes the spatial coordinate, and the I, o, and h denote the illumination, the object and the point spreading function (PSF) of the microscope, respectively. $\mathscr{F}$ and $\mathscr{F}\mathscr{i}$ denote the Fourier and its inverse Fourier transform operators. However, when considering the joint effects from the sampling and noise, a realistic model of imaging may be expressed as:

$$\text{image}_{WF} = \mathscr{N}\{\mathscr{S}[(I(\omega) \times o(\omega)) \otimes h(\omega)]\}, \quad (2)$$

Where $\mathscr{S}$ and $\mathscr{N}$ denote the sampling and noise model, and the image$_{WF}$ denotes the final image collected by a wide-field microscope. This imaging model may be considered more close to the status in a real physical world, as shown in Equation (2), and may be different from the one from the Wiener model.

$$\text{image}_{WF} = (I(\omega) \times o(\omega)) \otimes h(\omega). \tag{3}$$

The minimalist form of Wiener deconvolution with an aberration-free PSF (unbiased estimation) may be used to process the image$_{WF}$ giving as:

$$\begin{aligned}\text{image}_{decon} &= \mathcal{F}^{-1}\left[\frac{\mathcal{F}^*[h(\omega)]\mathcal{F}^*\{\text{image}_{WF}\}}{\mathcal{F}\{h(\omega)\}\mathcal{F}^*[h(\omega)]}\right] \\ &= \mathcal{F}^{-1}\left|\frac{\mathcal{F}^*[h(\omega)]\mathcal{F}^*\langle\mathcal{M}\{\mathcal{S}[(I(\omega)\times o(\omega))\otimes h(\omega)]\}\rangle}{\mathcal{F}[h(\omega)]\mathcal{F}^*[h(\omega)]}\right| \\ &\neq I(\omega)\times o(\omega)\end{aligned} \tag{4}$$

The corresponding result image$_{decon}$ in Equation (4) may be evidently at some distance from the real object.

The lemma described above may imply that the distance between the real object and a reconstruction result is mainly caused by the joint effects from sampling rate and mixture noise. According to this Lemma, if the variable(s) is controlled to image the identical real object and capture the statistically independent image pair, such distance between reconstruction and object may be highlighted by the difference between reconstructions from the image pair in case of using the proper reconstruction model.

A corollary may be described as follows. If there are two individually measured wide-field images on the same sample (or object), these two images may show the identical object. The larger the distance remains between the two corresponding reconstruction results, the more deviation reconstruction results may appear from the real object (see FIG. 15).

This distance (e.g., Wiener result$_1$ versus Wiener result$_2$) may be related to the errors of reconstruction (e.g., differences between Wiener result$_1$ and Wiener result$_2$ versus Real object). In some embodiments, the distance may be expressed as:

$$\left\|\begin{aligned}&\left|\mathcal{F}^{-1}\left|\frac{\mathcal{F}^*\langle\mathcal{M}_1\{\mathcal{S}_1[(I(\omega)\times o(\omega))\otimes h(\omega)]\}\rangle}{\mathcal{F}^*[h(\omega)]}\right|\right|,\\ &\left|\mathcal{F}^{-1}\left|\frac{\mathcal{F}^*\langle\mathcal{M}_2\{\mathcal{S}_2[(I(\omega)\times o(\omega))\otimes h(\omega)]\}\rangle}{\mathcal{F}^*[h(\omega)]}\right|\right|\end{aligned}\right\|_D : \left\|\begin{aligned}&\left|\mathcal{F}^{-1}\left|\frac{\mathcal{F}^*\langle\mathcal{M}_1\{\mathcal{S}_1[(I(\omega)\times o(\omega))\otimes h(\omega)]\}\rangle}{\mathcal{F}^*[h(\omega)]}\right|\right|,\\ &I(\omega)\times o(\omega)\end{aligned}\right\|_D U \left\|\begin{aligned}&\left|\mathcal{F}^{-1}\left|\frac{\mathcal{F}^*\langle\mathcal{M}_2\{\mathcal{S}_2[(I(\omega)\times o(\omega))\otimes h(\omega)]\}\rangle}{\mathcal{F}^*[h(\omega)]}\right|\right|,\\ &I(\omega)\times o(\omega)\end{aligned}\right\|_D, \tag{5}$$

where U denotes the union operation and $\|\text{Wiener}_1, \text{Wiener}_2\|_D$ represents the distance between Wiener result$_1$ and Wiener result$_2$. Wiener result$_1$ and Wiener result$_2$ may refer to reconstruction results generated based on the Wiener model, respectively. $\mathcal{M}_{1,1}$, $\mathcal{M}_{1,2}$, $\mathcal{S}_{2,1}$ and $\mathcal{S}_{2,2}$ denote the two separate noise models ($\mathcal{M}_{1,1}$ and $\mathcal{M}_{1,2}$) and sampling models ($\mathcal{S}_{2,1}$ and $\mathcal{S}_{2,2}$), respectively. In some embodiments, Equation (5) may be modified by taking the Fourier transform of both sides:

$$\left\|\begin{aligned}&\frac{\mathcal{F}\langle\mathcal{M}_1\{\mathcal{S}_1[(I(\omega)\times o(\omega))\otimes h(\omega)]\}\rangle}{\mathcal{F}^*[h(\omega)]},\\ &\frac{\mathcal{F}\langle\mathcal{M}_2\{\mathcal{S}_2[(I(\omega)\times o(\omega))\otimes h(\omega)]\}\rangle}{\mathcal{F}^*[h(\omega)]}\end{aligned}\right\|_D : \left\|\begin{aligned}&\frac{\mathcal{F}\langle\mathcal{M}_1\{\mathcal{S}_1[(I(\omega)\times o(\omega))\otimes h(\omega)]\}\rangle}{\mathcal{F}^*[h(\omega)]},\\ &\mathcal{F}[I(\omega)\times o(\omega)]\end{aligned}\right\|_D U \left\|\begin{aligned}&\frac{\mathcal{F}\langle\mathcal{M}_2\{\mathcal{S}_2[(I(\omega)\times o(\omega))\otimes h(\omega)]\}\rangle}{\mathcal{F}^*[h(\omega)]},\\ &\mathcal{F}[I(\omega)\times o(\omega)]\end{aligned}\right\|_D. \tag{6}$$

In some embodiments, the following two direct combinations (i.e., the combinations that use addition in Euclidean distance or multiplication in cross-correlation distance rather than union) of the distances for "Wiener result$_1$ and Wiener result$_2$" from the real object may be not accurate compared to the union operation in Equation (6). In some embodiments, the actual model of union operation in real world may be incredibly complicated, hence the combination of the two distances (reconstruction and real object) may be hard to express explicitly. In some embodiments, the following two concise examples may be employed to illustrate the relations between the distance of two individual reconstructions and the real error of reconstructions.

A first example relates to Euclidean distance. The Euclidean distance may be used to define the distance between two reconstructions. The addition operation may be utilized to combine the distance, assuming that the image is captured with infinite sampling rate, and it is only corrupted with the additive noise denoted as n:

$$\frac{\left\|\mathscr{F}\left\{I(\omega) \times o(\omega) + \frac{n_1}{h(\omega)}\right\}\right\|^2}{\left\|\mathscr{F}\left\{I(\omega) \times o(\omega) + \frac{n_2}{h(\omega)}\right\}\right\|_2} : \frac{\left\|\mathscr{F}\left\{I(\omega) \times o(\omega) + \frac{n_1}{h(\omega)}\right\}\right\|^2}{\left\|\mathscr{F}\langle I(\omega) \times o(\omega)\rangle\right\|_2} + \frac{\left\|\mathscr{F}\left\{I(\omega) \times o(\omega) + \frac{n_2}{h(\omega)}\right\}\right\|^2}{\left\|\mathscr{F}\langle I(\omega) \times o(\omega)\rangle\right\|_2} \quad (7)$$

where $\|\text{Wiener}_1, \text{Wiener}_2\|_2$ represents the Euclidean distance between Wiener result$_1$ and Wiener result$_2$. $n_1$ and $n_2$ denote the separate additive noise in the two observations. In some embodiments, Equation (7) may be simplified to obtain the following Equation:

$$\sum \mathscr{F}\left\{\frac{n_1 - n_2}{h(\omega)}\right\}^2 : \sum \mathscr{F}\left\{\frac{n_1}{h(\omega)}\right\}^2 + \sum \mathscr{F}\left\{\frac{n_2}{h(\omega)}\right\}^2. \quad (8)$$

The Fourier transform and PSF of the microscope may be removed to simplify the Equation (8) as:

$$\sum n_1^2 + n_2^2 - \sum 2n_1 \cdot n_2 : \sum n_1^2 + n_2^2. \quad (9)$$

The Equation (9) shows the close relation between the Euclidean distance of Wiener result$_1$ and Wiener result$_2$ and the Euclidean distance of Wiener result$_1$ and Real object plus the Euclidean distance of Wiener result$_2$ and Real object.

A second example relates to cross-correlation distance. Alternatively, if the cross-correlation is used as the distance, the addition operation in Euclidean distance computation may need to be modified to the multiplication:

$$\frac{\sum \mathscr{F}_{n_1} \cdot \mathscr{F}_{n_2}^*}{\sqrt{\sum \mathscr{F}_{n_1}^2 \cdot \sum \mathscr{F}_{n_2}^2}} : \frac{\sum \mathscr{F}_{I}^* \cdot \mathscr{F}_{n_1}}{\sqrt{\sum \mathscr{F}_{I}^2 \cdot \sum \mathscr{F}_{n_1}^2}} \times \frac{\sum \mathscr{F}_{I}^* \cdot \mathscr{F}_{n_2}}{\sqrt{\sum \mathscr{F}_{I}^2 \cdot \sum \mathscr{F}_{n_2}^2}}, \quad (10)$$

where $\mathscr{F}_{n_1}$, $\mathscr{F}_{n_2}$, and $\mathscr{F}_I$ represent the Fourier transforms of Wiener result$_1$, Wiener result$_2$, and the real object, respectively. The following Equation may be derived:

$$\frac{\sum \mathscr{F}^*(O + n_1) \cdot \mathscr{F}^*(O + n_2)}{\sqrt{\sum \mathscr{F}^*(O + n_1)^2 \cdot \sum \mathscr{F}^*(O + n_2)^2}} : \quad (11)$$

$$\frac{\sum \mathscr{F}^*(O) \cdot \mathscr{F}^*(O + n_1)}{\sqrt{\sum \mathscr{F}^*(O)^2 \cdot \sum \mathscr{F}^*(O + n_1)^2}} \times \frac{\sum \mathscr{F}^*(O) \cdot \mathscr{F}^*(O + n_2)}{\sqrt{\sum \mathscr{F}^*(O)^2 \cdot \sum \mathscr{F}^*(O + n_2)^2}},$$

$$= \frac{\sum \mathscr{F}^*(O) \cdot \mathscr{F}^*(O + n_1) \cdot \sum \mathscr{F}^*(O) \cdot \mathscr{F}^*(O + n_2)}{\sum \mathscr{F}^*(O)^2 \cdot \sqrt{\sum \mathscr{F}^*(O + n_1)^2 \cdot \sum \mathscr{F}^*(O + n_2)^2}}$$

where $O$, $n_1$, and $n_2$ denote $I(\omega) \times o(\omega)$, $n_1/h(\omega, 0)$, and $n_2/h(\omega, 0)$, respectively. In some embodiments, the Equation (11) may be further simplified by removing the Fourier transforms:

$$\frac{\sum (O^2 + O \cdot n_1 + O \cdot n_2)}{\sqrt{\sum (O + n_1)^2 \cdot \sum (O + n_2)^2}} + \frac{\sum (n_1 \cdot n_2)}{\sqrt{\sum (O + n_1)^2 \cdot \sum (O + n_2)^2}} \quad (12)$$

$$: \frac{\sum (O^2 + O \cdot n_1 + O \cdot n_2)}{\sqrt{\sum (O + n_1)^2 \cdot \sum (O + n_2)^2}} + \frac{\frac{1}{\sum O^2} \cdot \sum O \cdot n_1 \cdot \sum O \cdot n_2}{\sqrt{\sum (O + n_1)^2 \cdot \sum (O + n_2)^2}}.$$

Similar to Euclidean distance, Equation (12) shows a close relation between the cross-correlation (e.g., the cross-correlation between Wiener result$_1$ and Wiener result$_2$) and the multiplication of cross-correlation (e.g., the cross-correlation between Wiener result$_1$ and Real object, the cross-correlation between Wiener result$_2$ and Real object, etc.).

As shown above, the Euclidean distance and/or the cross-correlation may be used to estimate the distance between real object and reconstructions. In some embodiments, one of the Euclidean distance and/or the cross-correlation may be chosen to quantitatively map such distance in multiple dimensions (2D image or 3D volume). In some embodiments, a distance map may be generated to illustrate the distances. Conventional spatial processing algorithms, such as root-mean-square error in RSM, may be commonly sensitive to the intensity and micro-movements during measurements. Besides, many of the processing algorithms may be used to generate "absolute differences" which may misleadingly induce a relatively strong false negative result and overwhelm the true negative in distance map(s).

Based on above considerations, in some embodiments, an algorithm may be introduced to measure the distance between two signals in the Fourier domain, namely, Fourier ring correlation (FRC) or spectral signal-to-noise ratio (SSNR) which may describe the highest acceptable frequency component between two signals. In some embodiments, the FRC metric may be employed as an effective resolution criterion for super-resolution fluorescence and electron microscopy. In some embodiments, the FRC metric may be used to quantify the similarity (or distance) between two signals. The FRC metric may be insensitive to the intensity changes and micro-movements, and it may quantify the "relative error" or "saliency-based error" (e.g., the highest credible frequency component), and the false negative induced by the "absolute distance" quantification may be largely reduced. In addition, it may be assumed that the aberration of the system (i.e., the system that is used to generate the signals of the object) may not change during such two independent observations. The aberration-induced errors (i.e., biased estimation) may be difficult to estimate using simple spatial or frequency algorithms. These errors may be visible because the FRC defines the most reliable frequency component. In some embodiments, the FRC may be used to quantify the distance between two signals. More descriptions of FRC may be found elsewhere in the present disclosure (e.g., operation 508 in FIG. 5, operations in FIGS. 6A-6D, and the descriptions thereof).

In some embodiments, considering the FRC as a global similarity estimation between two images, the FRC metric may be extended to a rolling FRC (rFRC) map to provide local distance measurements at the pixel-level. In some embodiments, the errors in the multi-dimensional reconstructed signals may be quantitatively mapped even without ground-truth. In some embodiments, in case of a same area of both images is blank (but the ground-truth has contents), such information may lose in a same region of the images, which may lead to a small FRC value. In another word, if the two reconstructed signals lose an identical component (even if this situation may be rare), the rFRC may introduce false positive. Therefore, in some embodiments, the modified resolution scaled error map (RSM) may be introduced as an accompanied error map to moderate such imperfection of rFRC map.

In some embodiments, the RSM may be built up on one or more of the three assumptions:
(i). Due to that the RSM requires the corresponding diffraction-limited wide-field image as the reference, the wide-field image may need to have a sufficient high SNR. Otherwise the noise contained in the wide-field image may induce a relatively strong false negative result.
(ii). The transformation from super-resolution (SR) scale to low-resolution (LR) scale may be approximate as a global spatially invariant (in the whole field of view) Gaussian kernel convolution. If the conversion from super-resolution to low-resolution images are not restricted to such spatially invariant Gaussian model, it may produce a relatively strong false negative result.
(iii). The illumination and emission fluorescence intensity may need to be homogeneous. The produced RSM may be weighted by the illumination intensity and the emission fluorescence intensity of a corresponding label.

According to the above assumptions, the RSM itself may introduce the false negative (i.e., model error) in the estimated error map(s). Under the configurations of single molecular localization microscopy (SMLM), the (i) and (ii) assumptions may be satisfied. For the first assumption, the wide-field image of SMLM may be created by averaging thousands of blinking frames, which may remove the noise and generate a reference wide-field image with a relatively high SNR. Regarding the second assumption, if the imaging field has a relatively small field-of-view, it may be normally treated as undergoing the uniform illumination. Additionally, due to that such error estimation of RSM is calculated in the low-resolution scale, the RSM may be capable of finding the errors in low-resolution scale (usually large magnitude error components), such as misrepresentation or disappearance of structures. The errors in super-resolution scale (small magnitude error components) estimated by RSM may be generally the false negative. To reduce such potential false negative, the normalized RSM may be segmented (e.g., less than 0.5 is set to 0) to remove the corresponding small magnitude error components, leaving the strong magnitude components to visualize the lost information of reconstruction possibly ignored by the rFRC map. Overall, the rFRC map and the segmented normalized RSM may be merged (e.g., in green and red channel respectively) to generate a full PANEL map (see FIG. 16), thereby mapping and visualizing the errors in the reconstructed results accurately and comprehensively. More descriptions of the determination of RSM may be found elsewhere in the present disclosure (e.g., operation 518 in FIG. 5, operations in FIG. 7, and the description thereof). More descriptions of the determination of the rFRC map may be found elsewhere in the present disclosure (e.g., operations 502-516 in FIG. 5, operations in FIG. 8, and the description thereof). More descriptions of the determination of a PANEL map may be found elsewhere in the present disclosure (e.g., operation 520 in FIG. 5 and the description thereof).

In 502, the processing device 140 (e.g., the acquisition module 402) may obtain a first image and a second image associated with a same object. In some embodiments, the processing device 140 may obtain the first image and/or the second image from one or more components of the image processing system 100. For example, the image acquisition device 110 may collect and/or generate the first image and/or the second image and store the image(s) in the storage device 150 or any other storage associated with the image processing system 100. The processing device 140 may retrieve and/or obtain the image(s) from the storage device 150 or any other storage. As another example, the processing device 140 may directly obtain the image(s) from the image acquisition device 110. In some embodiments, the processing device 140 may obtain one or more initial images, process the initial image(s), and/or generate the first image and/or the second image. In the present disclosure, "image," "image frame," and "frame" are used interchangeably. In some embodiments, the first image and the second image may be 2D or 3D images. It should be noted that the description of an image (e.g., the first image, the second image) being a 2D image is merely provided for the purposes of illustration, and not intended to limit the scope of the present disclosure.

The object may include a non-biological object or a biological object. Exemplary non-biological objects may include a phantom, an industrial material, or the like, or any combination thereof. Exemplary biological objects may include biological structures, biological issues, proteins, cells, microorganisms, or the like, or any combination thereof. In some embodiments, the object may be fluorescent or fluorescent-labeled. The fluorescent or fluorescent-labeled objects may be excited to emit fluorescence for imaging.

Figure 12A:
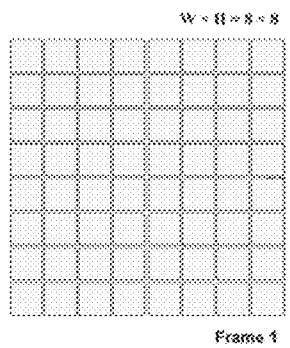
FIGS. 12A-12H illustrate an exemplary process for determining a target map according to some embodiments of the present disclosure.

In some embodiments, the first image and the second image may be generated from physical imaging. In some embodiments, the first image and the second image may be two consecutive images (e.g., frame 1 and frame 2 illustrated in FIG. 9A) obtained from twice image-capturing of the same object by the image acquisition device 110. In some embodiments, the first image and the second image may be obtained from once image-capturing of the same object by the image acquisition device 110. For example, the first image and the second image may be obtained by decomposing an initial image captured by the image acquisition device 110. As shown in FIG. 12A, frame 1 represents the initial image, and the frame 1 may be decomposed into two or more images (e.g., the first image, the second image, a third image, and a fourth image, etc.). More descriptions regarding generating a target map (e.g., a third target map) based on a single image may be found elsewhere in the present disclosure (e.g., FIG. 8 and the description thereof).

In some embodiments, the first image and/or the second image may have a relatively high resolution (e.g., super-resolution).

Figure 13:
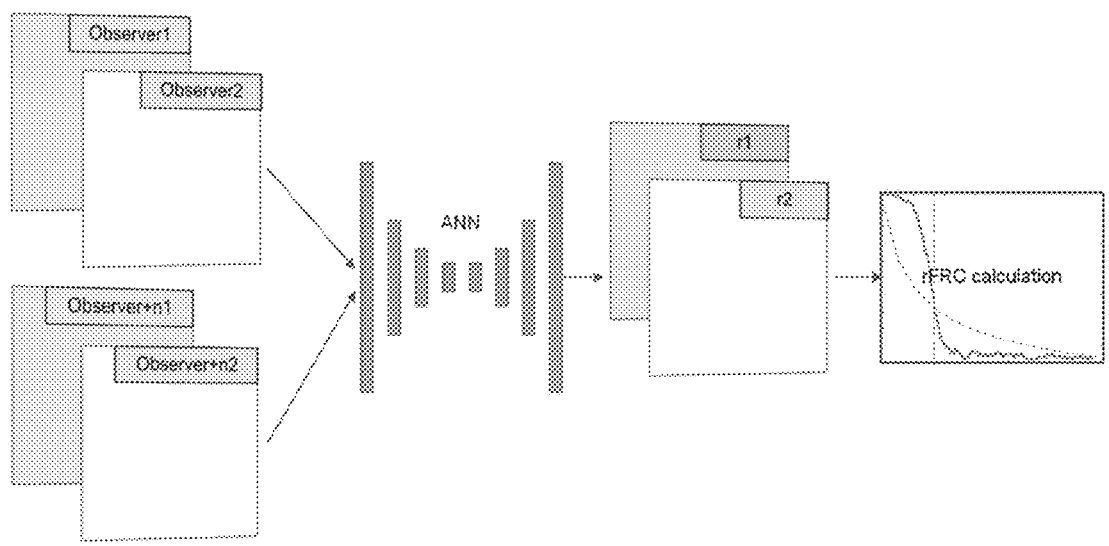
FIG. 13 illustrates another exemplary process for determining a target map according to some embodiments of the present disclosure.

In some embodiments, the first image and the second image may be obtained from two initial images based on a neural network. The processing device 140 may obtain a first initial image and a second initial image associated with the same object from one or more components of the image processing system 100 (e.g., the image acquisition device 110, the storage device 150). In some embodiments, the first initial image and/or the second initial image may have a relatively low resolution, and the first image and/or the second image may have a relatively high resolution. In some embodiments, the processing device 140 (e.g., the neural network processing module 418) may generate the first image and the second image by processing the first initial image and the second initial image using the neural network (or artificial neural network (ANN)), respectively. Exemplary neural networks may include a constitutional neural network (CNN), a deep learning network, a support vector machine (SVM), k-nearest neighbor (KNN), a back-propagation neural network (BPNN), a deep neural network (DNN), a Bayesian neural network (BNN), or the like, or any combination thereof. In some embodiments, the processing device 140 may generate the first image and the second image by processing the first initial image and the second initial image based on a neural network model, respectively. For example, the first initial image and/or the second initial image may be input to the neural network model. The neural network model may output the first image and/or the second image. The first image and the second image may be two frame images used to generate a first target map (e.g., an rFRC map) as illustrated in 510. In some embodiments, the rFRC map may reflect errors (e.g., in pixel-level) generated during processing (e.g., reconstruction) using the neural network. As shown in FIG. 13, observers 1 and 2 represent the first and second initial images, respectively, and r1 and r2 represent the first image and the second image output by the neural network, respectively.

In some embodiments, the first image and/or the second image may be generated from a single initial image using a neural network. In some embodiments, the processing device 140 (e.g., the neural network processing module 418) may generate the first image and the second image by processing the single initial image using the neural network. The neural network reconstruction techniques may be different from the physical imaging reconstruction techniques. For example, the adjacent pixels in an image output from the neural network (e.g., DNN) may be regarded as noise independent. Therefore, the determination of the rFRC map based on a single frame used in the physical imaging may not be applied to such neural network reconstruction directly. A different single-frame strategy may be used to determine the rFRC map for the neural network (e.g., DNNs). In some embodiments, a noise (e.g., Gaussian noise) may be added into the initial image. Exemplary noises may include Gaussian noise, impulsive noise, Rayleigh noise, Gamma noise, exponential noise, uniform noise, or the like, or any combination thereof. For example, the single initial image may be obtained as a first initial image, and a second initial image may be generated by adding noise (e.g., noise magnitude of 0.5%, 1.5%, 2%, etc.) to the first initial image. Thus, the two images (i.e., the first initial image, the second initial image) may be used as inputs of the neural network. Then, after reconstructing these two input images (i.e., the first initial image, the second initial image) respectively using the neural network, the resulting two output images may be obtained as the first image and the second image. The two output images may be further used to determine an rFRC map. In some embodiments, two noises may be added into the initial image to obtain two different images. For example, a first initial image (see an image represented by "observer+n1" in FIG. 13) may be generated by adding a first noise to the initial image; and a second initial image (see an image represented by "observer+n2" in FIG. 13) may be generated by adding a second noise to the initial image. In some embodiments, the type of the first noise may be the same as that of the second noise but the noise magnitude of the two may be different. In some embodiments, the type of the first noise may be different from that of the second noise but the noise magnitude of the two may be the same. In some embodiments, the types of the first noise and the second noise may be different, and the magnitudes of the first noise and the second noise may be different. Thus, the two images (i.e., the first initial image, the second initial image) may be used as input of the neural network. Then, after reconstructing these two input images (i.e., the first initial image, the second initial image) respectively using the neural network, the resulting two output images may be obtained as the first image and the second image. The two output images may be further used to determine an rFRC map. In some embodiments, the magnitude(s) of noise(s) added into the initial image may be determined according to specific situations, and the present description is not intended to limit the scope of the present disclosure.

In 504, the processing device 140 (e.g., the extending module 404) may extend the first image and/or the second image.

In some embodiments, the processing device 140 may extend the first image and/or the second image by performing a padding operation around the first image and/or the second image, respectively. Performing a padding operation around an image means that data may be padded into one or more regions adjacent to the edge(s) of the image. In some embodiments, the region(s) to be padded may have one or more predetermined sizes. For example, a region to be padded may have a width that is a half of a width of a block (e.g., the block described in 506). In some embodiments, the padded data may have one or more predetermine value(s), e.g., 0, 1, 2, or any other value. In some embodiments, the padded data may be determined based on pixel value(s) of the image to be extended. In some embodiments, the data may be padded symmetrically around the image (see FIG. 9A).

In 506, the processing device 140 (e.g., the rolling module 406) may determine a plurality of first blocks of the first image and a plurality of second blocks of the second image.

In some embodiments, the processing device 140 may determine the plurality of first blocks of the first image and the plurality of second blocks of the second image by performing a rolling operation on the first image and the second image, respectively. In some embodiments, the rolling operation may be performed by sliding a window across an image (e.g., the (extended) first image, the (extended) second image). In the rolling operation, the window may slide row by row and/or column by column across the image, and a designated center of the window may traverse one or more pixels (e.g., each pixel) of the image. In some embodiments, the window may have a predetermined size (e.g., 32×32, 64×64, 128×128, etc.). The predetermined size of the window may be determined by the image processing system 100, or may be preset by a user or operator via the terminal(s) 130. In some embodiments, the size of the window may be associated with the size of the first image and/or the second image. For example, the window may have a less size than the first image and/or the second image. The window may have various shapes. For example, the window may be square, rectangle, circular, oval, etc. In some embodiments, the window used for the first image may be the same as that used for the second image.

In some embodiments, the window may be slid across the (extended) first image pixel by pixel to generate the plurality of first blocks of the first image. As used herein, a block of the image may refer to a portion of the image. When the window slides across an image (e.g., the (extended) first image), a portion of the image (e.g., the (extended) first image) may be enclosed by the window, and the portion of the image (e.g., the (extended) first image) enclosed by the window may be designated as a block of the image (e.g., a first block of the first image). Accordingly, a plurality of first blocks of the first image may be determined by sliding the window across the entire (extended) first image. Similarly, a plurality of second blocks of the second image may be determined by sliding the window across the entire (extended) second image. In some embodiments, the plurality of second blocks and the plurality of first blocks may be in one-to-one correspondence. In some embodiments, a number or count of the first blocks (or the second blocks) may be the same as a number or count of the pixels of the first image (or the second image) obtained in 502.

Although the rFRC is the error map allowing the evaluation at pixel level, the finest scale of the detectable errors can only reach the highest resolution of the corresponding images (e.g., the first image, the second image). Therefore, if the image (e.g., the first image, the second image) satisfies the Nyquist-Shannon sampling theorem, the pixel-by-pixel rolling operation may be not necessary. In some embodiments, the smallest error may be larger than ~3×3 pixels. Accordingly, 2-4 pixels may be skipped for each rolling operation to obtain a 4-16 times acceleration for rFRC mapping computation. In some embodiments, the plurality of first blocks (or the plurality of second blocks) may be determined by sliding the window across the (extended) first image (or the (extended) second image) and skipping a predetermined count of pixels across the (extended) first image (or the (extended) second image). For example, if the window slides to a position of the (extended) first image (or the (extended) second image), a first block of the first image (or a second block of the second image) may be determined, and then the window may skip a predetermined count of pixels across the (extended) first image (or the (extended) second image), and slide to a next positon of the (extended) first image (or the (extended) second image), and another first block of the first image (or another second block of the second image) may be determined. Accordingly, a number or count of the first blocks (or the second blocks) may be less than the number or count of the pixels of the first image (or the second image) obtained in 502. The predetermined count of pixels may be determined by the image processing system 100, or may be preset by a user or operator via the terminal(s) 130. In some embodiments, the predetermined count of pixels may be associated with the size of the window. For example, the predetermined count of pixels (e.g., 2, 3, or 4) may be close to the width of the window (e.g., 3). In some embodiments, the predetermined count of pixels may be random.

In 508, the processing device 140 (e.g., the map generation module 408) may determine a plurality of first characteristic values based on the plurality of first blocks and the plurality of second blocks.

A first characteristic value may refer to a value associated with a pixel value of a first target map (i.e., an rFRC map). For example, a first characteristic value corresponding to a pixel of the first target map may be associated with a correlation of a first block and a second block whose central pixels correspond to the pixel of the first target map. In some embodiments, at least one of the first characteristic values may be determined based on a correlation between a first block of the plurality of first blocks and a corresponding second block. The correlation between the first block and the corresponding second block may be represented by a correlation value (or referred to as a FRC value). In some embodiments, the correlation between the first block and the corresponding second block may be determined by performing a Fourier transform on the first block and the second block, respectively. For example, the processing device 140 may determine a first intermediate image in a frequency domain based on the first block (e.g., by performing a Fourier transform on the first block). The processing device 140 may determine a second intermediate image in a frequency domain based on the second block (e.g., by performing a Fourier transform on the second block). In some embodiments, the processing device 140 may determine a target frequency (also referred to as a cut-off frequency) based on the first intermediate image and the second intermediate image. The processing device 140 may determine a first characteristic value based on the target frequency. For example, the processing device 140 may determine the target frequency, a reciprocal of the target frequency, or a product of the reciprocal of the target frequency and a pixel size (e.g., the physical dimension of a camera pixel divided by the magnification of image(s) (e.g., the first image, the second image, etc.)) of the first image (and/or the second image), or the like, as the first characteristic value. More descriptions regarding determining the plurality of first characteristic values may be found elsewhere in the present disclosure (e.g., FIGS. 6A-6D).

In some embodiments, there may be background area(s) in the first image and/or the second image. In some embodiments, the information of the background area(s) may remain unchanged or vary slightly in the first image and the second image. In some embodiments, an FRC computation for the background area(s) may be avoided to reduce the computing burden. An FRC computation may refer to an operation to determine a FRC value. In this case, the first characteristic values for the background area(s) may be determined based on one or more predetermined values. In some embodiments, for a first block and a corresponding second block, the processing device 140 may determine whether to perform an FRC computation (or whether the first block and/or the corresponding second block are background area(s)) before determining the first characteristic value. More descriptions regarding determining the first characteristic value(s) may be found elsewhere in the present disclosure (e.g., FIG. 6A).

In 510, the processing device 140 (e.g., the map generation module 408) may generate a first target map associated with the first image and the second image based on the plurality of first characteristic values.

As used herein, the first target map (e.g., an rFRC map) may refer to an image illustrating reconstruction errors and/or artifacts of the first image and/or the second image obtained in 502. The first target map may include a plurality of pixels, and the value of each pixel may be determined based on a first characteristic value. The first target map may have a same size as the first image and/or the second image. In some embodiments, a pixel value determined based on a first characteristic value may be assigned to a pixel (of the target map) that corresponds to a central pixel of a first block or second block (that is used to determine the first characteristic value). That is, the pixels of the first target map may correspond to the pixels of the first image and/or the second image. In some embodiments, because the pixels of the first target map and that of the first image (and/or the second image) are in one-to-one correspondence, the first target map may reflect the quality of an image (e.g., the first image and/or the second image) in pixel-level. In some embodiments, if the pixel values of the pixels of the first target map are determined as the reciprocals of the target frequencies, which means resolutions, the smaller the pixel values (i.e., resolutions), the higher the accuracy of the pixels of the first image and/or the second image, and the larger the pixel values (i.e., resolutions), the lower the accuracy of the pixels of the first image and/or the second image. A relatively low accuracy of the pixels herein may indicate an error. In some embodiments, if the pixel values of the pixels of the first target map are determined as the target frequencies, which means spatial frequencies, the smaller the pixel values (i.e., spatial frequencies), the lower the accuracy of the pixels of the first image and/or the second image, and the larger the pixel values (i.e., spatial frequencies), the higher the accuracy of the pixels of the first image and/or the second image. In some embodiments, if the pixel values of the pixels of the first target map are determined as the product of the reciprocals of the target frequencies and the pixel sizes of the first image and/or the second image, the smaller the pixel values, the higher the accuracy of the pixels of the first image and/or the second image, and the larger the pixel values, the lower the accuracy of the pixels of the first image and/or the second image.

In some embodiments, the first target map may quantitatively present the resolution of each pixel of the first image and/or the second image, thereby indicating errors (and/or artifacts) present in the first image and/or the second image. Thus, using the target map (e.g., the first target map), the errors (and/or artifacts) may be visualized more intuitionally. Merely by way of example, if the first image and/or the second image have a resolution of 100 nm, and a resolution of a pixel is determined as 10 nm, then it may be indicated that the pixel is accurate and there is no error in reconstructing the pixel; if the first image and/or the second image have a resolution of 100 nm, and a resolution of a pixel is determined as 200 nm, then it may be indicated that the pixel is not accurate and there is an error in reconstructing the pixel.

In some embodiments, the first target map may be expressed in the form of a grey-scale image. In some embodiments, the grey value of each pixel of the first target map may be in positive correlation with the first characteristic value, and degree of gray of the first target map may reflect the quality (or error) of the first image and/or the second image.

In some embodiments, if the skipping operation is performed in 506, the first target map may be resized to the original image size of the first image and/or the second image (e.g., by a bilinear interpolation) for a better visualization.

In 512, the processing device 140 (e.g., the filtering module 410) may filter the first target map. In some embodiments, the processing device 140 may filter the first target map using an adaptive median filter.

In some embodiments, according to the Nyquist sampling theorem, a smallest error of the first image and/or the second image that the operations of the present disclosure can detect may be larger than, for example, 3×3 pixels. Therefore, the rolling operation in a small region (e.g., 3×3 pixels) may change smoothly without any isolated pixels (e.g., ultra-high or ultra-low pixels compared to nearby pixels). However, the FRC computation may be unstable, and abnormal characteristic values may be determined due to improper target frequency determination. In some embodiments, the adaptive median filter may be used to remove these improper characteristic values at these pixels. In some embodiments, the adaptive median filter may replace each pixel with a median of neighboring pixel values in a filtering window of the first target map. In some embodiments, a threshold may be used in the adaptive median filter. For example, if a pixel value (e.g., a gray value) of a pixel is larger than a product of the threshold and a median of neighboring pixel values in a filtering window, the pixel value may be replaced by the median; otherwise, the filtering window may move to the next pixel. By using the adaptive median filter, isolated pixels may be filtered without blurring the rFRC map. In some embodiments, the threshold (e.g., 2) may be determined by the image processing system 100, or may be preset by a user or operator via the terminal(s) 130.

In 514, the processing device 140 (e.g., the image quality determination module 414) may determine a global image quality metric of the first image and/or the second image based on the first target map.

The rFRC map generated in 510 may be used to quantitively visualize the errors included in the image(s) (e.g., the first image, the second image). In addition to such local quality assessment, a global image quality metric of the first image and/or the second image may be determined. In some embodiments, the global image quality metric may have a dimension as resolution. In some embodiments, the global image quality metric may be normalized without considering the dimension.

In some embodiments, a global image quality metric with the dimension as resolution may be expressed as follows:

$$\frac{\sum_{FV \neq 0} FV(x, y)}{\|FV(x, y)\|_0}, \qquad (13)$$

where the $\|FV\|_0$ is the $l_o$ norm which represents the number of non-zero in the rFRC map, and FV denotes the rFRC map.

In some embodiments, a normalized global image quality metric without considering the dimension may be expressed as follows:

$$\frac{\sum_{FV \neq 0} FV(x, y)}{\|FV(x, y)\|_0 \cdot \min(FV(x, y))} - 1, \qquad (14)$$

where the $\|FV\|_0$ is the $l_0$ norm which represents the number of non-zero in the rFRC map, and FV denotes the rFRC map.

It should be noted that both these two metrics illustrated in Equations (13) and (14) may be extended to three-dimension, in which a two-dimension coordinate (x, y) in Equations (13) and (14) may be raised to three-dimension (x, y, z) directly.

In 516, the processing device 140 (e.g., the displaying module 412) may display the first target map using a shifted Jet color map.

In some embodiments, the first target map may be displayed using one or more color maps. The color maps may include one or more existing popular color maps, such as a Jet color map. The Jet color map may use colors from blue to red indexing different error magnitudes to highlight every error region. In some embodiments, such Jet color map may be somehow against human intuition or habits. A human visual system may intend to define the black (dark color) as a small magnitude, bright (light color) as a large magnitude, which is identical to the logic of a gray color map. In some embodiments, human visualizing may be insensitive to light or dark gray levels, and more sensitive to different colors. Therefore, a color map (e.g., the shifted Jet color map) containing color index for more fitting human intuition may be used.

Figure 14A:
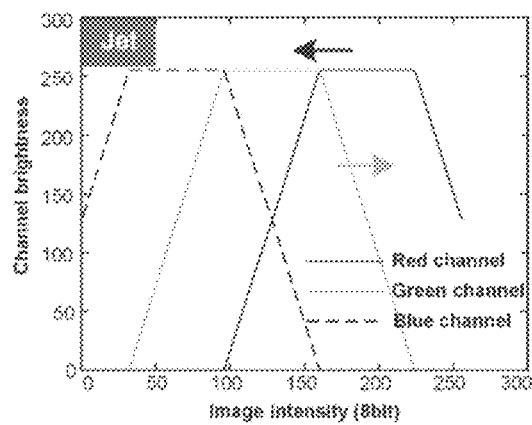
FIGS. 14A-14D illustrate an exemplary shifted Jet color map for error display according to some embodiments of the present disclosure.
Figure 14B:
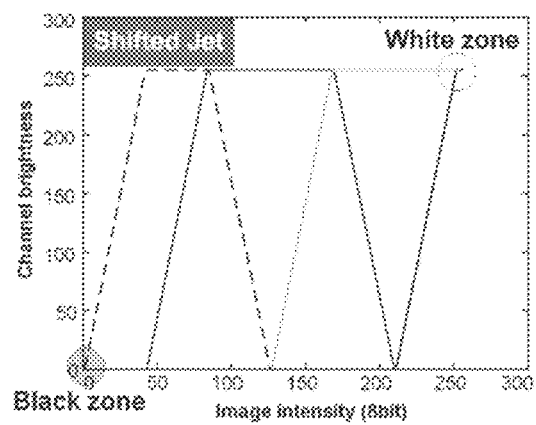
Figure 14C:
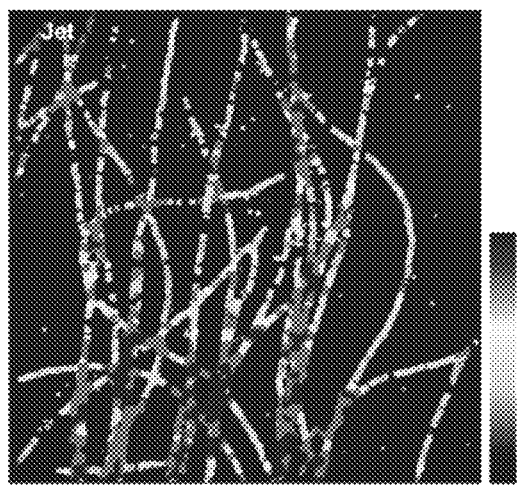
Figure 14D:
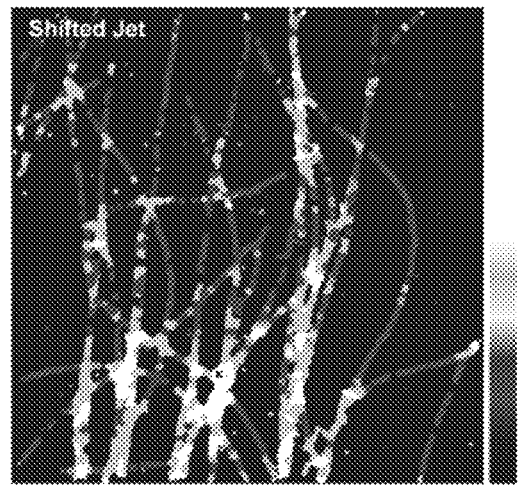

In some embodiments, a Jet color map (see FIG. 14A) may be shifted to create the shifted Jet (sJet) color map (see FIG. 14B) in which the red color component to a relatively low magnitude and the green color component to a relatively high magnitude may be removed, and the blue color component to the whole color index may be extended. In some embodiments, considering that human intuition may be more sensitive to the green color, the green color may be moved to a relatively large magnitude to highlight large errors. In some embodiments, human may be more used to the bright color (e.g., white) as a relatively large magnitude and the dark color (e.g., black) as a relatively small magnitude, and accordingly, a black zone (0, 0, 0) and a white zone (1, 1, 1) may be involved to the shifted Jet (sJet) color map. In some embodiments, accompanied with the extension of the blue color component, the white zone may be created to represent the largest error. In some embodiments, the background in the rFRC map may mean positive (i.e., no error), and accordingly, the black zone (rather than the blue color of the Jet color map) may be used to display such background, which may be more suitable for human intuition. As shown in FIGS. 14C-14D, in comparison to the original Jet color map (see FIG. 14C), the sJet color map (see FIG. 14D) may be evidently more intuitively for error map visualization.

In 518, the processing device 140 (e.g., the map generation module 408) may determine a reference map associated with the first image or the second image.

In some embodiments, the reference map may include a modified resolution scaled error map (RSM). The reference map may reflect errors and/or artifacts in the first image and/or the second image. In some embodiments, the reference map be in the form of grey-scale map.

In some embodiments, the reference map may be determined based on a difference between an intermediate image and a reference image (e.g., an image with a relatively low resolution). The intermediate image may be determined based on the first image (or the second image) and a convolution kernel. The convolution kernel may be determined based on the first image (or the second image) and the reference image. More descriptions regarding the determining the reference map may be found elsewhere in the present disclosure (e.g., FIG. 7 and the description thereof).

It should be noted that in some embodiments, if the first image (or the second image) is in three-dimension or under non-Gaussian convolution relation (e.g., between low-resolution and high-resolution scale), the reference map may be not determined. That is, the operation 518 may be omitted. Accordingly, for such first image or second image, the RSM may not be involved in the fourth target map, and operation 520 may also be omitted.

In 520, the processing device 140 (e.g., the map generation module 408) may determine a fourth target map by fusing the first target map and the reference map.

In some embodiments, the first target map (e.g., an rFRC map) may illustrate fine subtle errors in the reconstruction of the first image (and/or the second image). In some embodiments, the first target map may be incapable when a structure is simultaneously missing in both the first image and the second image. Merely by way of example, a 2D SMLM dataset may be used to illustrate this possible false negative (see FIGS. 17A-17C). A small part of filament may be artificially removed in a same region of two reconstructions as indicated by the bright arrow in FIG. 17A. As shown in FIG. 17B, the rFRC map may successfully detect most of the error components in the image, except the artificially removed region. In some embodiments, such disappearance of structure(s) may be detected by the reference map (e.g., the RSM (see FIG. 17C)). In some embodiments, the reference map (e.g., an RSM) may be introduced as an accompanied error map for the first target map (e.g., the rFRC map).

The fourth target map may reflect comprehensive errors and/or artifacts of the first image (and/or the second image) that are illustrated by the first target map and the reference map. The fourth target map may also be referred to as a PANEL map.

In some embodiments, the processing device 140 may process the first target map and/or the reference map in the form of the grey-scale map. In some embodiments, the processing device 140 may transform the first target map and the reference map to RGB images. For example, the first target map may be displayed in the green color (as shown in the left panel of FIG. 11A) and the reference map may be displayed in the red color (as shown in the right panel of FIG. 11A). In some embodiments, the processing device 140 may normalize the first target map and/or the reference map by, for example, variance normalization, mean normalization, etc. In some embodiments, the processing device 140 may determine the fourth target map based on a weighted sum of the normalized first target map and the reference map.

Figure 11A:
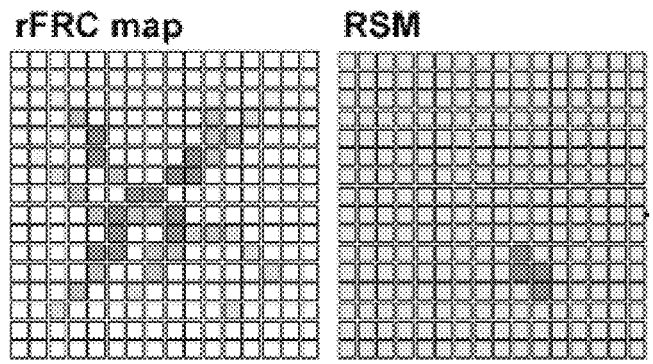
FIGS. 11A-11C illustrate an exemplary process for fusing the first target map and the reference map according to some embodiments of the present disclosure.
Figure 11B:
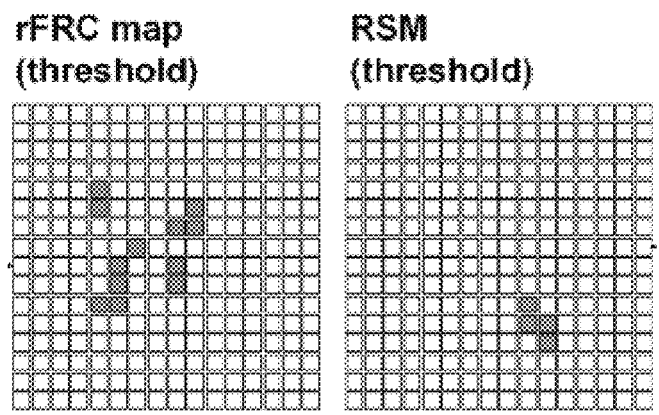

In some embodiments, the processing device 140 may perform a thresholding operation on the first target map and/or the reference map to filter background area(s) therein, thereby highlighting key information (e.g., crucial error of the reconstruction of the first image and/or the second image) (see FIG. 11B). In some embodiments, a threshold for the first target map may be the same as or different from that of the reference map. In some embodiments, the thresholds for the first target map and/or the reference map may range from 0 to 1.

In some embodiments, the threshold for the reference map may be determined by the image processing system 100, or may be preset by a user or operator via the terminal(s) 130. For example, the threshold for the reference map may be 0.5. In some embodiments, identical lost information (e.g., misrepresentation or disappearance of structures) in both the first image and the second image may have a relatively large magnitude and may exist in a relatively large region of the reference map. In some embodiments, small magnitude components included in the reference map may introduce relatively strong false negative. In some embodiments, the reference map may be segmented based on the threshold before involving the reference map to the fourth target map by the following Equation:

$$\tilde{R}(x, y) = \begin{cases} R(x, y), & R(x, y) \in [0.5, 1] \\ 0, & R(x, y) \in [0, 0.5) \end{cases}, \quad (15)$$

where the R(x, y) represents a normalized RSM value in the coordinate (x, y), and the $\tilde{R}$ denotes the segmented RSM. In some embodiments, the small false negative (e.g., less than 0.5) may be filtered according to Equation (15), leaving relatively strong and low-resolution errors only and allowing to focus on the true negative detected by the reference map.

In some embodiments, the rFRC map may indicate the degree of the error, and the smallest FRC value in the map may not represent the admissible error. In some embodiments, the threshold for the first target map may be determined by an Otsu's method (also referred to as ostu in short), which is used to perform automatic image thresholding. Using the ostu, the threshold may be automatically determined by maximizing interclass variance. Image thresholding may be performed to filter the background in the rFRC map, thereby highlighting the crucial error of the reconstruction of the first image and the second image. An exemplary threshold for the first target map may be 0.4. Those pixels whose pixel values are less than the two thresholds may be filtered from the first target map and the reference map, respectively. For example, the pixel values of such pixels may be designated as 0.

Figure 11C:
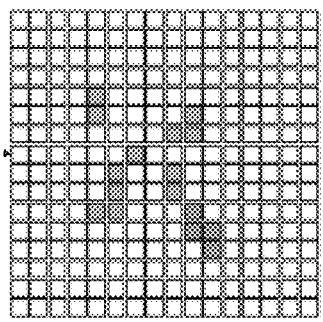

In some embodiments, the processing device 140 may determine the fourth target map (e.g., a PANEL map) by fusing the first target map and the reference map to comprehensively illustrate the errors and/or artifacts of the reconstruction of the first image and/or the second image (see FIG. 11C). In some embodiments, the fourth target map may be determined by fusing a third target map determined in process 800 and the reference map.

It should be noted that the above description of the process 500 is merely provided for purposes of illustration, and not intended to limit the scope of the present disclosure. It should be understood that, after understanding the principle of the operations, persons having ordinary skills in the art may arbitrarily combine any operations, add or delete any operations, or apply the principle of the operations to other image processing process, without departing from the principle. In some embodiments, one or more operations in the process 500 may be omitted. For example, operation 504, operation 512, operation 514, operation 516, operation 518, and/or operation 520 may be omitted. In some embodiments, two or more operations in the process 500 may be integrated into one operation. For example, operations 506-510 may be integrated into one operation. As another example, operations 518-520 may be integrated into one operation. As a further example, operations 506-510 and 518-520 may be integrated into one operation.

In some embodiments, the first image and the second image may be 3D images. The procedure of processing the 3D images may be similar to that of 2D images. The rolling operation in 506 may be able to work in three-dimension. For example, the processing device 140 may perform the rolling operation like the form of executing a 3D filter. The window used for rolling operation in three-dimension may be in a cubic shape, and thus, the first blocks and second blocks may be in a cubic shape. In some embodiments, the FRC computation may be extended to 3D version, referring to as Fourier shell correlation (FSC). Accordingly, the first ring images and the second ring images (see FIG. 6D) generated from the first blocks and the second blocks may be in a spherical shape. In some embodiments, to avoid relatively heavy computing burden, three-dimensional rFRC computation may be produced with plane-by-plane 2D rFRC computation directly.

Figure 6A:
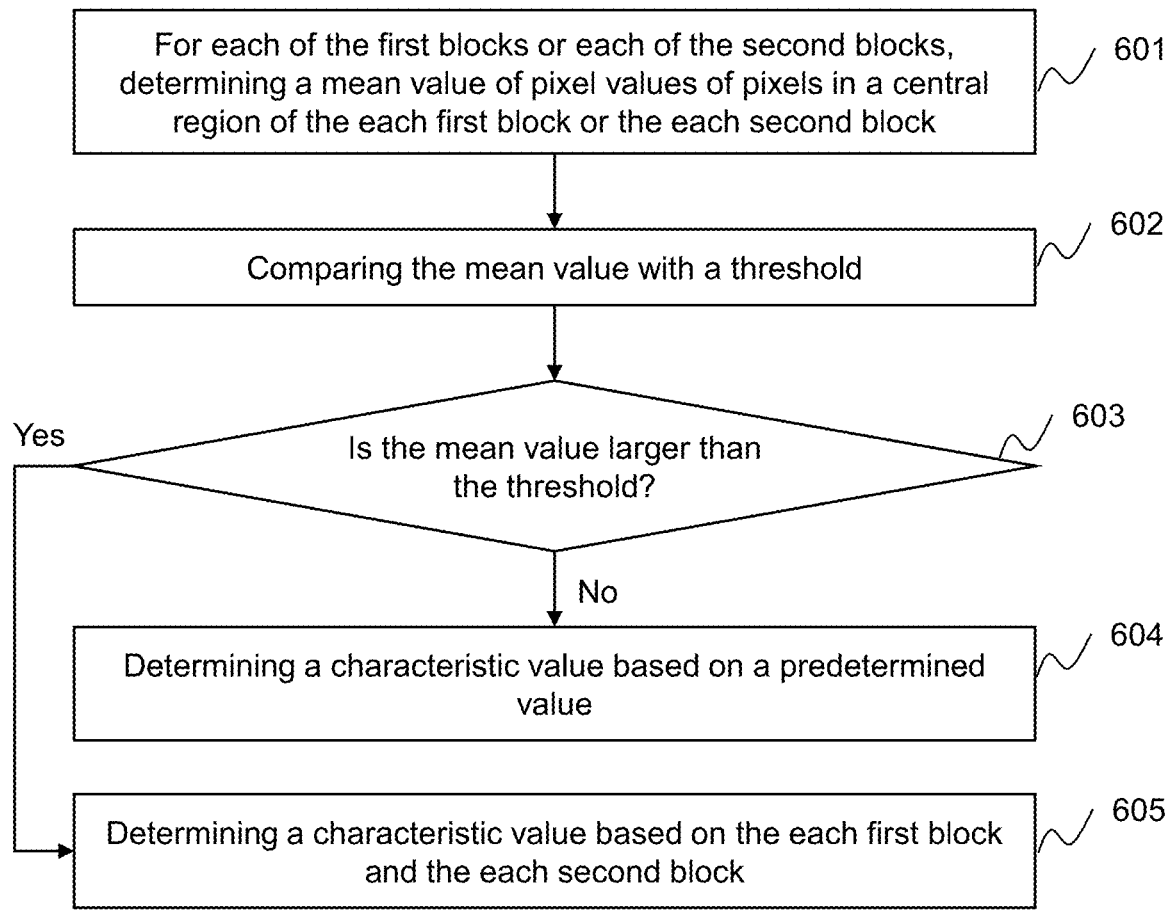

FIG. 6A is a flowchart illustrating an exemplary process for determining whether to perform FRC computation for a first block or a second block according to some embodiments of the present disclosure. In some embodiments, process 600 may be executed by the image processing system 100. For example, the process 600 may be implemented as a set of instructions (e.g., an application) stored in a storage device (e.g., the storage device 150, the storage 220, and/or the storage unit 370). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6A and described below is not intended to be limiting. In some embodiments, operation 508 illustrated in FIG. 5 may be performed according to one or more operations of the process 600.

As illustrated above, the FRC may measure the global similarity between two images (e.g., the first image and the second image), and the FRC value may be extended to the form of rolling FRC (rFRC) map to provide local distance measurements at the pixel-level. In some embodiments, the form of the FRC computation may be seen as a filter, in which, the image may be processed block by block, and each block may be assigned with a corresponding FRC value. In some embodiments, as illustrated in 504, the image (e.g., the first image and/or the second image) may be padded symmetrically around with a half size of a block to facilitate the FRC computation for the boundaries of the image. In some embodiments, a background threshold may be set for the center pixels (e.g., 1×1~3×3 pixels) of a block to decide whether to determine the FRC value in this block, so as to avoid the FRC computation for the background area. In some embodiments, if the mean of center pixels of a block is larger than the background threshold, the FRC computation may be executed and the FRC value may be assigned to the center pixel of the block. In some embodiments, if the mean is smaller than the background threshold, zero value may be set to the center pixel of the block. This procedure block may be run block by block until the entire image is processed.

In 601, the processing device 140 (e.g., the map generation module 408) may determine a mean value of pixel values of pixels in a central region of each of the first blocks and/or a mean value of pixel values of pixels in a central region of each of the second blocks. In some embodiments, the central region may be located in or close to a central portion of the each first block or the each second block. The central region may be in any shape, such as, a square, a circle, etc. In some embodiments, a size of the central region may be smaller than or equal to a size of the each first block or the each second block.

A mean value of pixel values of pixels may be a sum of the pixel values divided by a total number of the pixels in the central region. In some embodiments, the processing device 140 may determine a mean value of pixel values of pixels in the central region of the each first block and pixels in the central region of the each second block. In some embodiments, the processing device 140 may determine a plurality of mean values corresponding to the plurality of first blocks and/or a plurality of mean values corresponding to the plurality of second blocks. In some embodiments, the processing device 140 may determine a plurality of mean values corresponding to the plurality of first blocks and the plurality of first blocks.

In 602, the processing device 140 (e.g., the map generation module 408) may compare the mean value with a threshold (e.g., the background threshold).

The first image and/or the second image may have background areas. In some embodiments, the background areas may have noises (e.g., background noise, readout noise). In some embodiments, such background areas may result in a relatively large FRC value, which may introduce false negative during the generation of the rFRC map, thereby interfering in highlighting true negative (e.g., errors generated in image reconstruction). Therefore, the background threshold may be set to avoid such FRC computation for these background areas. In the present disclosure, true negative refers to true errors determined by the processing device 140, false negative refers to false errors determined by the processing device 140, and false positive refers that errors are determined as non-errors by the processing device 140.

In some embodiments, the threshold may be determined by the image processing system 100, or may be preset by a user or operator via the terminal(s) 130. In some embodiments, a fixed threshold may be used for the entire first image and/or the second images (i.e., the plurality of first blocks of the first image, and/or the plurality of second blocks of the second image). In some embodiments, an adaptive threshold may be used. In some embodiments, the adaptive threshold may be determined according to the (each) first block and/or the (each) second block. In some embodiments, one or more thresholds may be determined adaptively for small local areas of the first image (or first block) or the second image (or second block). That is, different thresholds may be used for different small local areas. In some embodiments, an iterative wavelet transform may be performed to determine the (adaptive) threshold(s). Merely by way of example, a local background intensity distribution of corresponding image(s) (e.g., the first image, the second image, the first block, the second block, etc.) may be estimated. Specifically, the background may be iteratively estimated from the lowest frequency wavelet bands of the corresponding images, and in each iteration one or more (e.g., all) values of the corresponding image(s) above the current estimated background level may be clipped.

In 603, the processing device 140 (e.g., the map generation module 408) may determine whether the mean value is larger than the threshold. In some embodiments, in response to determining that the mean value is larger than or equal to the threshold, the process 600 may proceed to operation 605. In some embodiments, in response to determining that the mean value is no larger than or equal to the threshold, the process 600 may proceed to operation 604.

In some embodiments, the processing device 140 may compare the mean value for the each first block, the mean value for the each second block, and/or the mean value for the each first block and the each second block with the threshold. In some embodiments, in response to determining that the mean value for the each first block and the mean value for the each second block are both larger than or equal to the threshold, the process may proceed to operation 605; otherwise the process 600 may proceed to 604. In some embodiments, in response to determining that the mean value for the each first block and the each second block is larger than or equal to the threshold, the process may proceed to operation 605; otherwise the process 600 may proceed to 604.

In 604, the processing device 140 (e.g., the map generation module 408) may determine a characteristic value (e.g., a first characteristic value corresponding to the each first block and/or the each second block) based on a predetermined value. For example, the processing device 140 may assign the predetermined value to the characteristic value. The predetermined value may be, for example, 0. Thus, if a mean value of a first block and/or a second block is no larger than the threshold, the characteristic value corresponding to the first block and the second block may be 0, thereby avoiding unnecessary FRC computation for background areas.

In 605, the processing device 140 (e.g., the map generation module 408) may determine a characteristic value based on the each first block and the each second block.

When the mean value is larger than the threshold, the processing device 140 may determine a characteristic value by performing FRC computation based on the each first block and the each second block. In some embodiments, the processing device 140 may determine the characteristic value based on a first intermediate image and a second intermediate image, which are obtained by performing a Fourier transform on the each first block and the each second block. More descriptions regarding determining the characteristic value by performing FRC computation may be found elsewhere in the present disclosure (e.g., FIG. 6B and the description thereof).

The processing device 140 may perform process 600 on all first blocks and/or second blocks to determine a plurality of characteristic values.

Figure 6B:
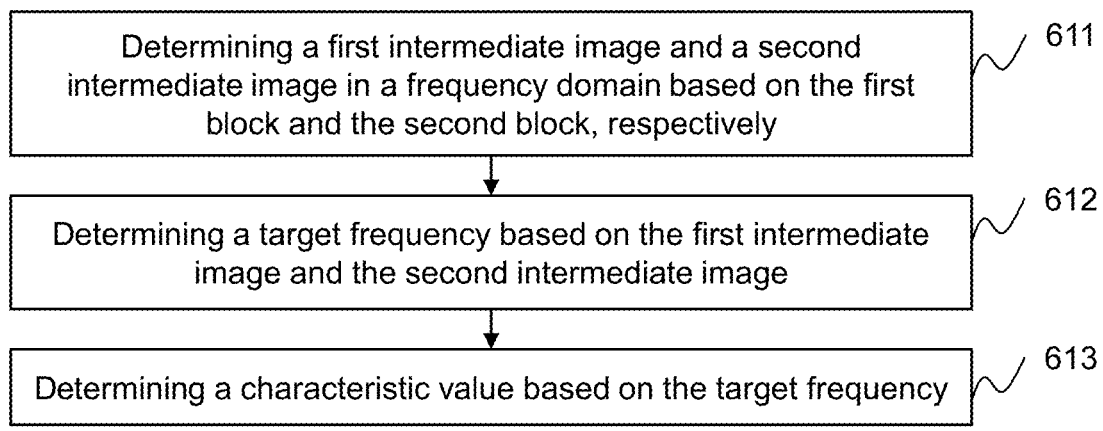

FIG. 6B is a flowchart illustrating an exemplary process for determining a characteristic value according to some embodiments of the present disclosure. In some embodiments, process 610 may be executed by the image processing system 100. For example, the process 610 may be implemented as a set of instructions (e.g., an application) stored in a storage device (e.g., the storage device 150, the storage 220, and/or the storage unit 370). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 610. The operations of the illustrated process presented below are intended to be illustrative. In some embodiments, the process 610 may be accomplished with one or more additional operations not described, and/or without one or more of the operations discussed. Additionally, the order in which the operations of the process 610 as illustrated in FIG. 6B and described below is not intended to be limiting. In some embodiments, operation 605 illustrated in FIG. 6A may be performed according to one or more operations of the process 610.

In 611, the processing device 140 (e.g., the map generation module 408) may determine a first intermediate image and a second intermediate image in a frequency domain based on the first block and the second block, respectively.

In some embodiments, the processing device 140 may determine a first intermediate image in a frequency domain by performing a Fourier transform on the each first block. In some embodiments, the processing device 140 may determine a second intermediate image in a frequency domain by performing a Fourier transform on the each second block. As used herein, a first intermediate image may be regarded as a first transformed image (in the frequency domain) from a first block, a second intermediate image may be regarded as a second transformed image (in the frequency domain) from a second block. The Fourier transform may be used to transform information of an image or block (e.g., the first block, second block) from the spatial domain to the frequency domain. In some embodiments, the Fourier transform may be a discrete Fourier transform (DFT). In some embodiments, each first block may correspond to a first intermediate image, and each second block may correspond to a second intermediate image. Accordingly, a plurality of first intermediate images corresponding to the plurality of first blocks may be determined, and a plurality of second intermediate images corresponding to the plurality of second blocks may be determined.

In 612, the processing device 140 (e.g., the map generation module 408) may determine a target frequency based on the first intermediate image and the second intermediate image. In some embodiments, each first intermediate image and a corresponding second intermediate image may be used to determine a target frequency. Accordingly, a plurality of target frequencies may be determined based on the plurality of first intermediate images and the plurality of second intermediate images.

In some embodiments, to quantitatively determine the characteristic value, a criterion may be used to find the target frequency. For example, when an FRC curve drops below a threshold at a point, a frequency corresponding to the point may be defined as the target frequency. The threshold of FRC may indicate the spatial frequency position for meaningful information above a random noise level. In some embodiments, fixed-value thresholds or sigma-factor curves (see curve b in FIG. 9C) may be used to determine the threshold. For example, a fixed-value of 1/7 of the FRC curve may be used as a hard threshold.

In some embodiments, the target frequency may be determined based on a graph (see FIG. 9C) with a spatial frequency as a horizontal axis and a correlation value as a vertical axis. The target frequency may correspond to an intersection point between a first curve (i.e., curve a in FIG. 9C) and a second curve (i.e., curve b in FIG. 9C). The first curve may illustrate a first relationship between a plurality of correlation values and a plurality of frequencies based on the first intermediate image and the second intermediate image. The second curve may illustrate a second relationship between the plurality of correlation values and the plurality of frequencies based on a predetermined function. More descriptions regarding determining the target frequency may be found elsewhere in the present disclosure (e.g., FIGS. 6C and 6D and the description thereof).

In 613, the processing device 140 (e.g., the map generation module 408) may determine a characteristic value based on the target frequency. In some embodiments, the processing device 140 may designate each target frequency as a characteristic value. In some embodiments, the processing device 140 may determine a characteristic value based on a reciprocal of the target frequency. For example, the processing device 140 may designate the reciprocal of the target frequency as a characteristic value. In some embodiments, the processing device 140 may determine a characteristic value based on the reciprocal of the target frequency and a pixel size of the first image and/or the second image obtained in 502. For example, the processing device 140 may designate a product of the reciprocal of the target frequency and the pixel size as a characteristic value. As shown in FIG. 9D, FV represents a characteristic value (e.g., an rFRC value) determined based on a target frequency determined based on a first block and a second block.

FIG. 6C is a flowchart illustrating an exemplary process for determining a target frequency according to some embodiments of the present disclosure. In some embodiments, process 620 may be executed by the image processing system 100. For example, the process 620 may be implemented as a set of instructions (e.g., an application) stored in a storage device (e.g., the storage device 150, the storage 220, and/or the storage unit 370). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 620. The operations of the illustrated process presented below are intended to be illustrative. In some embodiments, the process 620 may be accomplished with one or more additional operations not described, and/or without one or more of the operations discussed. Additionally, the order in which the operations of the process 620 as illustrated in FIG. 6C and described below is not intended to be limiting. In some embodiments, operation 612 illustrated in FIG. 6B may be performed according to one or more operations of the process 620.

In 621, the processing device 140 (e.g., the map generation module 408) may determine a first relationship between a plurality of correlation values and a plurality of frequencies based on the first intermediate image and the second intermediate image.

In some embodiments, the processing device 140 may determine a plurality of correlation values for each first intermediate image and a corresponding second intermediate image. In some embodiments, a correlation value may be determined based on a first ring image associated with the first intermediate image and a corresponding second ring image associated with the second intermediate image. Accordingly, the plurality of correlation values may be determined based on a plurality of first ring images associated with the first intermediate image and a plurality of second ring images associated with the second intermediate image. More descriptions regarding determining the correlation values may be found elsewhere in the present disclosure (e.g., FIG. 6D and description thereof).

In some embodiments, each of the correlation values may correspond to a frequency of the plurality of frequencies. A correlation value determined based on a first ring image and a corresponding second ring image may correspond to a frequency of the first ring image and/or the second ring image. In some embodiments, the first curve (also referred to as an FRC curve) may illustrate the first relationship between the plurality of correlation values and the plurality of frequencies. For example, the first curve may be denoted by curve a in the graph as shown in FIG. 9C.

In 622, the processing device 140 (e.g., the map generation module 408) may determine a second relationship between the plurality of correlation values and the plurality of frequencies based on a predetermined function.

In some embodiments, the second relationship may be illustrated by the second curve. In some embodiments, the second curve may be a threshold curve. In some embodiments, the second relationship may be determined based on the predetermined function written as Equation (16). The threshold curve may be also referred to as a sigma-factor curve or $3\sigma$ curve, as shown in curve b in FIG. 9C.

$$\sigma_i = \frac{\sigma_{factor}}{\sqrt{N_i/2}}, \quad (16)$$

where $N_i$ represents the number of pixels in the first ring image and/or the second ring image with radius $q_i$, and the $\sigma_{factor}$ may be 3. The extra factor of "2" may be necessary since the computation for FRC summations include all Hermitian pairs in the Fourier domain. If two images (e.g., the first block, the second block) contain full of noise rather than signals, the second curve may be expressed as $FRC_i=1/\sqrt{N_i}$. Therefore, the corresponding 3σ curve means that three times standard deviations above the expected random noise fluctuations may be choose as a threshold for target frequency determination. In some embodiments, the second curve expressed by Equation (16) may be be more suitable for PENEL to identify the category of components (noise or not) in the images (e.g., the first image, the second image). It should be noted that $\sigma_{factor}$ in Equation (16) may be other numbers, e.g., 5, 7, 9, etc., and is not intended to be limiting.

In some embodiments, the second curve may be a staight-line since the threshold for target frequency determination may be a fixed value. The threshold may be determined as, e.g., 1/7 of the FRC curve. In some embodiments, the second curve may indicate a frequency for the meaningful information above a random noise level. For example, information corresponding to frequencies less than the second curve may be unconfident, while information corresponding to frequencies larger than the second curve may be confident.

In some embodiments, the 3σ-curve may be suitable for small-size images for its robustness and accuracy, and may be fit to the determination of a local resolution (corresponding to the cut-off frequency). The fixed value threshold may be suitable for large-size images and may be fit to the determination of a conventional global resolution. More descriptions of the comparison between the two second curves may be found elsewhere in the present disclosure (e.g., Example 11).

In 623, the processing device 140 (e.g., the map generation module 408) may determine the target frequency based on the first relationship and the second relationship. In some embodiments, the target frequency may correspond to an intersection point of the first curve illustrating the first relationship and the second curve illustrating the second relationship. The target frequency may be a frequency of the intersection point. For a plurality of first intermediate images and corresponding second intermediate images, a plurality of target frequencies may be determined.

FIG. 6D is a flowchart illustrating an exemplary process for determining a correlation value according to some embodiments of the present disclosure. In some embodiments, process 630 may be executed by the image processing system 100. For example, the process 630 may be implemented as a set of instructions (e.g., an application) stored in a storage device (e.g., the storage device 150, the storage 220, and/or the storage unit 370). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 630. The operations of the illustrated process presented below are intended to be illustrative. In some embodiments, the process 630 may be accomplished with one or more additional operations not described, and/or without one or more of the operations discussed. Additionally, the order in which the operations of the process 630 as illustrated in FIG. 6D and described below is not intended to be limiting. In some embodiments, operation 621 illustrated in FIG. 6C may be performed according to one or more operations of the process 630.

In 631, the processing device 140 (e.g., the map generation module 408) may determine, from the first intermediate image, a first ring image based on a frequency of the plurality of frequencies.

The first ring image refers to a portion of the first intermediate image (in the frequency domain) that is in a ring shape with a diameter equal to the frequency. The first ring image may include pixels within a ring (see the light grey circle in FIG. 9B) having a diameter equal to the frequency. The frequency may range from 0 to a half of the inverse of the pixel size of the first or second image. A first ring image may correspond to a frequency, and accordingly a plurality of first ring images may be determined based on the plurality of frequencies.

In 632, the processing device 140 (e.g., the map generation module 408) may determine, from the second intermediate image, a second ring image based on the frequency. The second ring image may include pixels within a ring (see the light grey circle in FIG. 9B) having a diameter equal to the frequency. The second ring image may be determined in the same manner as the first ring image. A second ring image may correspond to a frequency, and accordingly a plurality of second ring images may be determined based on the plurality of frequencies. The plurality of second ring images and the plurality of first ring images may be in one-to-one correspondence. A second ring image and a corresponding first ring image may correspond to a same frequency.

In 633, the processing device 140 (e.g., the map generation module 408) may determine a correlation value based on the first ring image and the second ring image. In some embodiments, the processing device 140 may determine a plurality of correlation values based on the plurality of first ring images and the plurality of second ring images.

In some embodiments, the processing device 140 may determine the correlation value through the Fourier ring correlation (FRC) (or so-called spectral signal-to-noise ratio) computation. The FRC computation may measure the statistical correlation between two images (e.g., the first block, the second block) over series of concentric rings (i.e., ring images) in the Fourier domain. In some embodiments, FRC may be proposed as a way of measuring image resolution in super resolution microscopy. The FRC computation may be performed to determine the correlation values based on the frequencies. The correlation value (or FRC value) may be a function of the corresponding spatial frequency $q_i$ as the variable, and may be determined based on Equation (17):

$$FRC_{12}(q_i) = \frac{\sum_{r \in q_i} \mathcal{F}_1(r) \cdot \mathcal{F}_2^*(r)}{\sqrt{\sum_{r \in q_i}|\mathcal{F}_1(r)|^2 \sum_{r \in q_i}|\mathcal{F}_2(r)|^2}}, \quad (17)$$

where the $\mathcal{F}_1$ and $\mathcal{F}_1$ denote the first intermediate image and the second intermediate image after the Fourier transform (e.g., DFT), and $$\sum_{r \in q_i}$$

represents the summation over pixels in a ring image with a spatial frequency $q_i$. In some embodiments, the correlation value may be in the range of 0-1. An FRC curve (see curve a in FIG. 9C) may be determined based on the plurality of correlation values.

In addition, in FRC computation, to suppress the edge effects and other spurious correlations caused by DFT computation, a Hamming window may be used. An exemplary Hamming window may be defined as follows:

$$w(n) = \alpha - \beta \cos\frac{2\pi n}{N-1}, \quad (18)$$

where N represents the number of elements on the mask (e.g., the image size of the first intermediate image or the second intermediate image). The coefficients $\alpha$ and $\beta$ may be set as 0.5.

In some embodiments, in FRC computation, or in the determination of the first and/or second ring image(s) in 631-632, the spatial frequencies of the first intermediate image(s) and the second intermediate image(s) may need to be discretized. In some embodiments, to determine the discrete values of the corresponding spatial frequencies, it may be necessary to define the discretization of the spatial frequencies of the FRC curve. In some embodiments, the maximum frequency $f_{max}$ may be half of the inverse of the pixel size ($p_s$) of the first image or the second image, i.e., $f_{max}=1/(2p_s)$. In some embodiments, the non-squared images (i.e., ring images) may be padded (e.g., zero-padded) to squared images to calculate the FRC curve. In some embodiments, the FRC curve may include N/2 points, and the discretization step ($\Delta f$) may be obtained for the spatial frequencies by Equation (19):

$$\Delta f = \frac{f_{max}}{N/2} = \frac{1}{Np_s}, \quad (19)$$

where N represents the number of elements on the mask (e.g., the image size of the first intermediate image or the second intermediate image); $f_{max}$ represents the maximum frequency; and $p_s$ represents the pixel size.

In some embodiments, an average filter with a half-width of an average window (e.g., equal to 3 frequency bins) may be applied to smooth the FRC curve.

It should be noted that the above description of the processes 600, 610, 620 and 630 is merely provided for purposes of illustration, and not intended to limit the scope of the present disclosure. It should be understood that, after understanding the principle of the operations, persons having ordinary skills in the art may arbitrarily combine any operations, add or delete any operations, or apply the principle of the operations to other image processing process, without departing from the principle. In some embodiments, one or more operations in the process 600 may be omitted. For example, operations 601 to 604 may be omitted. That is, the processing device 140 may perform FRC computation for each first block and/or each second block without filtering the background areas. In some embodiments, the process 610 may be integrated into the process 600. In some embodiments, the process 620 may be integrated into the process 610. In some embodiments, one or more operations may be integrated into one operation. For example, operation 631 and operation 632 may be integrated into one operation.

Figure 9A:
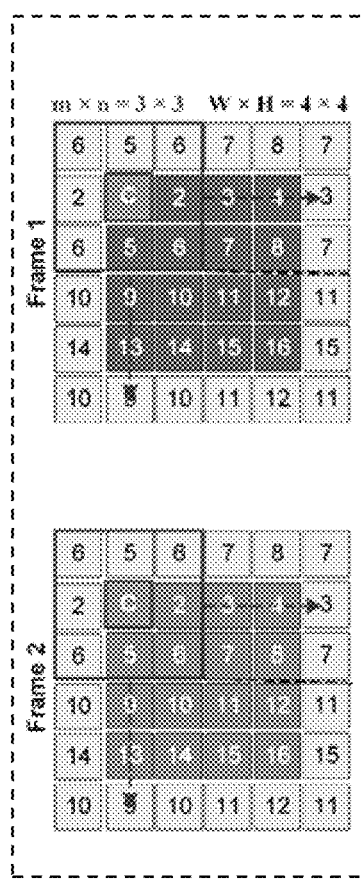
FIGS. 9A-9D illustrate an exemplary process for determining a target map according to some embodiments of the present disclosure.
Figure 9B:
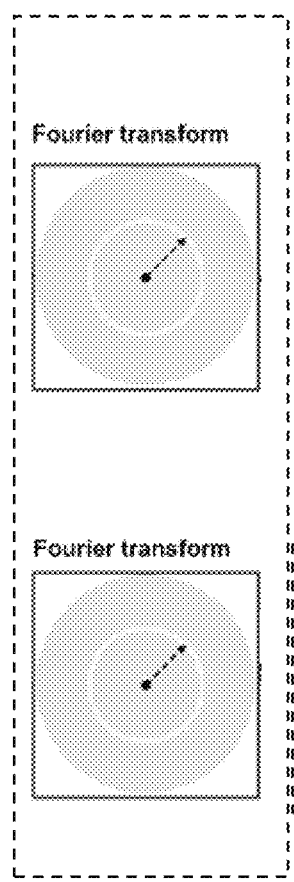
Figure 9C:
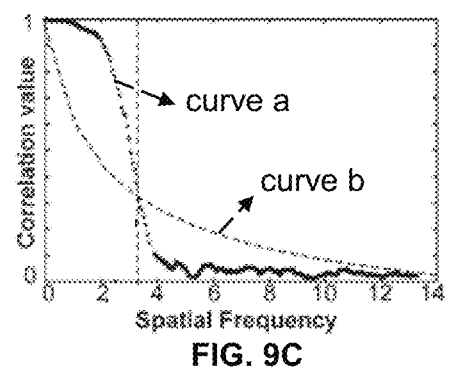
Figure 9D:
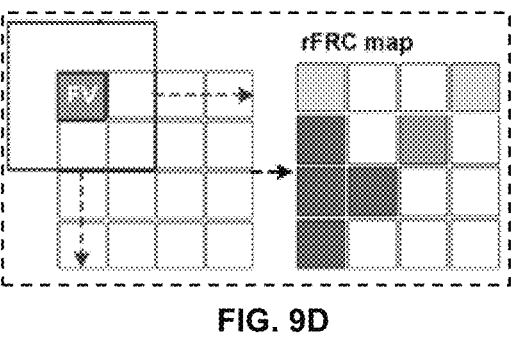

An exemplary FRC computation process may be illustrated in FIGS. 9A-9D. FIGS. 9A-9D illustrate an exemplary process for determining a target map according to some embodiments of the present disclosure. FIGS. 9A-9D are merely provided for the purposes of illustration, and not intended to limit the scope of the present disclosure. As shown in FIG. 9A, the first image (frame 1) and the second image (frame 2) are in a size of 4×4. Frame 1 (and frame 2) are extended by padding symmetrically around the frame using pixel values of a portion of the frame 1 (and frame 2). For example, the pixel value (denoted by number 2) is padded symmetrically around a left boundary of frame 1; the pixel value (denoted by number 6) is padded symmetrically around a left boundary of frame 1 and an upper boundary of frame 1; the pixel value (denoted by number 5) is padded symmetrically around the upper boundary of frame 1. Similarly, the other portions of frame 1 (and frame 2) may be padded symmetrically. In connection with frame 1 of FIG. 9A to describe the rolling operation, the window (3×3) is represented by a solid box. An image in a size of 3×3 enclosed by the window represents a first block. At first, the window is located at an initial position of the extended first image, and the first block has a center represented by "c". Then, the window may be slided to a next position of the extended first image and a next first block is obtained, and the center (represented by "c") of the next first block may be coincided with a pixel (represented by number 2) of the first image. The window may be slided across the entire extended first image to generated a plurality of first blocks. The solid black box in the upper side of FIG. 9B represents the first intermediate image corresponding to the first block in the upper side of FIG. 9A; the solid black box in the lower side of FIG. 9B represents the second intermediate image corresponding to the second block in the upper side of FIG. 9B. As shown in FIG. 9B, a circle with a radius indicated by a dotted arrow represents a ring (or ring image). A plurality of first ring images associated with the first intermediate image and a plurality of second ring images associated with the second intermediate image may be determined. A plurality of correlation values (also referred to as an FRC curve, as illustrated by curve a in FIG. 9C) may be determined based on the first ring images and the second ring images. An intersection point of each FRC curve and the 3σ curve (as illustrated by curve b in FIG. 9C) may be determined. A characteristic value may be determined based on a target frequency corresponding to each intersection point. An rFRC map may be generated based on a plurality of characteristic values (see FIG. 9D).

Figure 7:
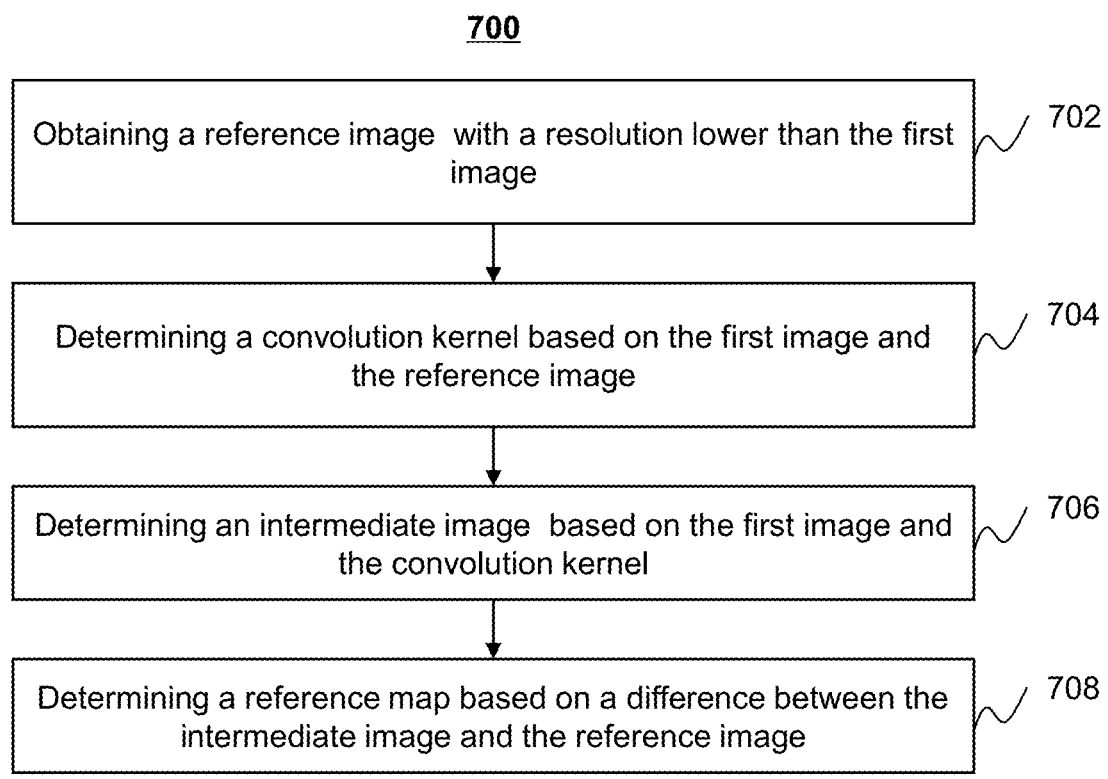
FIG. 7 is a flowchart illustrating an exemplary process for determining a reference map according to some embodiments of the present disclosure.

FIG. 7 is a flowchart illustrating an exemplary process for determining a reference map according to some embodiments of the present disclosure. In some embodiments, process 700 may be executed by the image processing system 100. For example, the process 700 may be implemented as a set of instructions (e.g., an application) stored in a storage device (e.g., the storage device 150, the storage 220, and/or the storage unit 370). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 700. The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, operation 518 illustrated in FIG. 5 may be performed according to one or more operations of the process 700.

In 702, the processing device 140 (e.g., the map generation module 408) may obtain a reference image with a resolution lower than the first image.

In some embodiments, the processing device 140 may obtain the reference image from one or more components of the image processing system 100. For example, the image acquisition device 110 may collect and/or generate the reference image and store it in the storage device 150. The processing device 140 may retrieve and/or obtain the reference image from the storage device 150. As another example, the processing device 140 may directly obtain the reference image from the image acquisition device 110.

Figure 10:
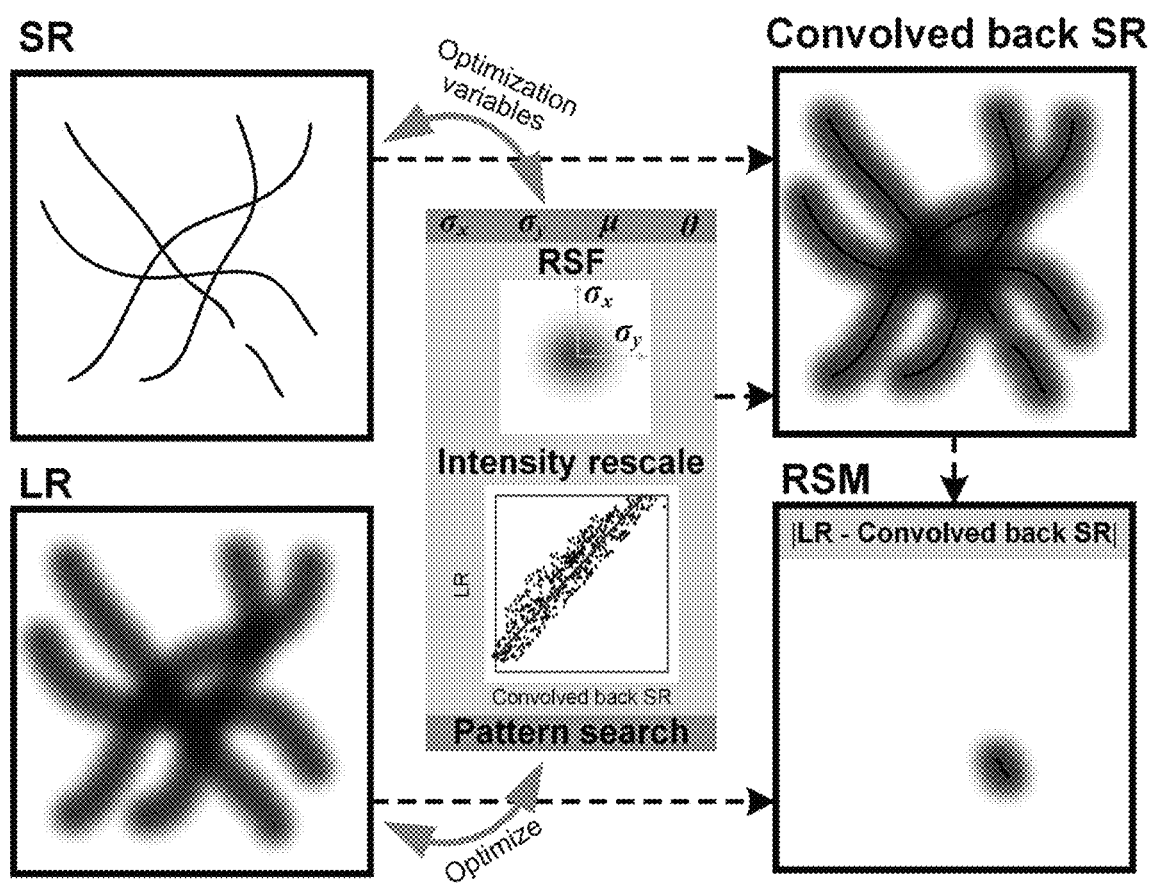
FIG. 10 illustrates an exemplary process for determining a reference map according to some embodiments of the present disclosure.

In some embodiments, the reference image may be generated in a same measurement of the same object with the first image. In some embodiments, the reference image may be obtained by capturing the object using the image acquisition device 110. In some embodiments, the reference image and the first image may be reconstructed based on the same measurement signals but using different reconstruction algorithms. The reference image may have a resolution lower than the first image. The reference image herein may be regarded as a low-resolution image, and the first image may be regarded as a high-resolution (or super-resolution) image. For example, the first image may be a super-resolution (SR) image, and the reference image may be a low-resolution (LR) image corresponding to the first image. As shown in FIG. 10, the SR image represents the first image, and the LR image represents the reference image.

In some embodiments, the reference image may be used to reconstruct the first image. In some embodiments, some errors (e.g., information loss) may be introduced in the reconstruction. In some embodiments, the reference image may be used as ground truth to determine the errors.

In 704, the processing device 140 (e.g., the map generation module 408) may determine a convolution kernel based on the first image and the reference image.

In some embodiments, the convolution kernel may include a resolution scaling function (RSF), a points spread function (PSF), etc. In some embodiments, the convolution kernel may be the RSF. In some embodiments, the RSF may be used to transform a high-resolution image to a low-resolution scale. In some embodiments, the RSF may be defined by a 2D Gaussian function with a parameter $\sigma$. Because the RSF may be usually anisotropy in the x and y directions, $\sigma$ may be set as a vector including two elements, i.e., $\sigma_x$ and $\sigma_y$. Accordingly, the function of RSF may be expressed as:

$$RSF(x, y) = \frac{1}{2\pi\sigma^2} e^{\left(-\frac{x^2+y^2}{\sigma_x^2+\sigma_y^2}\right)}, \quad (20)$$

To calculate the RSF discretely, the 2D Gaussian function may be integrated over finite pixels, and thus, a Gaussian error function (erf) may be given as follows:

$$\mathrm{erf}(x) = \frac{2}{\sqrt{\pi}} \int_0^x e^{-\eta^2} d\eta. \quad (21)$$

In some embodiments, the discrete mathematical expression for RSF may be obtained as follows:

$$I_{RSF}(x, y) = \Delta E_X(x, y)\Delta E_Y(x, y) \quad (22)$$

$$\Delta E_X(x, y) = \frac{1}{2}\mathrm{erf}\left(\frac{x+0.5}{\sqrt{2}\,\sigma_x}\right) - \frac{1}{2}\mathrm{erf}\left(\frac{x-0.5}{\sqrt{2}\,\sigma_x}\right).$$

$$\Delta E_Y(x, y) = \frac{1}{2}\mathrm{erf}\left(\frac{y+0.5}{\sqrt{2}\,\sigma_y}\right) - \frac{1}{2}\mathrm{erf}\left(\frac{y-0.5}{\sqrt{2}\,\sigma_y}\right)$$

In 706, the processing device 140 (e.g., the map generation module 408) may determine an intermediate image based on the first image and the convolution kernel.

The intermediate image may be regarded as an image whose resolution is scaled back from the first image. The intermediate image (e.g., the intermediate image $I_{HL}$ as described in Equation (26)) may be determined by transforming the first image using the convolution kernel. For example, the intermediate image may be determined based on a convolution of the first image and the convolution kernel.

In some embodiments, four parameters (e.g., $\mu$, $\theta$, $\sigma_x$, $\sigma_y$) may be optimized. The $\mu$ and $\theta$ may be parameters for image intensity rescaling, and the $\sigma_x$ and $\sigma_y$ may be parameters for RSF parameterizing. The image intensity rescaling may refer to linearly rescaling the intensity of the first image.

In some embodiments, to uniform the intensity between the reference image (e.g., the LR image) and first image (e.g., the high-resolution image) globally and maximize the similarity between them, the intensity of the first image $I_H$ may need to be linearly rescaled by Equation (23):

$$I_{HS}(\mu, \theta) = I_H \times \mu + \theta, \quad (23)$$

where $I_{HS}$ represents the first image after linearly rescaled, y represents an intensity parameter, $\theta$ represents a parameter associated with a background area, and $I_H$ represents the first image. The $\mu$ and $\theta$ in Equation (23) may be chosen to maximize the similarity between the reference image $I_L$ and the rescaled first image $I_{HS}$ convolved with the RSF:

$$\arg\min_{\mu,\theta} \|I_L - I_{HS}(\mu, \theta) \otimes RSF\|_2, \quad (24)$$

where $I_L$ denotes the reference image; $I_{HS}$ denotes the first image after linearly rescaled; y represents an intensity parameter; $\theta$ represents a parameter associated with a background area; and $\otimes$ denotes the convolution operation.

In some embodiments, to estimate the $\mu$ and $\theta$ for image intensity rescaling and the $\sigma_x$ and $\sigma_y$ for RSF parameterizing, these four variables (i.e., $\mu$, $\theta$, $\sigma_x$, and $\sigma_y$) may be jointly optimized to minimize the following function:

$$\arg\min_{\mu,\theta,\sigma_x,\sigma_y} \|I_L - I_{HS}(\mu, \theta) \otimes I_{RSF}(\sigma_x, \sigma_y)\|_2^2. \quad (25)$$

In some embodiments, the gradient of Equation (25) may be difficult to calculate, and thus, a derivative-free optimizer may be used to search the four optimal parameters. Different from particle swarm optimization (PSO), a pattern search method (PSM) may be used to optimize the Equation (25). The PSO may search relatively large spaces of candidate solutions and may be not a necessary choice for optimizing such four parameters. Compared to the unstable and slow metaheuristic optimization approach PSO, the PSM may be a stable and computational effective method to search the solution directly, and commonly used in small-scale parameters optimization.

In some embodiments, PSM may be more suitable for determining the RSM.

In some embodiments, after optimizing the μ and θ for image intensity rescaling and the $\sigma_x$ and $\sigma_y$ for RSF parameterizing, the high-resolution image (i.e., the first image) $I_H$ may be transformed to its low-resolution scale (i.e., the intermediate image) $I_{HL}$ by convolving the estimated RSF. In some embodiments, the intermediate image $I_{HL}$ may be determined by Equation (26):

$$I_{HL} = (I_H \times \mu + \theta) \otimes RSF = I_{HS}(\mu, \theta) \otimes I_{RSF}(\sigma). \tag{26}$$

In some embodiments, a global quality of the intermediate image may be estimated. In some embodiments, to assess the global quality of the resolution scaled back image (i.e., the intermediate image) $I_{HL}$ against origin low-resolution image (i.e., the reference image) $I_L$, commonly used metrics (e.g., root mean squared error (termed as RSE for resolution scaled error), Pearson correlation coefficient (termed as RSP for resolution scaled Pearson coefficient)) may be adopted in this operation. RSE and RSP may be expressed as follows:

$$RSE = \sqrt{\frac{\sum_{x,y} I_L(x, y) - I_{HL}(x, y)^2}{n}} \tag{27}$$

$$RSP = \frac{\sum_{x,y} (I_L(x, y) - \overline{I_L})(I_{HL} - \overline{I_{HL}})}{\sqrt{\sum_{x,y} (I_L - \overline{I_L})^2} \sqrt{\sum_{x,y} (I_{HL} - \overline{I_{HL}})^2}}.$$

In 708, the processing device 140 (e.g., the map generation module 408) may determine a reference map based on a difference between the intermediate image and the reference image.

In some embodiments, the reference map may include a resolution scaled error map (RSM). In some embodiments, the reference map may be determined based on a difference (e.g., the absolute difference) between the intermediate image and the reference image (see FIG. 10). Thus, the reference map may display at least a portion of the errors and/or artifacts in the reconstruction process of the first image. To visualize the pixel-wise absolute difference, the reference map RSM between $I_{HL}$ and $I_L$ may be calculated by:

$$RSM(x, y) = |I_L(x, y) - I_{HL}(x, y)|. \tag{28}$$

It should be noted that the above description of the process 700 is merely provided for purposes of illustration, and not intended to limit the scope of the present disclosure. It should be understood that, after understanding the principle of the operations, persons having ordinary skills in the art may arbitrarily combine any operations, add or delete any operations, or apply the principle of the operations to other image processing process, without departing from the principle. In some embodiments, one or more operations may be integrated into one operation. For example, operations 704-708 may be integrated into one operation. In some embodiments, the first image in the process 700 may be replaced by the second image.

Figure 8:
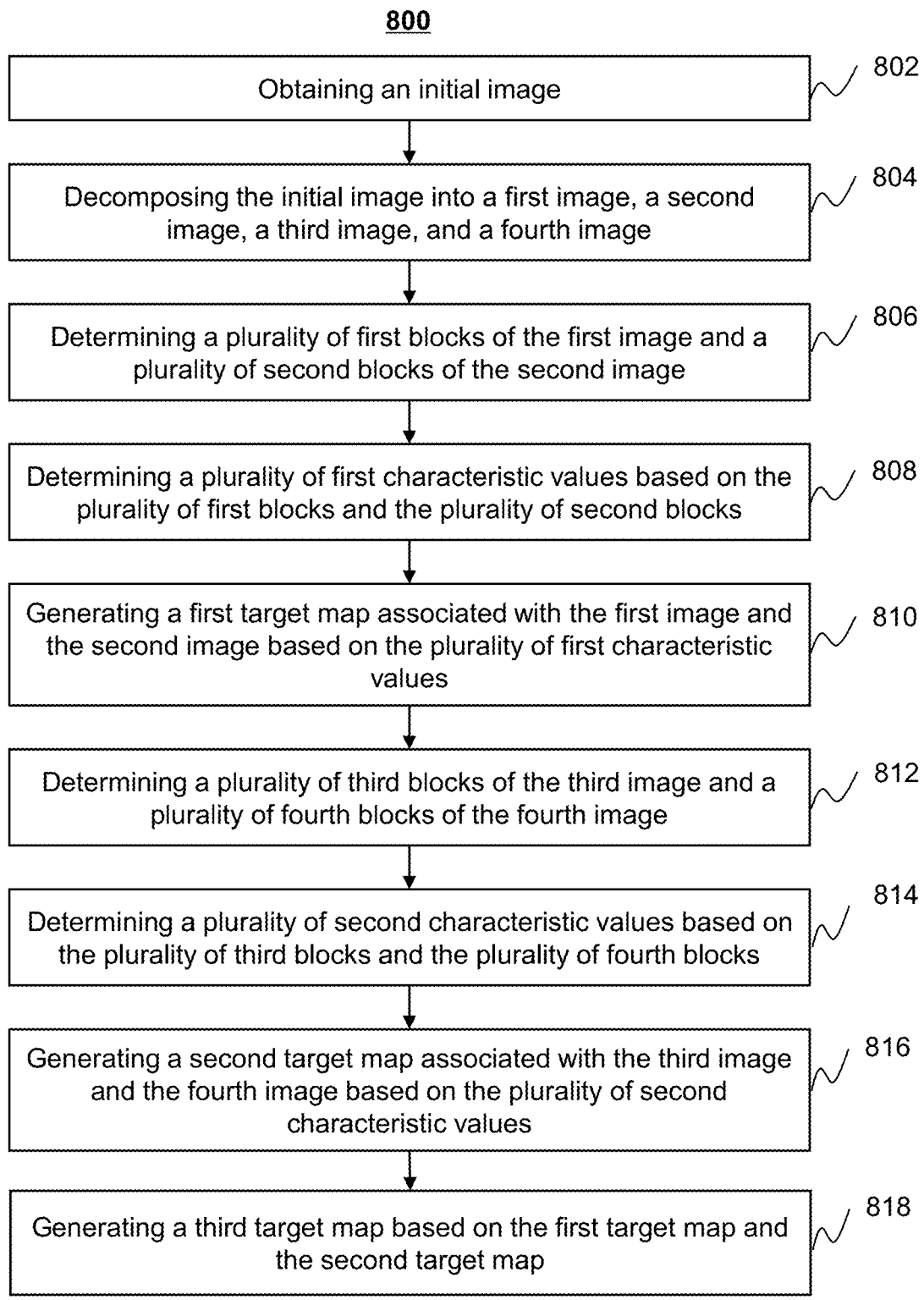
FIG. 8 is a flowchart illustrating another exemplary process for determining a target map according to some embodiments of the present disclosure.

FIG. 8 is a flowchart illustrating another exemplary process for determining a target map according to some embodiments of the present disclosure. In some embodiments, process 800 may be executed by the image processing system 100. For example, the process 800 may be implemented as a set of instructions (e.g., an application) stored in a storage device (e.g., the storage device 150, the storage 220, and/or the storage unit 370). In some embodiments, the processing device 140 (e.g., the processor 210 of the computing device 200, the CPU 340 of the mobile device 300, and/or one or more modules illustrated in FIG. 4) may execute the set of instructions and may accordingly be directed to perform the process 800. The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, the process 800 may be a process for generating an rFRC map (e.g., a second target map) based on a single initial image (e.g., a single frame).

In 802, the processing device 140 (e.g., the obtaining module 402) may obtain an initial image. As shown in FIG. 12A, frame 1 represents the initial image in a size of 8×8. In some embodiments, the initial image may be generated by physical imaging. In some embodiments, the initial image may be a single-frame image captured by the image acquisition device 110. The initial image may be generated based on one measurement of an object. The object may be a biological object or non-biological object described elsewhere in the present disclosure.

In some embodiments, the processing device 140 may obtain the initial image from one or more components of the image processing system 100. For example, the image acquisition device 110 may collect and/or generate the initial image and store it in the storage device 150. The processing device 140 may retrieve and/or obtain the initial image from the storage device 150. As another example, the processing device 140 may directly obtain the initial image from the image acquisition device 110.

In 804, the processing device 140 (e.g., the decomposing module 416) may decompose the initial image into a first image, a second image, a third image, and a fourth image. In some embodiments, the first image and the second image in 502 may be obtained according to 804. In some embodiments, the FRC computation may need statistically independent image pairs that share identical details, but different noise realizations. In some physical imaging applications, such as SMLM, SRRF, and SOFI, these modalities may conveniently produce statistically independent images by dividing an input image sequence (e.g., the initial image) into two subsets and reconstructing independently.

In some embodiments, the processing device 140 may decompose the initial image using a wavelet filter. Exemplary wavelet filters may include Daubechies wavelet filter, Biorthogonal wavelet filter, Morlet wavelet filter, Gaussian wavelet filter, Marr wavelet filter, Meyer wavelet filter, Shannon wavelet filter, Battle-Lemarie wavelet filter, or the like, or any combination thereof.

Figure 12B:
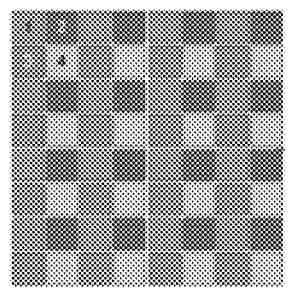
Figure 12C:
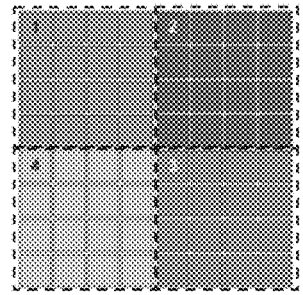

In some embodiments, since each pixel of the initial image may be sampled independently from physical imaging, the processing device 140 may divide the initial image into four sub-images (e.g., the first image, the second image, the third image, and the fourth image). In some embodiments, pixels at (even, even), (odd, odd), (even, odd), and (odd, even) row/column indexes of the initial image may be extracted to form the four sub-images, respectively. As shown in FIG. 12B, pixels numbered by 1 are at (odd, odd) row/column indexes of frame 1 shown in FIG. 12A, pixels numbered by 2 are at (odd, even) row/column indexes, pixels numbered by 3 are at (even, odd) row/column indexes, and pixels numbered by 4 are at (even, even) row/column indexes. As shown in FIG. 12C, pixels numbered by 1, 2, 3, and 4 may be extracted to form four sub-images numbered by 1, 2, 3, and 4, respectively. As shown in FIG. 12C, four dotted boxes may indicate the first image (e.g., the dotted box numbered by 1), the second image (e.g., the dotted box numbered by 4), the third image (e.g., the dotted box numbered by 3), and the fourth image (e.g., the dotted box numbered by 2), respectively, each of which being in a size of 4×4. In some embodiments, the four sub-images may be in the same size. The four sub-images may be used to create two image pairs with identical details but different noise realizations. In some embodiments, the two image pairs may be created randomly from the four sub-images. For example, the first image and the second image may be randomly combined into an image pair, and the other two sub-images may be combined into another image pair. In some embodiments, the two image pairs may be formed according to the positions of the sub-image pixels in the initial image. For example, as shown in FIG. 12C, the sub-image numbered by 1 that has pixels at (odd, odd) row/column indexes and the sub-image numbered by 4 that has pixels at (even, even) row/column indexes may form an image pair, and the sub-image numbered by 2 that has pixels at (odd, even) row/column indexes and the sub-image numbered by 3 that has pixels at (even, odd) row/column indexes may form another image pair.

Figure 12D:
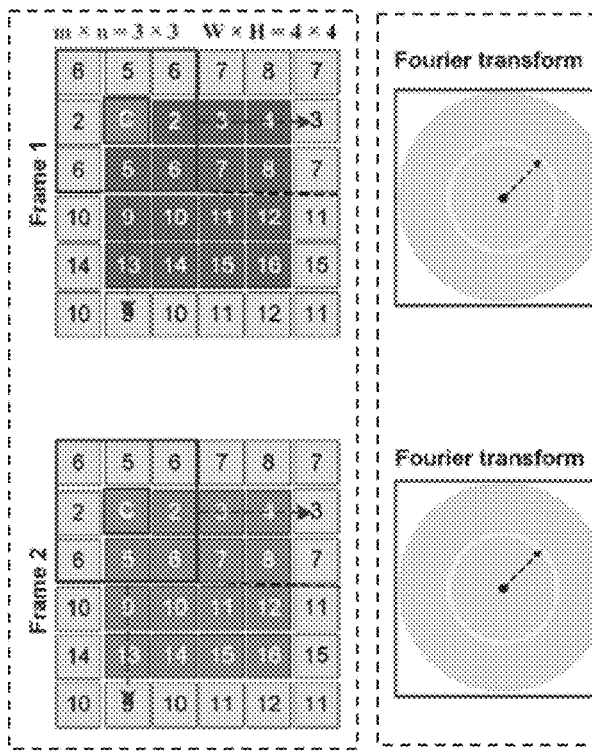

In 806, the processing device 140 (e.g., the rolling module 406) may determine a plurality of first blocks of the first image and a plurality of second blocks of the second image (see FIG. 12D, which is similar to FIG. 9A). The operation 806 may be similar to the operation 506, relevant descriptions of which are not repeated here. In some embodiments, the first block and the second block may be in one-to-one correspondence.

Figure 12E:
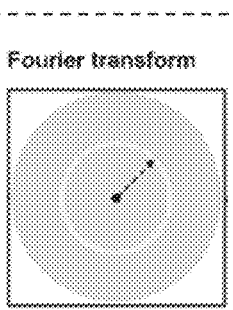
Figure 12F:
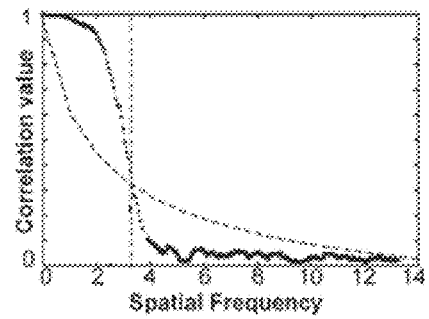
Figure 12G:
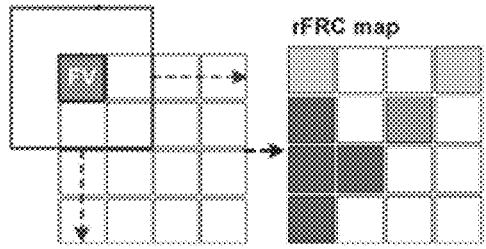

In 808, the processing device 140 (e.g., the map generation module 408) may determine a plurality of first characteristic values based on the plurality of first blocks and the plurality of second blocks (see FIGS. 12E-12G, which is similar to FIGS. 9B-9D). The operation 808 may be similar to the operation 508, relevant descriptions of which are not repeated here.

In some embodiments, the first characteristic values may be modified or rectified. In some embodiments, during the FRC computation of the single-frame image (i.e., the initial image), a single pixel shift both in x and y directions may be generated in the image pairs. This spatial shift may result in a $e^{-2\pi s r/N}$ frequency phase modulation during the FRC computation, wherein $s=\sqrt{x_0^2+y_0^2}$ represents a total length of the spatial shift, and r represents the radius in the FRC computation. Additionally or alternatively, a calibration procedure may be used to correct the determined characteristic values by using the following Equation:

$$r_{tf} = \frac{1}{a \cdot e^{c \cdot r_{sf}^{-b}} + d}, \quad (29)$$

where $r_{tf}$ represents a corrected characteristic value; $r_{sf}$ represents a target frequency corresponding to the image pair (i.e., the first image and the second image); and the four parameters a, b, c and d are experimentally fitted (e.g., a=0.9599, b=0.9798, c=13.9044, d=0.5515). In some embodiments the characteristic value may be corrected to calibrate such bias caused by the spatial shift, making the characteristic value more accurate.

In 810, the processing device 140 (e.g., the map generation module 408) may generate a first target map associated with the first image and the second image based on the plurality of first characteristic values. The operation 810 may be similar to the operation 510, relevant descriptions of which are not repeated here.

In 812, the processing device 140 (e.g., the rolling module 406) may determine a plurality of third blocks of the third image and a plurality of fourth blocks of the fourth image. In some embodiments, similar to the extending of the first image and/or the second image, the processing device 140 (e.g., the extending module 404) may extend the third image and/or the fourth image before the third blocks and the fourth blocks are generated. The processing device 140 may determine the plurality of third blocks of the third image and the plurality of fourth blocks of the fourth image in a manner similar to the determination of the first blocks and the second blocks, relevant descriptions of which are not repeated here. The plurality of third blocks and the plurality of fourth blocks may be in one-to-one correspondence.

In 814, the processing device 140 (e.g., the map generation module 408) may determine a plurality of second characteristic values based on the plurality of third blocks and the plurality of fourth blocks. Operation 814 may be performed similarly to 808, relevant descriptions of which are not repeated here.

In 816, the processing device 140 (e.g., the map generation module 408) may generate a second target map associated with the third image and the fourth image based on the plurality of second characteristic values. The processing device 140 may determine the second target map associated with the third image and the fourth image in a manner similar to the determination of the first target map in 810 or 510, relevant descriptions of which are not repeated here.

In 818, the processing device 140 (e.g., the map generation module 408) may generate a third target map based on the first target map and the second target map.

The third target map may be regarded as an rFRC map generated from the initial image. In some embodiments, the processing device 140 may generated the third target map based on a weighted sum of the first target map and the second target map. In some embodiments, the processing device 140 may generate the third target map by directly combining the first target map and the second target map. In some embodiments, the processing device 140 may average the first target map and the second target map to obtain the third target map.

Figure 12H:
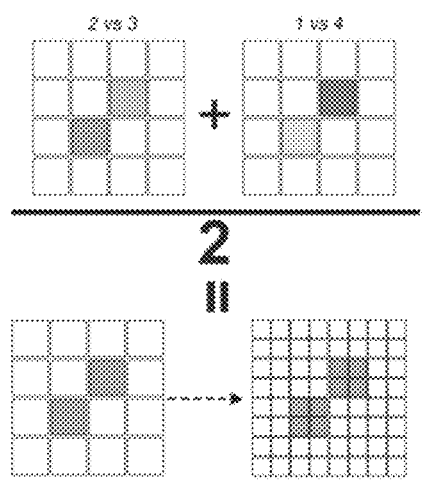

In some embodiments, through image decomposing in 804, the lateral dimensions of the four sub-images may be identical and may be half of the size of the original image (i.e., the initial image in 802). In some embodiments, the third target map may be resized to the original image size (i.e., the size of the initial image) (see FIG. 12H). Alternatively, the first target map and the second target map may be resized to the original image size, and the third target map may be generated based on the first resized target map and the second resized target map. In some embodiments, the resizing may be implemented using a bilinear interpolation.

It should be noted that the above description of the process 800 is merely provided for purposes of illustration, and not intended to limit the scope of the present disclosure.

It should be understood that, after understanding the principle of the operations, persons having ordinary skills in the art may arbitrarily combine any operations, add or delete any operations, or apply the principle of the operations to other image processing process, without departing from the principle. In some embodiments, one or more operations may be integrated into one operation. For example, operations 806-814 may be integrated into one operation. As another example, operations 816 and 818 may be integrated into one operation. As a further example, the processing device (e.g., the filtering module 410) may filter the first target map, the second target map, and/or the third target map. In some embodiments, one or more operations may be added. For example, an operation of filtering the first target map and an operation of filtering the second target map may be added. As another example, an operation of filtering the third target map may be added. As a further example, an operation of displaying the third target map using a shifted Jet color map and/or determining a global image quality metric of the initial image based on the third target map may be added.

The present disclosure is further described according to the following examples, which should not be construed as limiting the scope of the present disclosure.

EXAMPLES

Methods

STORM Imaging.

Microscopy setup is described as follows. After washing with phosphate buffer saline (PBS), samples were mounted on glass slides with a standard STORM imaging buffer consisting of 5% w/v glucose, $100\times10^{-3}$ M cysteamine, 0.8 mg mL$^{-1}$ glucose oxidase, and 40 μg mL$^{-1}$ catalase in Tris-HCl (pH 7.5). Then, data was collected by 3D-STORM carried out on a homebuilt setup based on a modified commercial inverted fluorescence microscope (Eclipse Ti-E, Nikon) using an oil-immersion objective (100×/1.45 NA, CFI Plan Apochromat A, Nikon). Lasers at 405 nm and 647 nm were introduced into the cell sample through the back focal plane of the objective and shifted toward the edge of the objective to illuminate ≈1 μm within the glass-water interface. A strong (=2 kW cm$^{-2}$) excitation laser of 647 nm photoswitched most of the labeled dye molecules into a dark state, while also exciting fluorescence from the remaining, sparsely distributed emitting dye molecules for single molecule localization. A weak (typical range 0-1 W cm$^{-2}$) 405 nm laser was used concurrently with the 647 nm laser to reactivate fluorophores into the emitting state, so that at any given instant, only a small, optically resolvable fraction of fluorophores was in the emitting state. A cylindrical lens was put into the imaging path to introduce astigmatism to encode the depth (z) position into the ellipticity of the single molecule images. The EMCCD (iXon Ultra 897, Andor) camera recorded images at 110 frame rate for a frame size of 256×256 pixels, and typically recorded ≈50000 frames for each experiment. In addition, to form the 2D-STORM imaging, the cylindrical lens in the optical layout were removed.

STORM reconstruction is described as follows. The open-source software package Thunder-STORM and customized 3D-STORM software were used for STORM image reconstruction. Images labeled "ME-MLE" and "SE-MLE" were reconstructed by Thunder-STORM with maximum likelihood estimation (integrated PSF method) and multi-emitter fitting enabled ("ME-MLE") or not ("SE-MLE"). The images labeled "SE-Gaussian" were reconstructed with customized 3D-STORM software by fitting local maxima with an (elliptical) Gaussian function. Drift correction was performed post-localization and images were rendered using a normalized Gaussian function (σ as 2 pixels).

Cell culture, fixation, and immunofluorescence are described as follows. COS-7 cells were cultured in DMEM supplemented with 10% fetal bovine serum (FBS) in a humidified $CO_2$ incubator with 5% $CO_2$ at 37° C., following standard tissue-culture protocols. Then cells were seeded on 12 mm glass coverslips in a 24-well plate at =2×104 cells per well and cultured for 12 h. For STORM of actin filaments, a previously established fixation protocol was employed: the samples were first fixed and extracted for 1 min with 0.3% v/v glutaraldehyde and 0.25% v/v Triton X-100 in cytoskeleton buffer (CB, $10\times10^{-3}$ M MES, pH 6.1, $150\times10^{-3}$ M NaCl, $5\times10^{-3}$ M EGTA, $5\times10^{-3}$ M glucose, and $5\times10^{-3}$ M $MgCl_2$), and then postfixed for 15 min in 2% (v/v) glutaraldehyde in CB, and reduced with a freshly prepared 0.1% sodium borohydride solution in PBS. Alexa Fluor 647-conjugated phalloidin was applied at a concentration of ≈$0.4\times10^{-6}$ M for 1 h. The sample was briefly washed two to three times with PBS and then immediately mounted for imaging. For imaging of other targets, samples were fixed with 3% w/v paraformaldehyde and 0.1% w/v glutaraldehyde in PBS for 20 min. After reduction with a freshly prepared 0.1% sodium borohydride solution in PBS for 5 min, the samples were permeabilized and blocked in a blocking buffer (3% w/v BSA, 0.5% v/v Triton X-100 in PBS) for 20 min. Afterward, the cells were incubated with the primary antibody (described above) in blocking buffer for 1 h. After washing in washing buffer (0.2% w/v BSA and 0.1% v/v Triton X-100 in PBS) for three times, the cells were incubated with the secondary antibody for 1 h at room temperature. Then, the samples were washed three times with washing buffer before mounted for imaging.

SIM Imaging.

TIRF-SIM is described as follows. An SIM system is built up on a commercial inverted fluorescence microscope (IX83, Olympus) equipped with a TIRF objective (100×/1.7 NA, Apo N, HI Oil, Olympus) and a multiband dichroic mirror (DM, ZT405/488/561/640-phase R; Chroma) as described previously. In short, laser light with wavelengths of 488 nm (Sapphire 488LP-200) and 561 nm (Sapphire 561 LP-200, Coherent) and acoustic optical tunable filters (AOTF, AA Opto-Electronic, France) were used to combine, switch, and adjust the illumination power of the lasers. A collimating lens (focal length: 10 mm, Lightpath) was used to couple the lasers to a polarization-maintaining single-mode fiber (QPMJ-3AF3S, Oz Optics). The output lasers were then collimated by an objective lens (CFI Plan Apochromat Lambda 2×NA 0.10, Nikon) and diffracted by the pure phase grating that consisted of a polarizing beam splitter (PBS), a half wave plate and the SLM (3DM-SXGA, ForthDD). The diffraction beams were then focused by another achromatic lens (AC508-250, Thorlabs) onto the intermediate pupil plane, where a carefully designed stop mask was placed to block the zero-order beam and other stray light and to permit passage of ±1 ordered beam pairs only. To maximally modulate the illumination pattern while eliminating the switching time between different excitation polarizations, a home-made polarization rotator was placed after the stop mask. Next, the light passed through another lens (AC254-125, Thorlabs) and a tube lens (ITL200, Thorlabs) to focus on the back focal plane of the objective lens, which interfered with the image plane after passing through the objective lens. Emitted fluorescence collected by the same objective passed through a dichroic mirror (DM), an emission filter and another tube lens. Finally, the emitted fluorescence was split by an image splitter (W-VIEW GEMINI, Hamamatsu, Japan) before being captured by a sCMOS (Flash 4.0 V3, Hamamatsu, Japan) camera.

Hessian-SIM is described as follows. The Hessian denoising algorithm without t continuity constraint on the Wiener-SIM reconstruction results was applied to obtain the Hessian-SIM images as shown in FIG. 21E.

3D-SIM is described as follows. The Nikon 3D-SIM microscope equipped with the TIRF objective (100×/1.49 NA, CFI Apochromat, Oil, Nikon) was used to acquire the 3D-SIM dataset in FIGS. 25A-25I.

Cell maintenance and preparation is described as follows. HUVECs were isolated and cultured in M199 medium (Thermo Fisher Scientific, 31100035) supplemented with fibroblast growth factor, heparin, and 20% FBS (FBS) or in Endothelial Cell Medium (ECM) (ScienCell, 1001) containing endothelial cell growth supplement (ECGS) and 10% FBS. The cells were infected with a retrovirus system to express LifeAct-EGFP. The transfected cells were cultured for 24 h, detached using trypsin-EDTA, seeded onto poly-$_L$-lysine-coated coverslips (H-LAF10L glass, reflection index: 1.788, thickness: 0.15 mm, customized), and cultured in an incubator at 37° C. with 5% $CO_2$ for an additional 20-28 h before the experiments.

LSECs were isolated and plated onto 100 µg/ml collagen-coated coverslips and cultured in high-glucose DMEM supplemented with 10% FBS, 1% $_L$-glutamine, 50 U/ml penicillin, and 50 µg/ml streptomycin in an incubator at 37° C. with 5% $CO_2$ for 6 h before imaging. Live cells were incubated with DiI (100 µg/ml, Biotium, 60010) for 15 min at 37° C., whereas fixed cells were fixed with 4% formaldehyde at room temperature for 15 min before labeling with DiI.

STED Imaging.

Image acquisition of STED was obtained using a gated STED (gSTED) microscope (Leica TCS SP8 STED 3X, Leica Microsystems, Germany) equipped with a wide-field objective (100×/1.40 NA, HCX PL APO, Oil, Leica). The excitation and depletion wavelengths were 647 nm and 775 nm. All images were obtained using the LAS AF software (Leica). To label the microtubules in live cells shown in FIGS. 40A-40C, COS-7 cells were incubated with SiR-Tubulin (Cytoskeleton, CY-S0002) for ~20 mins before imaging without wash.

PANEL Framework.

In principle, an imaging process can be described as that the measurement system observes objects with a transfer function and the corresponding signals are collected by a sensor. Due to that the signals are actually sampled by the sensor following with different kinds of noise, it is generally recognized that such artificial observations are always deviate from the real-world objects in a high dimensional space (left panel in FIG. 15). The errors/artifacts contained in reconstructions are mainly induced by such joint effects from sampling rate and mixture noise in case of using the proper reconstruction model. In another word, the reconstructions from these inevitably deviated observations may also break away from the real-world objects in the target/super-resolution domain (right panel in FIG. 15). If the variable is controlled to image the identical objects and capture the statistically independent image pair, the distance of ground-truth and its reconstruction can be highlighted by the difference between such individual reconstructions (FIGS. 9A-9D). To quantify such distance between the recorded image and its ground truth, the conventional evaluating methods in spatial domain, such as relative and absolute errors used in RSM are excessively sensitive to the intensity and micro movements during measurements. These quantization algorithms can be regarded as the 'absolute differences', and it may induce strong false negative overwhelming the true negative in the distance maps, which may sorely misguide the awareness of the existing errors/artifacts for biologists.

Based on above analysis, a reference-free approach is introduced to measure such immeasurable distance between two signals in Fourier domain, i.e., Fourier ring correlation (FRC), which describes the highest acceptable frequency component of the distance between two signals. Previously the FRC metric has been widely used as an effective resolution criterion for super-resolution fluorescence and electron microscopy. It can also be applied to quantify the similarity or distance between two images. As being calculated as the 'relative error' or 'saliency-based error' for the image, the FRC has a unique superiority that is insensitive to the intensity changes and micro movements. Furthermore, due to inferring the highest credible frequency component, FRC is a more quantitative and comprehensible metric highlighting salience errors only. As a result, it can be a superior choice to quantify the distance between two signals, meanwhile much reducing the potential false negative issue. Remarkably, considering the FRC as a global similarity estimation between two images and aiming to provide local distance measurements more precisely up to the pixel-level, the conventional FRC framework is extended to the form of rolling FRC (rFRC) map (FIGS. (9A-9D), enabling quantitative assessment of image quality in super-resolution scale. The rolling FRC compuration may be like a moving filter on the image plane, in which, a sliding window is used running through the image block by block, and then each block is assigned with the corresponding FRC value. In the first step, the input image is padded symmetrically around with a half size of the block to ensure the FRC calculation taking place on the boundaries of the image (FIG. 9A). Second, a suitable background threshold may be used for the center pixels (1×1~3×3) to decide whether to calculate the FRC value of this block to avoid the FRC calculation for the background area. Third, if the mean value of center pixels is larger than the threshold, the FRC computation is performed and the FRC value is assigned to the center pixel of each block, otherwise zero may be set to the center pixel avoiding unnecessary computations for background areas. Afterward, the procedure may run block by block until the entire image is scanned completely.

Figure 16:
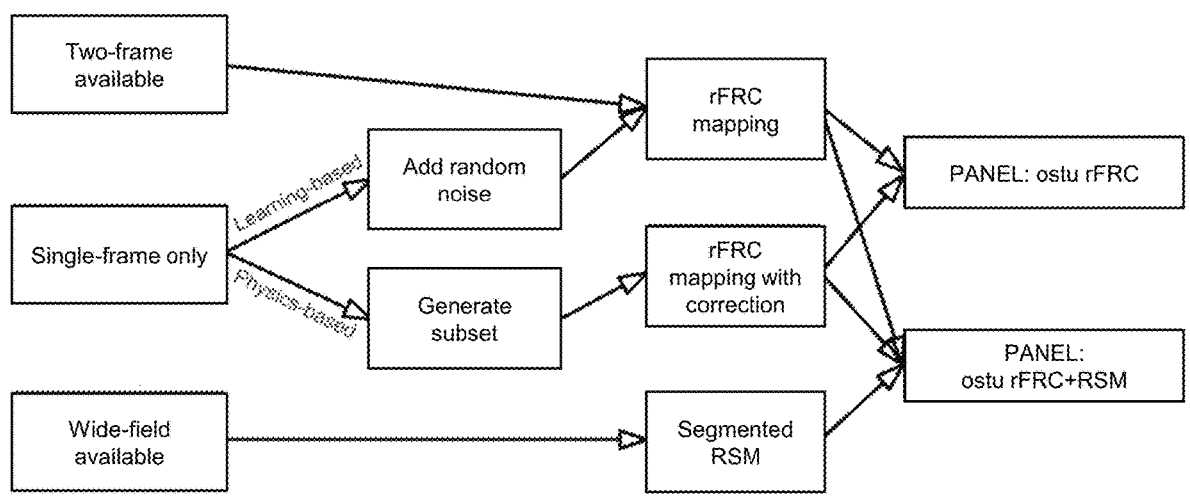
FIG. 16 illustrates an exemplary PANEL framework according to some embodiments of the present disclosure.

In addition, to visualize the error maps, a corresponding metric, rFRC value, and a color map more suitable for human intuition (shifted Jet, or sJet) is developed. By virtue of the rFRC map, the errors in the multi-dimensional reconstructed signals can be quantitatively mapped, without ground-truth and any prior information of the imaging system. Nevertheless, it is worth noting that when the two reconstructed signals lost the identical component (even if this situation is rare during the practical experiments), the rFRC method may fail and report the false positive. If the same area of both images is blank (but the ground-truth has contents), such information may be loss in the same region and it will lead to an incorrect small FRC value. Therefore, to remove such possible false positive, the modified resolution scaled error map (RSM, FIG. 10) is introduced, as an accompanied error map, integrating into the PANEL framework. It should be pointed out that, the full RSM may also introduce strong false negative by the small magnitude due to its three assumptions as discussed above. To reduce such false negative contained in RSM, the RSM may be segmented with 0.5 hard threshold to highlight common large-scale artifacts, such as misrepresentation or disappearance of structures, before merging it into the final PANEL map (FIGS. 11A-11C). On the other hand, the rFRC map indicates the degree of the error, as a result, the smallest FRC value in the map may not represent the error. To address this case, a segmentation method called ostu, which automatically determines the threshold by maximizing interclass variance, is introduce to perform image thresholding to filter the background in the original rFRC map, which highlights the crucial error of reconstructions (FIG. 16).

Open-Source Datasets.

In addition to the custom-collected datasets, the freely available simulation/experiment datasets were used to illustrate the broad applicability of PANEL.

2D-SMLM simulation datasets are described as follows. The "Bundled Tubes High Density" (361 frames) and "Bundled Tubes Long Sequence" (12000 frames) datasets from the "Localization Microscopy Challenge datasets" at the EPFL website were used as high-density and low-density 2D-SMLM simulation datasets as shown in FIG. 17A. The NA of the optical system was 1.4 (oil immersion objective) and the wavelength of fluorescence was 723 nm.

3D-SMLM simulation datasets are described as follows. The "MT1.N1.LD" (19996 frames, 3D-Astigmatism PSF) dataset from the "Localization Microscopy Challenge datasets" at the EPFL website was used as a low-density 3D-SMLM simulation dataset as shown in FIG. 17C. The NA of the optical system was 1.49 (oil immersion objective) and the wavelength of fluorescence was 660 nm. All the images were with a frame size of 64×64 pixels (pixel size as 100 nm). Then per 20 frames from this low-density 3D-SMLM simulation dataset were averaged into one frame to generate a corresponding high-density 3D-SMLM simulation dataset (resulting 998 frames).

2D-SMLM experimental datasets are described as follows. The "Localization Microscopy Challenge datasets" contain also experimental data, and the 500 high-density images of tubulins were acquired from the EPFL website (FIGS. 18A-18H). The NA of the optical system was 1.3 (oil immersion objective) and the wavelength of fluorescence was 690 nm. The images were recorded with a camera at 25 frame rate for a frame size of 64×64 pixels (pixel size as 100 nm).

Live cell SRRF datasets are described as follows. The GFP-tagged microtubules in live HeLa cells were imaged by TIRF mode with a TIRF objective (100×/1.46 NA, Plan Apochromat, Oil, Zeiss) and an additional 1.6× magnification with 488-nm laser illumination (200 frames in total), and the open-source ImageJ plugin was used to reconstruct the super-resolution SRRF results (FIGS. 18I-18L).

Simulation of Gridding Sample Imaged by SMLM.

A regular grid (FIG. 17M) is created on the pixel size of 10 nm and the density of the randomly activated molecular is set as increasing gradually from the center to the sides. Then the resulting image sequence is convoluted with a Gaussian kernel with a FWHM of 280 nm and down-sampled 10 times (pixel size 100 nm). After that, the Poisson and 20% Gaussian noise are involved into the image sequence. Finally, the image sequence is reconstructed by Thunder-STORM with maximum likelihood estimation (integrated PSF method) and multi-emitter fitting enabled.

Simulation of FPM.

Figure 24A:
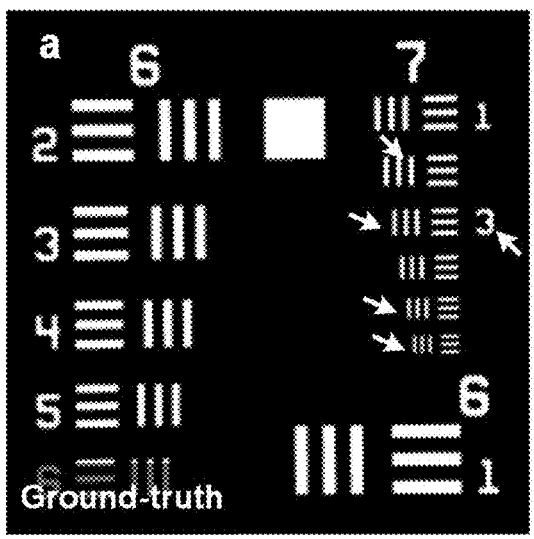

The United States Air Force (USAF) resolution target was used as the ground-truth sample of FPM (FIG. 24A). The intensity and phase of the imaged sample were both set as the USAF target with a size of 240×240 pixels (pixel size 406.3 nm). Illumination from different angles was provided by a 7×7 LED matrix, whose emission wavelength was 532 nm and its distance to the sample was 90 mm. The sample was illuminated by each LED unit, filtered by the objective (4×/0.1 NA), and sampled by the camera (resulting image size as 60×60, pixel size as 1.625 µm). After the LEDs illuminating the sample one by one, the final 49 low-resolution images were obtained. The image illuminated by the LED in the center was used as the initial image. Then, each FPM iteration updated the amplitude and phase of the corresponding aperture in turn. After 10 rounds of iteration, the final high-resolution complex amplitude image (240× 240) was obtained, which is with a 4× enlarged size compared to the corresponding low-resolution images.

Data Generation Processes of Learning-Based Applications.

Sparse sampling is described as follows. The deep neural network (DNN) was trained with sparse sampled geometrical structures and corresponding intact ones as ground-truth. Four simple and common geometrical structures, i.e., triangle, circle, rectangle, square for simulations, were selected. The spatial size of one structure and the number of structures in one input image are shown in Table 1. After obtaining the structures, the image was randomly sampled at the sampling rate of 8%. The rectangle structure was selected and 5000 images were used as the training dataset. For each geometrical structure, 200 images were generated as a test dataset.

Pixel super-resolution is described as follows. The DNN was trained with raw images as ground-truth and corresponding down sampled ones as input. The *D. melanogaster* expressing the membrane marker Ecad::GFP imaged was chosen under commercial spinning disk microscope (camera exposure/laser power of 240 ms/20%) as a training dataset. First, PreMosa was used to obtain surface-projected 2D ground-truth. Second, the images including strong background were discarded. Third, the background was estimated with iterative wavelet transform and then was subtracted to produce background-free images as ground-truth. Finally, we the images were downsampled 4 times by meaning 4×4 pixels into one pixel as input. Before putting the image into the DNN, the image was upsampled 4 times with bilinear interpolation.

Deconvolution is described as follows. The DNN was trained with synthetic sub-diffraction images as ground-truth and corresponding diffraction-limited wide-field images as input. Specifically, synthetic tubulin structures were created using the random walk process to simulate two-dimensional trajectories with randomly changing orientations. Meanwhile, the maximal curvature was set as a limited value, respecting the known physical stiffness properties of tubulin. These images were used as ground-truth with a pixel size of 65 nm and processed to create the input images. The images were convoluted with a Gaussian kernel (FWHM as 300 nm) to obtain the blurred images. To simulate the realistic fluorescent background, the blurred images were convoluted with a larger Gaussian kernel (FWHM as 1.2 µm), and added to the blurred images. Then, the Poisson noise and 2% Gaussian noise were involved in the images to produce the final input images for DNN training. Following the same procedure, additional 781 images were generated as a test dataset.

Noise2Noise is described as follows. Noise2Noise is an unsupervised learning procedure to denoise the noisy images without clean ones. The DNN is only looking at noisy image pairs (two images with independent noise which share the same details) during training, i.e., one as input and the other one as output target. The Fluorescence Microscopy Denoising (FMD) dataset is used in this Noise2Noise task. The fixed zebrafish embryos [EGFP labeled Tg (sox10:megfp) zebrafish at 2 days post fertilization] were chosen as a dataset which is imaged by commercial Nikon Al R-MP laser scanning confocal microscope at very low excitation power. This imaging configuration has 5 noise levels. The raw images have the highest noise level, and other noise level images were generated by averaging multiple frames (2, 4, 8, and 16) raw images using the circular averaging method. To test extreme conditions, the raw images were chosed with the highest noise level as input of the training set (every two raw images). For each field-of-view (total in 20) with 50 different noise realizations, 200 noise-noise data pairs were randomly chosen. Meanwhile, the raw images of size 512×512 were cropped to four non-overlapping patches of size 256×256. Finally, 20×200×4=16000 images were obtained as a training dataset. The ground-truth reference to evaluate the accuracy of Noise2Noise prediction was generated by averaging 50 noisy raw images.

Network Architecture and Training Procedure.

Network architecture is described as follows. The network architecture includes a contracting path and an expansive path, which is the so called U-shape architecture (Unet). In the contracting path, the input layer is followed with successive down-convolution block, consisting of 4×4 kernel convolution with a stride step of 2, batch normalization (BN), and leaky rectified linear unit (LeakyReLU) function. A convolutional layer lies at the bottom of this U-shape structure that connects the down-convolution and up-convolution blocks. The expansive pathway combines the feature and spatial information from the contracting path through a series of up-convolution blocks (Upsampling2D operation+4×4 kernel convolution with stride step of 1+BN+ReLU) and concatenations with high-resolution features. The last layer is another convolutional layer that maps the 32 channels into 1 channel image. Two kinds of U-shape network architectures were used (Unet[1] and Unet[2]) in different tasks(see FIG. 43). The difference between Unet[1] and Unet[2] is that Unet[1] has 7 down-convolution blocks and 7 up-convolution blocks whereas Unet[2] has 4 down-convolution blocks and 4 up-convolution blocks.

Training procedure is described as follows. All the networks were trained using stochastic gradient descent with adaptive moment estimation (Adam). The detailed input patch size of the training images, number of epochs, batch size, the number of training images, learning rate, the network architecture, the number of parameters, and loss function for each task are shown in FIG. 42 and Table 2. FIG. 42 illustrates overview of network architecture, training parameters configuration, and data used for different applications. All the training procedures were performed on a local workstation equipped with an NVIDIA Titan Xp GPU card. The related learning framework was implemented with TensorFlow framework version 1.8.0 and Python version 3.6.

Employing the Open-Source Deep Learning Model.

ANNA-PALM is described as follows. The ANNA-PALM computationally reconstructs super-resolution images from sparse, rapidly captured localization data. ANNA-PALM was trained using dense sampled PALM images (long sequence) as ground-truth and corresponding sparse sampled PALM images (short sequence) as input. ANNA-PALM is based on the cGAN[1] with the Unet[1] as generator. The performance of ANNA-PALM was tested using the 500 high-density images of tubulins from the EPFL website. The fluorophores in the 1-25 and 26-50 frames were localized using the ME-MLE estimator to construct two sparse super-resolution inputs, and then the ANNA-PALM predicted the corresponding dense sampled images.

CARE is described as follows. The CARE framework is a computational approach that can extend the spatial resolution of microscopes using the Unet[3] architecture. The open-source trained model of CARE was fed with the first and second raw images from the open-source SRRF dataset, generating the corresponding two super-resolved images.

Cross-modality super-resolution is described as follows. The cross-modality imaging ability of DNN was demonstrated previously by mapping TIFR to TIRF-SIM modality (TIRF2SIM) using the cGAN approach. The cGAN[2] in TIRF2SIM is based on the Unet with the residual convolutional blocks (Res-Unet) as a generator. It was trained and tested using the AP2-eGFP tagged clathrin in gene-edited SUM159 cells. The provided ImageJ plugin and example data were used to reproduce the results directly.

Image Rendering and Processing.

The custom developed color map, shifted Jet (sJet), was used to visualize the rFRC maps. The color maps SQUIR-REL-Errors were used to present RSM in FIG. 17P, FIG. 28F, the bottom right of FIGS. 17A-17B, FIG. 18G, and FIG. 33H. The Jet projection was used to show the depth in FIG. 23D and FIG. 25A. All data processing was achieved using MATLAB and ImageJ. All the figures were prepared with MATLAB, ImageJ, Microsoft Visio, and OriginPro.

Data Availability.

All the data that support the findings of this study are available from the corresponding author on request.

Code Availability.

The current version of custom-written MATLAB library used in this disclosure (accompanied with the user manual, example data), custom-designed color map, and the corresponding ImageJ plugin is available as software. The updating version of the PANEL in MATLAB library can be found at https://github.com/WeisongZhao/PANELM. The updating ImageJ plugin and its source code can be found at https://github.com/WeisongZhao/PANELJ.

Example 1 Validation of PANEL Using SMLM Simulations

To evaluate the capacity of PANEL for identifying fine defects contained in super-resolution images, 2D single molecule localization microscopy (SMLM) simulation datasets were used from the EPFL challenge. The 2D-SMLM simulation datasets (e.g., a high-density (HD) 2D-SMLM simulation dataset, and a low-density (LD) 2D-SMLM simulation dataset) included HD and LD emitting fluorophores (see FIGS. 17A-17F), respectively. FIGS. 17A-17F illustrates simulations of 2D-SMLM with high-density (HD) and low-density (LD) emitting fluorophores. As shown in FIGS. 17A and 17D, merged ground-truth structures were represented by dark grey channels, labeled as HD-GT or LD-GT, and maximum likelihood estimation (MLE) reconstruction was represented by light gray channels, labeled as MLE. FIGS. 17B and 17E illustrate the rFRC map of MLE, respectively. FIGS. 17C and 17F illustrate full PANEL of MLE. RSM was represented as a channel pointed by a white arrow and the rFRC map was represented as the other channels. White and light gray arrows indicated errors found by RSM or rFRC map, respectively. In this quantitative mapping, a set of images were divided into two statistically independent subsets, yielding two individual super-resolution images. After using maximum likelihood estimation (MLE) reconstruction, the corresponding two super-resolution images of the HD 2D-SMLM simulation dataset were obtained. Then, a certain part of filament was artificially removed to create a known structural artifact as pointed by the white arrow in FIGS. 17A-17F to visualize the potential false positive induced by considering rFRC map only. As pointed by light gray arrows, the rFRC map can detect all subtle errors (rFRC value was 0.66), but it is found that the rFRC map is incapable of detecting missing structures in both super-resolution frames. Therefore, as mentioned above, to demonstrate all errors in reconstructions, the RSM and rFRC map were merged and represented as the channel pointed by the white arrow and the other channels, respectively (FIGS. 17A-17F) to produce the final full PANEL map. On the other hand, compared to the ground-truth, the MLE result of the LD 2D-SMLM simulation dataset can be found to contain very few errors (rFRC value was 0.16), and the corresponding rFRC map also realistically descripted such appearance (FIGS. 17A-17F) during the computational process.

Figure 17M:
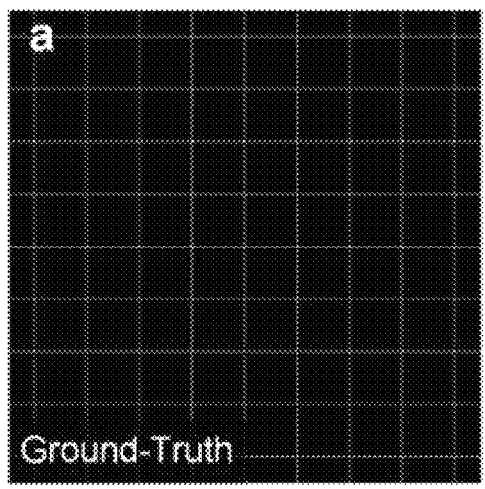
FIGS. 17A-17Y illustrate exemplary results of simulations of single molecule localization microscopy (SMLM)
Figure 17N:
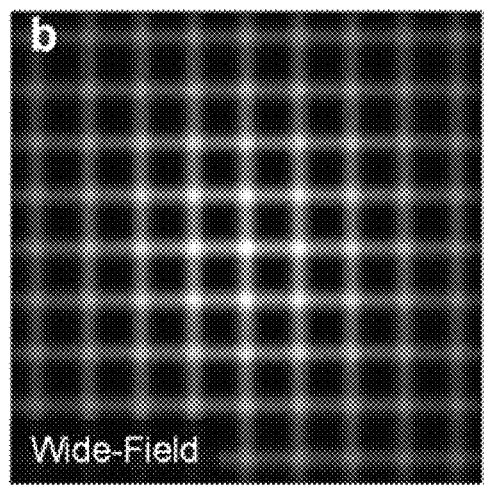
Figure 17O:
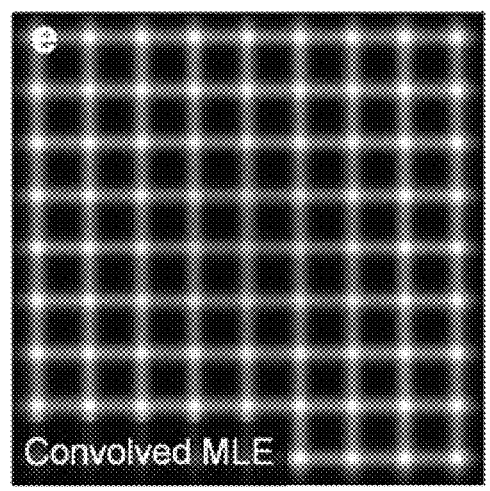
Figure 17P:
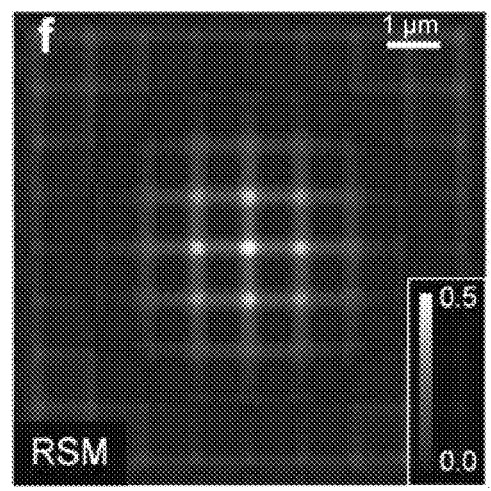

After comparing the respective LD and HD 2D-SMLM simulation datasets, indeed, it reveals that the performance of SMLM results is related to emitting fluorophore density which may be highly dependent on illumination intensity induced. To further quantitatively evaluate the impact of emitting density on MLE reconstruction within a single frame image, a regular grid was created which is illuminated with high intensity in the center and decreasing illumination towards the edges, so that the blinking at the center is supposed to be better separated temporally than at the edges (FIG. 17G). FIG. 17G illustrates an MLE result of 2D-SMLM simulation with inhomogeneous illumination (high intensity in the center and decreasing illumination towards the edges). FIG. 17H illustrates an rFRC map generated based on FIG. 17G. It is clearly demonstrated that the rFRC map accurately described the blinking density transition induced reconstruction performance as demonstrated in FIG. 17H. On the contrary, due to dissatisfy the assumption of RSM, the estimated RSM is unable to (even opposite to the reference) present the errors properly (FIGS. 17M-17P). FIG. 17M illustrates simulated ground-truth. FIG. 17N illustrates wide-field image of FIG. 17M illuminated with high intensity in the center and decreasing illumination towards the edges. FIG. 17O illustrates an image after the reconstructed MLE image of FIG. 17G is convolved with estimated RSF. FIG. 17P illustrates an RSM of the reconstructed MLE image of FIG. 17G.

Figure 17Q:
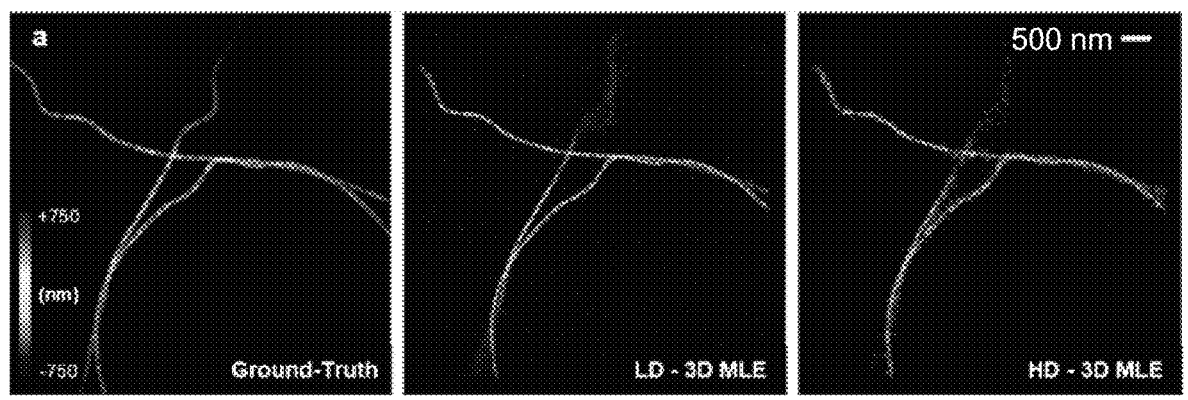

In the final step, the rFRC map was extended to a 3D version directly by applying the plane-by-plane computation, in which the RSM was removed from the PANEL for 3D super-resolution imaging applications (FIGS. 17I-17L) as its limitation on 3D model evaluation. FIG. 17I illustrates an image showing the merged ground-truth structures (red channel, labeled as "LD-GT") and MLE reconstruction (green channel, labeled as "3D-MLE"). FIG. 17J illustrates an rFRC map of low-density 3D-MLE, in which an rFRC value was 2.2. FIG. 17K illustrates an image showing merged ground-truth structures (red channel, labeled as HD-GT) and MLE reconstruction (green channel, labeled as 3D-MLE). FIG. 17L illustrates an rFRC map of high-density "3D-MLE", in which an rFRC value was 4.5. 3D simulation datasets used to exam the PANEL were obtained from the EPFL SMLM challenge with also LD and HD cases (per 20 frames averaged from the LD dataset). As the same as in 2D cases, the rFRC results indicate that the global performance of 3D MLE reconstructions is highly affected by the emitting fluorophore density, which is all well consistent with the real physical experience (see FIGS. 17I-17L, 17Q, and 17X-17Y3D, rFRC value 2.2 versus 4.5 for the LD and HD cases). FIG. 17Q illustrates depth color-coded views of ground-truth, 3D-MLE reconstructions of low-density (LD) and high-density (HD) datasets from left to right, respectively. FIG. 17X illustrates horizontal sections (at 0 nm z position) of 3D-MLE reconstructions (LD and HD) and a representative frame (frame 19) of the LD dataset from left to right, respectively. FIG. 17Y illustrates rFRC maps of horizontal sections in FIG. 17X, and a representative frame (frame 99) of the HD dataset from left to right, respectively.

In addition, the rFRC map can detect all fine subtle errors, but it is found that this method is incapable when the structure is simultaneously missing in both neighboring super-resolution frames. To clarify, an example was created using the 2D SMLM challenge dataset to illustrate this possible false negative (see FIGS. 17A-17C, 17R-17T). FIG. 17R illustrates an rFRC map after ostu threshold filtering on FIG. 17B. FIG. 17S illustrates the RSM. FIG. 17T illustrates the RSM after 0.5 threshold filtering. As shown in FIG. 17B, the rFRC map successfully detect most the error components in the entire image, except the artificially removed region. However, such disappearance of structures can be successfully detected by the RSM (see FIG. 17R). Therefore, to address this possible false positive, the RSM was introduced as an accompanied error map for the rFRC map. It is also worth noticing that, such identical lost information in both two reconstructions may contain a large magnitude and exist in a large region of RSM. Moreover, due to the three assumptions of RSM, the small magnitude components contained in RSM may introduce strong false negative. Therefore, the RSM was segmented before involving RSM to the PANEL using 0.5 threshold filtering. After this operation, the small false negative may be filtered precisely, only the strong, low-resolution error components may be left, allowing to focus on the true negative detected by the RSM.

On the other hand, in fact, the rFRC map indicates the degree of the error, so the smallest FRC value in the map may not represent admissible error. Likewise, a segmentation method called ostu, which automatically determines the threshold by maximizing inter-class variance, performing image thresholding to filter the background in rFRC map and highlighting the crucial error of the reconstruction was introduced (FIGS. 17U-17W). After that, the segmented rFRC map was merged as light gray channel and RSM was segmented as dark gray channel to create the full PANEL to visualize the integrated error map of the corresponding reconstruction (FIGS. 17A-17C, 17R-17T, and FIGS. 17U-17W). It is worth noting that, if the datasets are in three-dimension or under non-Gaussian convolution relation (between low-resolution and high-resolution scale), the corresponding RSMs can not be estimated. As a result, for such datasets, the RSM may not be involved in the PANEL. FIG. 17U illustrates rFRC map of the SRRF dataset same to FIGS. 18I-18L, displayed in sJet color map. FIGS. 17V and 17W illustrate full rFRC map, and the rFRC map after ostu threshold to highlighting the crucial errors in the SRRF reconstruction that are demonstrated in green channel of PANEL.

Example 2 Minimization Analytical Errors with PANEL

After synthesizing the ground-truth images containing grid structure and fundamental simulations, the experimental 2D-SMLM datasets from the EPFL challenge were evaluated by using the proposed PANEL (FIGS. 18A-18H). FIG. 18A illustrates an image showing an MLE localization result of 500 high-density images of tubulins from the EPFL website. FIG. 18B illustrates an rFRC map of "MLE". FIG. 18C illustrates an image showing a full PANEL of "MLE", in which an rFRC value was 1.2. FIG. 18D illustrates an image showing a PANEL after ostu threshold segmentation. FIG. 18E illustrates a corresponding "wide-field" image. FIG. 18F illustrates an "MLE" image convolved back to its original low-resolution scale. FIG. 18G illustrates an image showing an RSM of "MLE". FIG. 18H illustrates an FRC map of "MLE", in which an FRC value was 584 nm. On the basis of the obtained corresponding rFRC map, it is found that the large FRC values are tending to appear at the intersection regions of the filaments, which is consistent with the SRRF result revealing in FIGS. 18I-18L. FIG. 18I illustrates a diffraction-limited TIRF image. FIG. 18J illustrates an image showing an SRRF reconstruction result of 100 fluctuation images (GFP-tagged microtubules in live HeLa cells, see Method). FIG. 18K illustrates an rFRC map of "SRRF", in which an rFRC value was 2.25. FIG. 18L illustrates an image showing a PANEL after ostu threshold segmentation. The primary possible reason lies in the effects of the emitter density in 2D-SMLM simulations, and the intersection region contains a relatively larger emitting density leading to the performance reduction of the localizations. It is the acknowledged experimental fact that the emitting density (related to the complexity of structures) changes dramatically within the field of view in real process of experiments, however, there is no practical quantification method to identify the subtle errors in its super-resolution scale. Thus far, most existing algorithms have to accept such performance trade-off by designing its consideration as homogeneous density only for HD or LD alternatively.

Benefiting from the high-resolution error mapping feature, the advantages can be merged from the existing algorithms for HD or LD focuses respectively, and to do so the errors contained in all selected methods can be minimized. To demonstrated this statement, a 2D-STORM dataset of immunolabeled α-tubulin in fixed COS-7 cells was analyzed using two distinct algorithms, i.e., multi-emitter MLE (MEM-LE) and single-emitter Gaussian fitting (SE-Gaussian) (see Method, FIG. 20A, FIGS. 19A-19E). FIG. 19A illustrates an image showing reconstructions of multi-emitter MLE (ME-MLE). FIG. 19B illustrates an image showing single-emitter Gaussian fitting (SE-MLE). FIG. 19C illustrates an image showing the fused result of ME-MLE and SE-MLE by the rFRC map. FIG. 19D illustrates corresponding rFRC maps of FIGS. 19A-19C. FIG. 19E illustrates magnified views of white boxes in FIG. 19A. FIG. 20A illustrates an image showing fused STORM result (COS-7 cells, α-tubulin labeled with Alexa Fluor 647) result from reconstructions by multi-emitter MLE (ME-MLE) and single-emitter Gaussian fitting (SE-MLE). FIG. 20B illustrates an rFRC map of FIG. 20A. FIGS. 20C-20E illustrate images showing enlarged regions enclosed by the box 2001 in FIG. 20B, in which FIG. 20C illustrates an image showing the result of rFRC map, FIG. 20D illustrates an image showing the result of fused STORM, and FIG. 20E illustrates an image showing the result of RSM. FIGS. 20F-20H illustrates an image showing magnified views of the box 2002 in FIG. 20A, and FIGS. 20I-20K illustrates an image showing magnified views of the box 2003 in FIG. 20B, in which FIG. 20F illustrates an image showing the result of ME-MLE, FIG. 20G illustrates an image showing the result of SE-MLE, FIG. 20H illustrates an image showing the result of fused STORM, FIG. 20I illustrates an rFRC map of FIG. 20F in which an rFRC value was 1.01, FIG. 20J illustrates an rFRC map of FIG. 20G in which an rFRC value was 4.51, FIG. 20K illustrates an rFRC map of FIG. 20H in which an rFRC value was 0.87. FIG. 20L illustrates magnified views of dashed circles in FIGS. 20F-20H. The SE-Gaussian is more suitable to reconstruct the simple structures (LD emitters), and by contrast the ME-MLE is more appropriate to complex structures (HD emitters) as shown in FIGS. 20C-20K. Utilizing the rFRC error maps in super-resolution scale, the spatial details on the local accuracy of each algorithm can be mapped which may be converted into the fusion weights (FIGS. 20B-20E), and then the lowest error features of each reconstruction may be used to generate a new composite image with minimal defects. Expectedly, it may be found that the individual algorithm (ME-MLE or SE-Gaussian only) is failed to achieve a stable performance for all structures in the entire field-of-view, as shown in the two selected region-of-interest (FIGS. 20F-20K). Combining information generated by ME-MLE and SE-Gaussian using the proposed rFRC maps can obtain superior performance in the whole field-of-view (FIGS. 20C-20K and 20M) by making the best of both algorithms. In addition, such developed fusion approach was further applied to a 2D-STORM dataset of heavy chain clathrin-coated pits (CCPs) in COS-7 cells, and it acquired a significant improvement in the mean resolution (FIG. 20N). FIG. 20M illustrates the rFRC map of ME-MLE, the superiority map for fusion, and TIRF image from top to bottom on the left, and the rFRC maps of SE-Gaussian and fusion result, and the fusion result (Fused) from top to bottom on the right. It is found that the ME-MLE method achieves superior performance in the regions contained with strong background, and in comparison, the SE-Gaussian method obtains better reconstruction quality in the regions including weak background. FIG. 20N illustrates a magnified results for a single CCP of ME-MLE, SE-Gaussian, and fusion from top to bottom on the left, and the corresponding rFRC maps demonstrated on the right. The mean resolutions are marked on the left top of rFRC maps. In addition to the stable performance of fusion in the whole field-of-view as highlighted in FIG. 20M, the rFRC map also assists in fusing fine structures like such single ring-shaped CCP enabling higher mean resolution.

Example 3 rFRC Map Assisted Diverse Physical-Based Imaging Applications

The designed rFRC was identified and manipulated to the typical 3D-STORM reconstruction (FIG. 21A), and the resulting rFRC map (FIG. 21B) and its PANEL map (FIG. 21C) indicated that large error mainly occurred among the intertwine filaments voxels (FIGS. 22A-22C).

FIG. 21A illustrates an image showing 3D-MLE reconstruction (COS-7 cells, α-tubulin labeled with Alexa Fluor 647). FIG. 21B illustrates the 3D rFRC map of FIG. 21A. FIG. 21C illustrates an image showing a PANEL after ostu threshold of FIG. 21B. FIG. 21D illustrates an image showing the curve of rFRC values along axial positions. FIG. 21E illustrates representative images of live human umbilical vein endothelial cells (HUVECs) labeled with LifeAct-EGFP under Wiener-SIM (top), Hessian-SIM (middle), and TIRF (bottom) imaging. FIG. 21F illustrates an rFRC map of Hessian-SIM, in which the rFRC, RSP, and RSE values of Wiener-SIM and Hessian-SIM were: rFRC=1.24, RSP=0.98, RSE=0.27. FIG. 21G illustrates an image showing representative results of fixed liver sinusoidal endothelial cells (LSECs) labeled with DiI under RL deconvolution (top) and TIRF (bottom) imaging. FIG. 21H illustrates an rFRC map of RL deconvolution result. FIG. 21I illustrates magnified views of the box in FIG. 21G, including an original TIRF image (left top), images showing RL deconvolution results with 80 and 200 iterations (right top and left bottom), and an image showing TIRF-SIM result (right bottom). FIG. 21J illustrates an image showing the curves of PSNR (versus TIRF-SIM), RSP (versus TIRF), and rFRC values along iterations. FIG. 22A illustrates an image showing a maximum intensity projection (MIP) view of 3D-MLE reconstruction. FIG. 22B illustrates an image showing the MIP view of rFRC volume of FIG. 22A. FIG. 22C illustrates an image showing corresponding magnified horizontal sections of 3D-MLE (left) and rFRC volume (right) from white boxes in FIG. 22A. It is also found that in the experimental conFIGurations, the most accurate planes in the reconstruction depths for microtubule (FIG. 21D) and actin filaments (FIGS. 23A-23F) are located at the focus positions. FIG. 23A illustrates an image showing a maximum intensity projection (MIP) view of TIRF (COS-7 cell, labeled with Alexa Fluor 647-phalloidin). FIG. 23B illustrates an image showing depth color-coded view of 3D-MLE reconstruction. FIG. 23C illustrates an image showing horizontal section of 3D-MLE reconstruction at −50 nm z position. FIG. 23D illustrates a corresponding rFRC map of FIG. 23C. FIG. 23E illustrates an image showing horizontal section of 3D-MLE reconstruction at +300 nm z position. FIG. 23F illustrates a corresponding rFRC map of FIG. 23E.

Figure 29A:
Figure 29B:
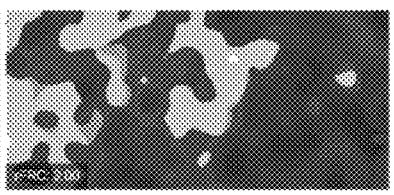
Figure 29C:
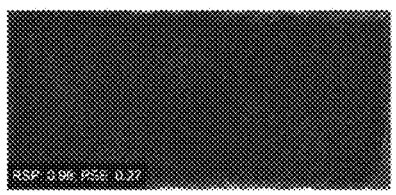
Figure 29D:
Figure 29E:
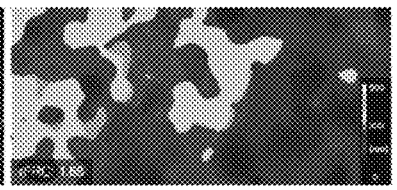
Figure 29F:
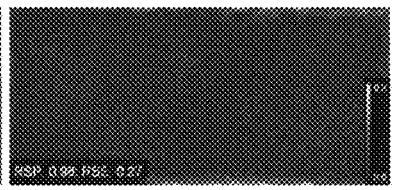
Figure 29G:
Figure 29H:
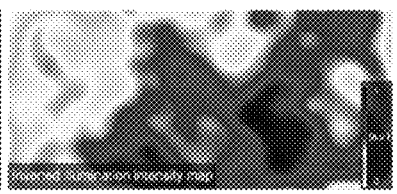
Figure 29I:

The Hessian denoising algorithm (Hessian-SIM) can be used to conventional Wiener-SIM to disentangle the random discontinuous artifacts from real structures (see FIG. 21E, and FIGS. 29A-29I). FIG. 29A illustrates an image of Wiener-SIM. FIG. 29B illustrates a corresponding rFRC map. FIG. 29C illustrates corresponding RSM. FIG. 29D illustrates an image of Hessian-SIM. FIG. 29E illustrates the corresponding rFRC map. FIG. 29F illustrates corresponding RSM. FIG. 29G illustrates a TIRF image of Wiener- and Hessian-SIM. FIG. 29H illustrates the TIRF image convoluted with large Gaussian kernel and coded with inverted sJet colormap. FIG. 29I illustrates the merged image of PANEL (light gray channel) and Wiener-SIM (dark gray channel). However, due to the need of transformation to the TIRF mode, the RSM may lose sight of such artifacts, as seen in FIG. 21E that the RSE value stayed as 0.27. Making use of rFRC map, on the contrary, it can detect the improvement of Hessian-SIM against conventional Wiener-SIM, as can be seen in FIG. 21F, in which the corresponding rFRC value is significantly improving from 1.36 to 1.24.

Figure 30A:
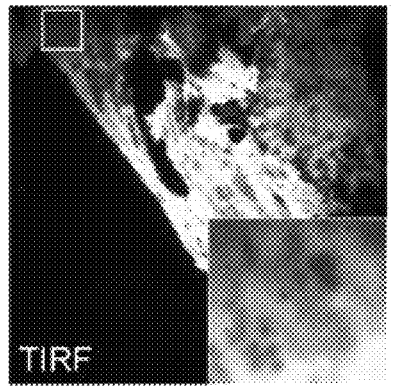
Figure 30B:
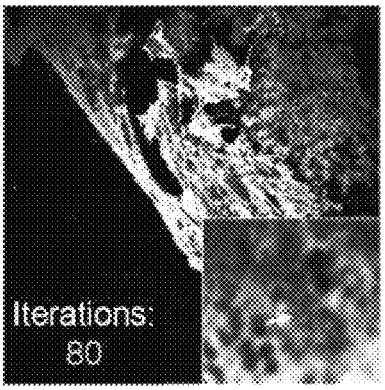
Figure 30C:
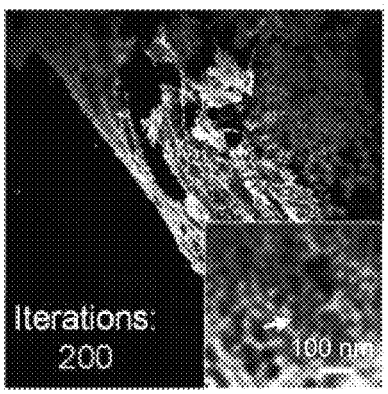
Figure 30D:
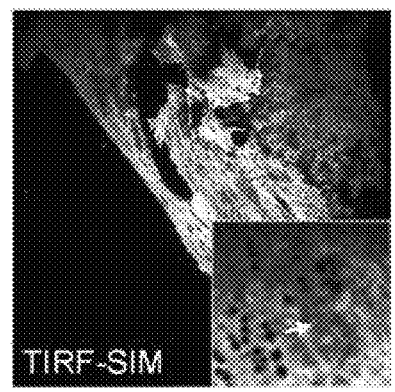
Figure 30E:
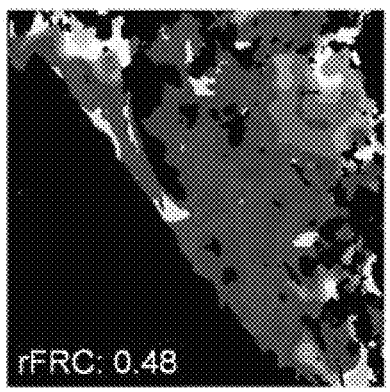
Figure 30F:
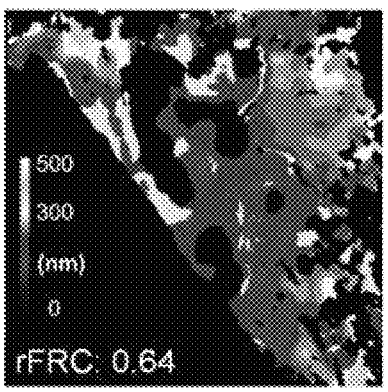
Figure 30G:
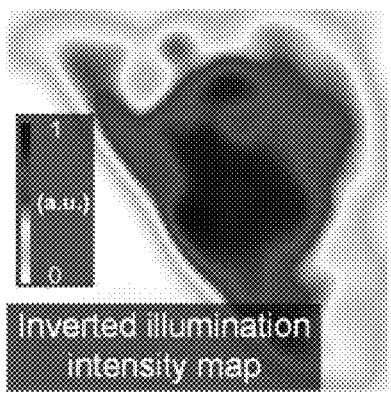
Figure 30H:
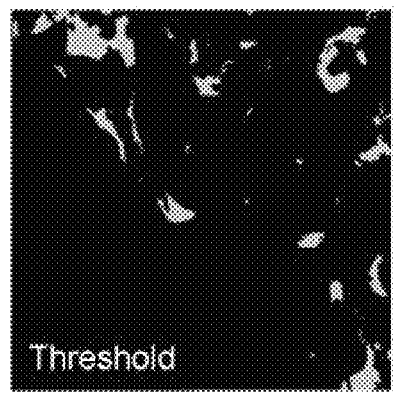
Figure 30I:
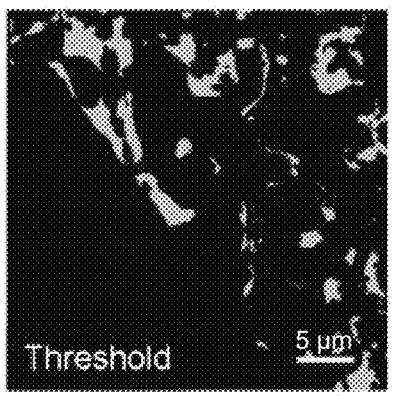

Richardson-Lucy (RL) deconvolution has been actively studied for many reasons including its potential on improving the resolution and contrast of the raw images. Nevertheless, the traditional RL algorithm also suffers the risk of producing artifacts when performing excessive iterations, which greatly limits its application. The common usage of RL requires a cumbersome visual inspection to determine the best number of iterations. Here, to ascertain the rFRC value readouts guiding such determination for RL iteration times, RL is applied to process the TIRF image (FIG. 21G, FIGS. 30A-30I) and then its related rFRC value is calculated for each iteration cases (FIG. 21H, right panel of FIG. 21J). FIG. 30A illustrates a result of TIRF. FIGS. 30B and 30C illustrate results of RL deconvolution with 80 iterations and 200 iterations, respectively. FIG. 30D illustrates corresponding TIRF-SIM image. FIGS. 30E and 30F illustrate rFRC maps of FIGS. 30B and 30C. FIG. 30G illustrates the TIRF image convoluted with large Gaussian kernel and coded with inverted sJet colormap. Inverted illumination intensity map (FIG. 30G) is proportional to the rFRC map (FIG. 30E) which indicated that the degree of the errors in the results of RLD is high correlation to the SNR. FIGS. 30H and 30I illustrate PANELs of FIGS. 30B and 30C. Interestingly, comparing to the curve distribution of peak signal to noise ratio (PSNR, left panel of FIG. 21J), in which the corresponding TIRF-SIM image is employed as a ground-truth, it is found that the curve of rFRC values presents a similar distribution (quadratic form, the minimum value appears at 80 iterations). By contrast, the curve of resolution-scaled Pearson coefficient (RSP) clearly failed to represent such instructive distribution (middle panel of FIG. 21J). As demonstrated in FIG. 21I, the RL deconvolution with 200 iterations produced the snowflake like artifacts as pointed by white arrows, which could be validated inexistent by the referenced TIRF-SIM image. By comprehensive comparison it is demonstrated that RL with 80 iterations optimally enhanced the image contrast with the slightest noise amplification induced artifacts.

Figure 24B:
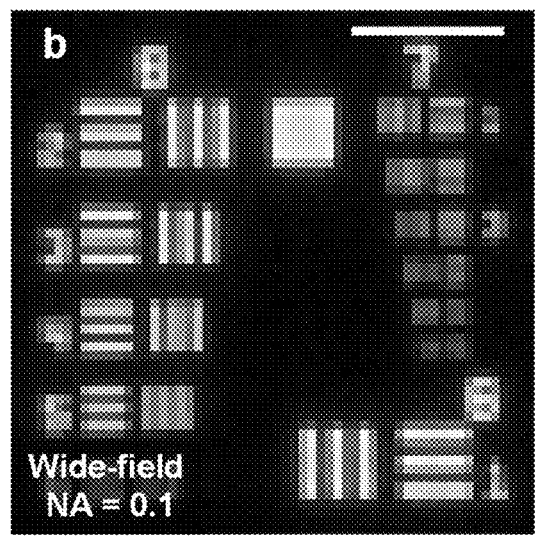
Figure 24C:
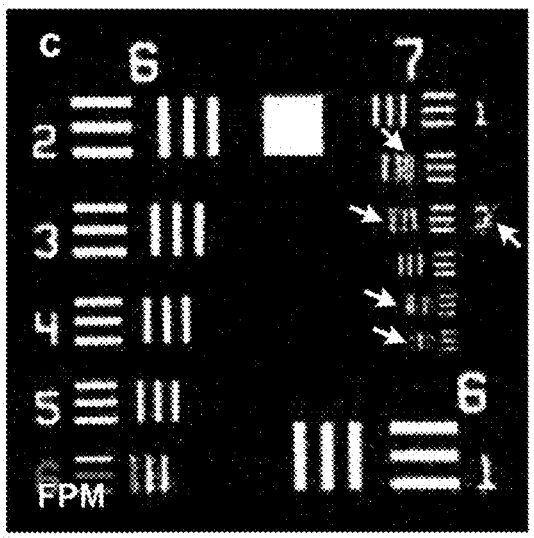
Figure 24D:
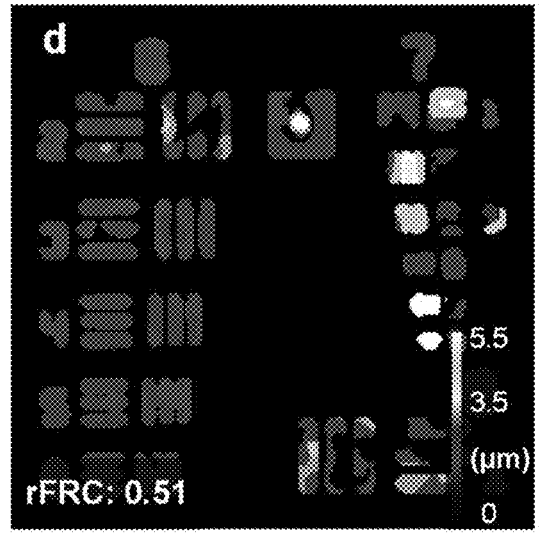
Figure 24E:
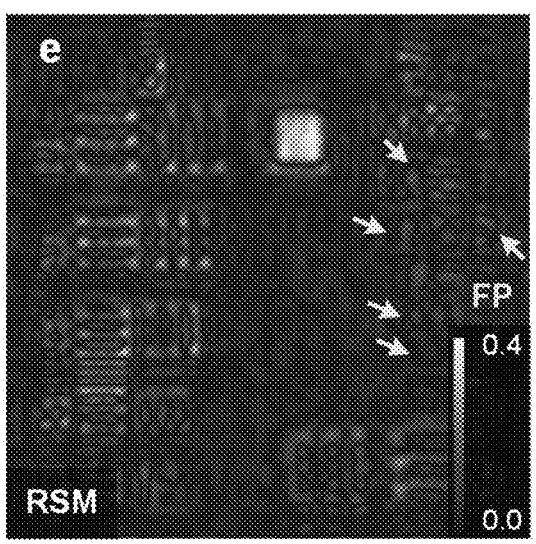
Figure 24F:
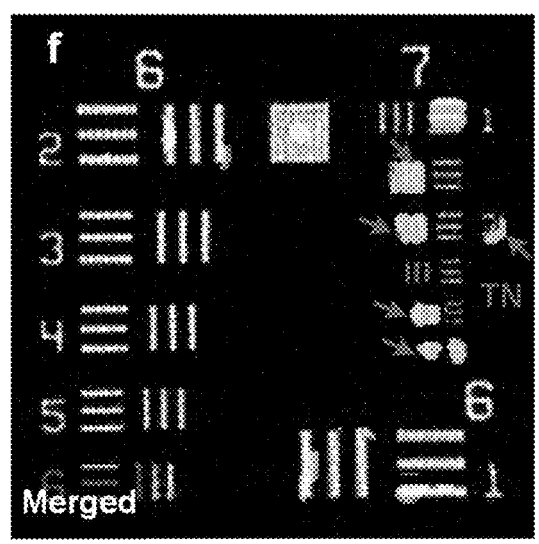
Figure 25A:
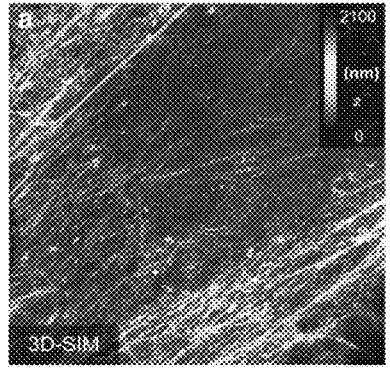
Figure 25B:
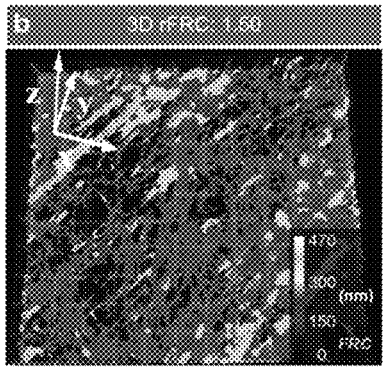
Figure 25C:
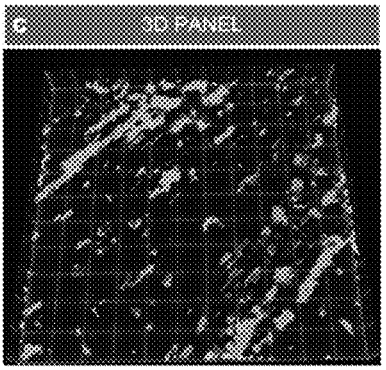
Figure 25D:
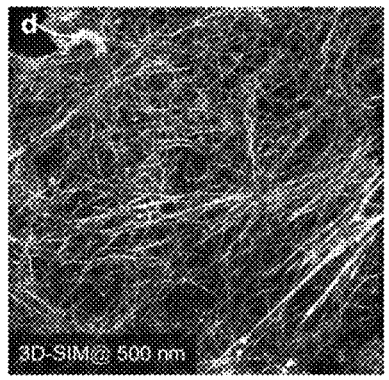
Figure 25E:
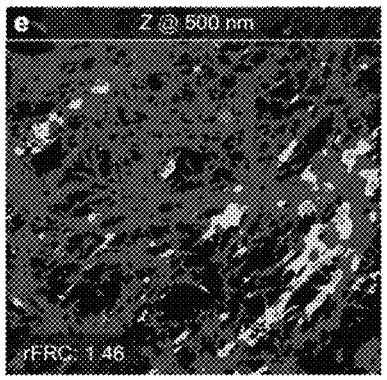
Figure 25F:
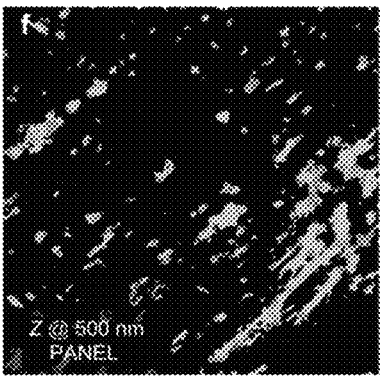
Figure 25G:
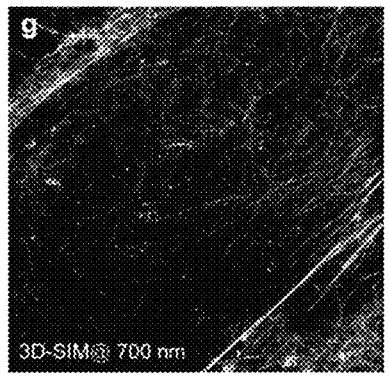
Figure 25H:
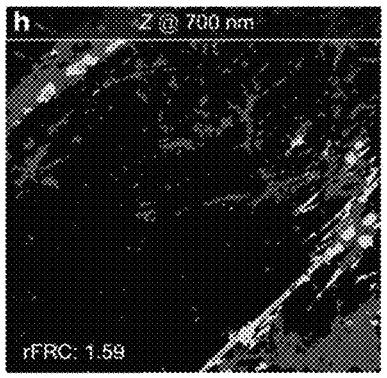
Figure 25I:
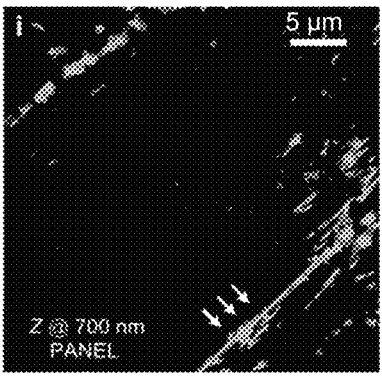

Not only the typical fluorescent modalities, the coherent computational imaging techniques, e.g., Fourier ptychographic microscopy (FPM), can also be evaluated effectively by using PANEL to develop and attain its full practical potential (see Method, FIGS. 24A-24F). FIG. 24A illustrates an image showing simulated ground-truth. FIG. 24B illustrates a wide-field image of FIG. 24A. FIG. 24C illustrates an image showing corresponding FPM reconstruction. FIG. 24D illustrates an rFRC map of FPM. FIG. 24E illustrates an image showing RSM of FPM. FIG. 24F illustrates an merged image of PANEL (light gray channel) and FPM (dark gray channel). In addition, the proposed PANEL framework was also extended to its single-frame version aiming to access the image quality of the modalities when limited to form statistically independent image subsets such as 3D-SIM (see FIG. 25). FIG. 25A illustrates an image showing color coded volumes of a HUVEC, which was transfected with LifeAct-EGFP and imaged with the Nikon 3D-SIM microscope. FIGS. 25B-25C illustrate 3D rendered rFRC map displayed with sJet color map (FIG. 25B) and after ostu threshold in green channel (FIG. 25C). FIGS. 25D-25F illustrate 3D-SIM image at 500 nm in axial position (FIG. 25D), the corresponding rFRC map (FIG. 25E), and its PANEL result(FIG. 25F). FIGS. 25G-25I illustrate 3D-SIM image at 700 nm in axial position (FIG. 25G), the corresponding rFRC map (FIG. 25H), and its PANEL result (FIG. 25I). As pointed by white arrows (FIG. 25I), it is found that the large error may exist in the regions contained thick actin stress fibers (or strong stress fibers) which can scatter and distort the structured incident light.

Example 4 Validation of PANEL Using Simulations of Learning-Based Approaches

Deep learning algorithms are able to learn effective representations which can map high dimensional data to an array of outputs. However, these mappings are often lack of rational explanation and even blindly assumed to be accurate. Therefore, characterizing the uncertainty of the corresponding network predictions and representations are crucial for further profiling, especially in safety-critical applications. In general, to obtain the uncertainty for such learning-based approaches, the conventional Bayesian neural networks framework, by learning a distribution over weights, requires significant modifications to the existing training procedure. However, the potential drawbacks of BNNs are considerably complicated in applications and computationally expensive compared to original learning-based techniques. To moderate this conflict, the concept of PANEL is intend to be transferred to the learning-based models allowing identify subtle and irregular errors generated by the black-box deep neural networks.

Figure 27A:
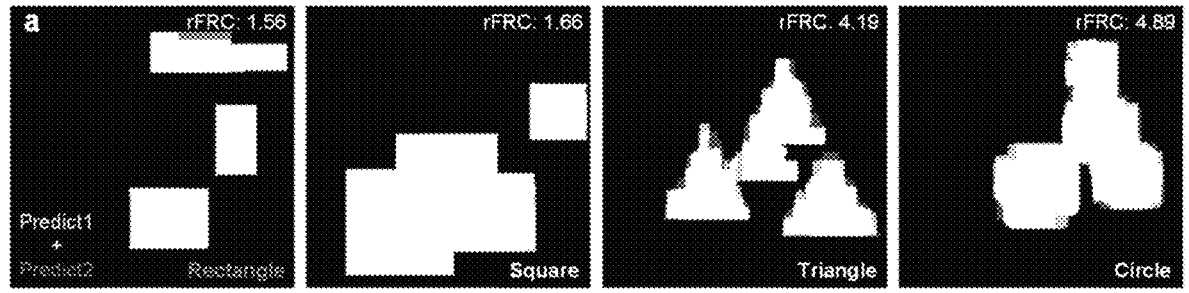
Figure 27B:
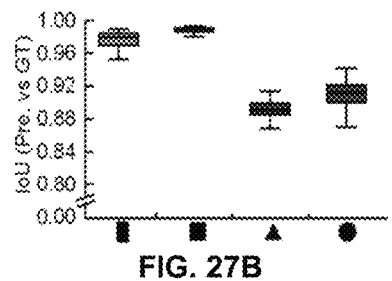
Figure 27C:
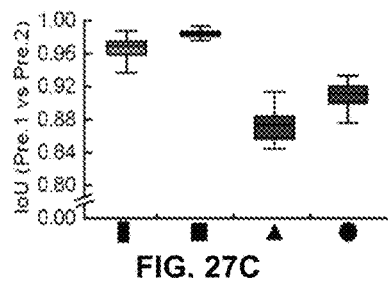
Figure 27D:
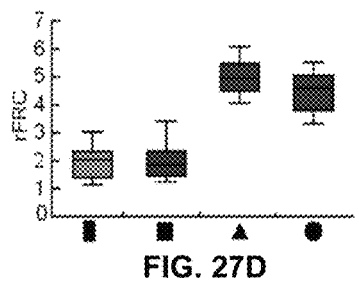
Figure 27E:
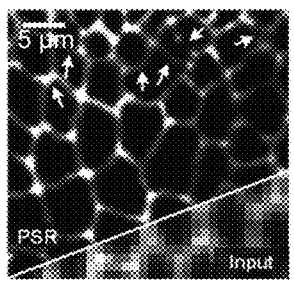
Figure 27F:
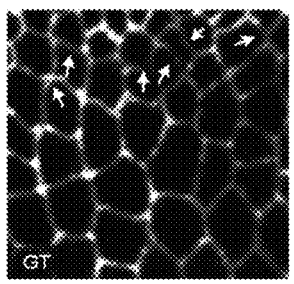
Figure 27G:
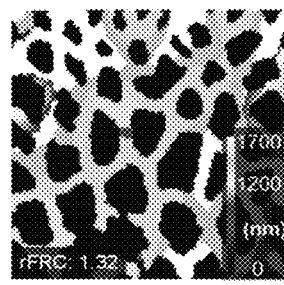
Figure 27H:
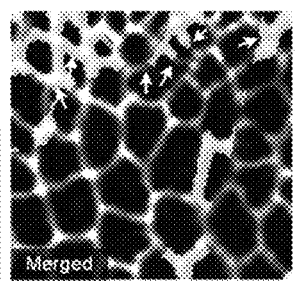
Figure 27I:
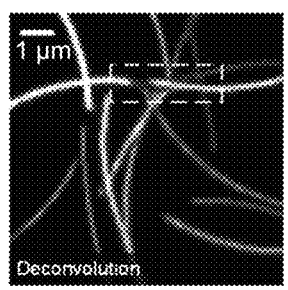
Figure 27J:
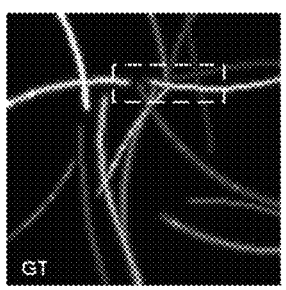
Figure 27K:
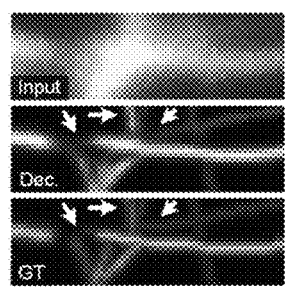
Figure 27L:
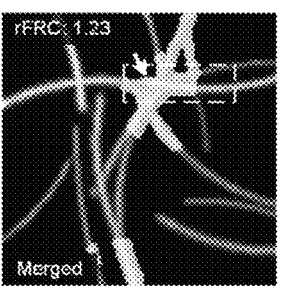

At first, four simple types of structures are created and sampled to a sparse form (see FIG. 26). FIG. 26 illustrates an image showing full sparse sampling simulation in which rectangles (top) are used as training dataset, and the other geometry (squares, circles, and triangles) are used as test dataset (from top to bottom), "Input" means representative sparsely sampled input of corresponding geometry; "Prediction1" means network prediction of "Input"; "Ground-truth" means before sparse sampling; "GT+Prediction" means merged image of ground-truth in green channel and prediction result in red channel; "Prediction1+Prediction2" means merged image of two predictions; "Merged" means Merged image of PANEL in green channel and prediction result in white channel. The corresponding input images of "Prediction1" and "Prediction2" are sampled independently. In an effort to study generalization effects, the resulting structures with (as model-input) or without (as ground-truth) sparse sampling are used as the data pairs to validate the applicability of PANEL in learning-based approaches. The rectangle shape is employed as training datasets, and the square, triangle, and circle are used as the test datasets. Predictably, the squares can be regarded as a subset of rectangles, thereby the network trained by rectangle shape performed well for the square dataset. Interestingly, it can be found in FIG. 27A, when the networks were in face of data without presenting in the training sets (out-of-distribution data), e.g., triangle and circle shapes, the returned results still resembled the rectangle-like shapes. FIG. 27A illustrates an image showing representative merged images (prediction 1 as cyan channel, prediction 2 as magenta channel) of rectangle, square, triangle, and circle structures as shown from left to right. FIG. 27B illustrates an image showing average IoU values from prediction versus ground-truth. FIG. 27C illustrates an image showing average IoU values between two predictions. FIG. 27D illustrates an image showing average rFRC values between two predictions. FIG. 27E illustrates an image showing representative result (left top) after pixel super-resolution ('PSR') and the corresponding under sampled input (right bottom). FIG. 27F illustrates an image showing a ground-truth ('GT') reference of FIG. 27E. FIG. 27G illustrates an rFRC map of the PSR result. FIG. 27H illustrates a merged image of PANEL (green channel) and PSR result (gray channel). FIG. 27I illustrates an image showing a representative result of deconvolution network. FIG. 27J illustrates an image showing a corresponding ground-truth ('GT') of FIG. 27I. FIG. 27K illustrates an image showing magnified views from white dashed boxes in FIG. 27I and FIG. 27J. FIG. 27L illustrates a merged image of PANEL (green channel) and deconvolution result (gray channel).

To verify the PANEL capacity for detecting such structural artifacts (model errors) introduced by the deep learning framework, the identical structures are sampled twice individually to generate two predictions (denoted as the Prediction1 and Prediction2 in FIG. 27A). To assess the difference between two predictions directly, the metric intersection is chosen instead of union (IoU, also known as the Jaccard index). As can be seen in FIG. 27B and FIG. 27C, the average IoU value between Prediction1 and Prediction2 represented an identical distribution to the case between ground-truth and Prediction1. Moreover, it is clearly represented in FIG. 27D that the pattern of the averaged rFRC values is commendably resembled to one of the IoU values, validating that the proposed concept and rFRC metric has the ability to quantitatively analyze the learning-based approaches.

Figure 31A:
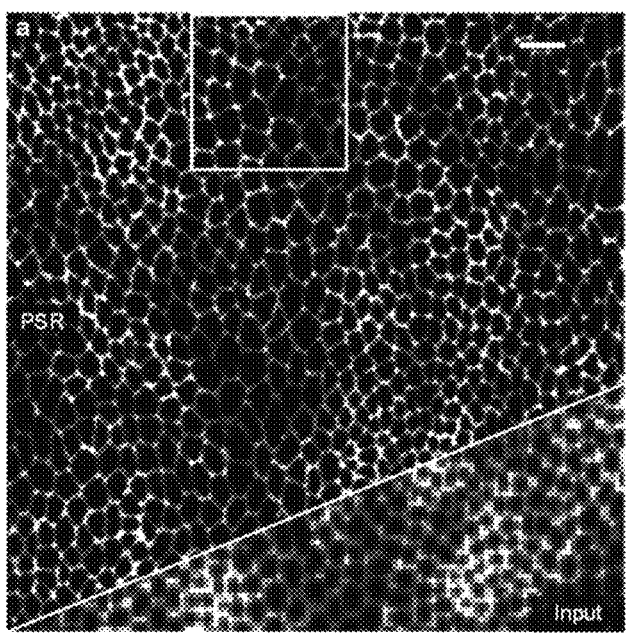
Figure 31B:
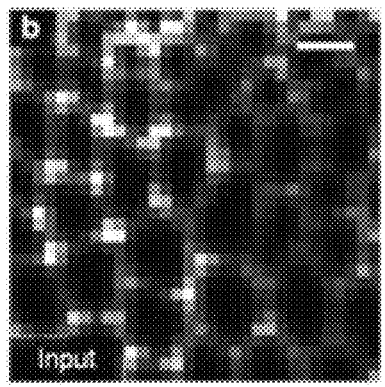
Figure 31C:
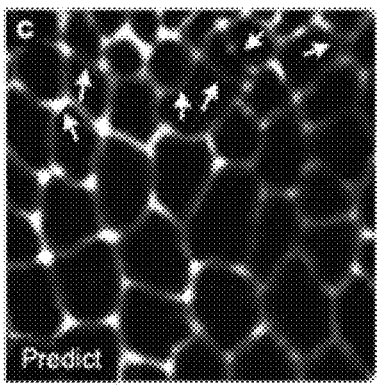
Figure 31D:
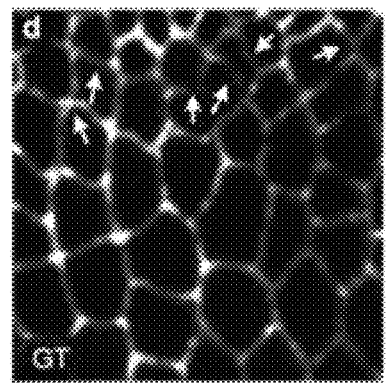
Figure 31E:
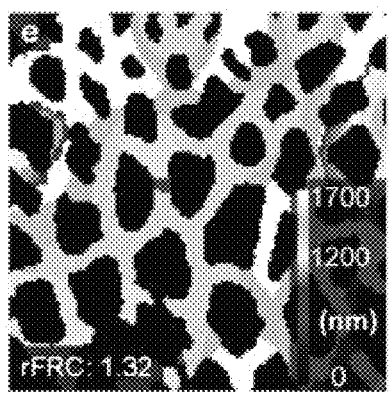
Figure 31F:
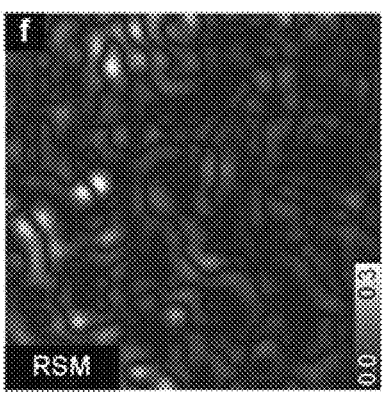
Figure 31G:
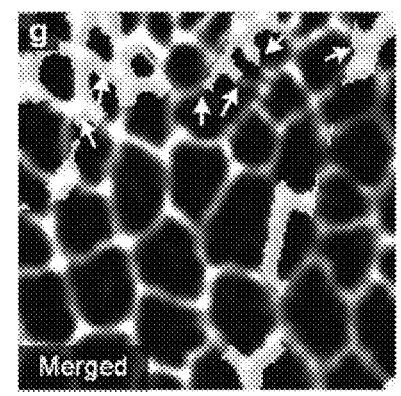

Next, to examine the PANEL more thoroughly, another simulation validation is also provided, i.e., pixel super-resolution (PSR, FIG. 27E, FIGS. 31A-31G) to assess its usability for the learning-based applications. FIG. 31A illustrates a result (left top) after pixel super-resolution (PSR) and the under-sampled input (right bottom). FIG. 31B illustrates magnified view of under-sampled input from white box in FIG. 31A. FIG. 31C illustrates the network prediction of FIG. 31B. FIG. 31D illustrates corresponding ground-truth ("GT") of FIG. 31B. FIG. 31E illustrates rFRC map of FIG. 31C. FIG. 31F illustrates estimated RSM of FIG. 31C. FIG. 31G illustrates the merged image of PANEL (light gray channel) and PSR result (dark gray channel). In this case, the corresponding deep neural network was trained by the data pair when the raw images were used as the ground-truth, and the corresponding down sampled ones were regarded as the input images. Compared to the ground-truth (FIG. 27F), as the targeted artifact regions being pointed by the white arrows, it is adequately verified that the rFRC map (FIG. 27G) can accurately detect the errors contained in the network prediction (FIG. 27H) and provide a quantitative evaluation at pixel-level.

In addition, for convenient applications, a special single-frame version rFRC computation strategy is also involved for the learning-based applications. Another learning-based task, i.e., deconvolution is used to evaluate such strategy (FIG. 27I, FIGS. 32A-32J). FIG. 32A illustrates an input image. FIG. 32B illustrates the DNNs result. FIG. 32C illustrates the ground-truth (GT) of FIG. 32A. FIG. 32D illustrates the magnification views from white dashed boxes in FIGS. 32A-32C. FIG. 32E illustrates RSM of FIG. 32A. FIG. 32F illustrates the merged image PANEL (WHITE), with DNNs result (gray). FIG. 32G illustrates inverted SSIM map of FIGS. 32B and 32C. FIG. 32H illustrates convolved back of FIG. 32B. FIGS. 32I and 32J illustrate rFRC maps of DNNs results from input images with 1%, and 1.5% additive Gaussian noise. TN: true negative; FN: false negative; FP: false positive. Intuitively, by contrast to ground-truth (FIGS. 27J-27K), the single-frame strategy also showed its superior quantitative performance to access the image quality (FIG. 27L) as pointed by white arrows.

Example 5 the Reliability of PANEL on Various Learning-Based Imaging Methods

After being analyzed and examined, the usability of PANEL is next applied to evaluate the performances for three typical open-source learning-based models, including artificial neural network accelerated PALM17 (ANNA-PALM, FIG. 28A), content-aware image restoration (CARE, FIG. 28E), and TIRF transforming to TIRF-SIM (TIRF2SIM, FIG. 28I). FIG. 28A illustrates an image showing an ANNA-PALM output (25 frames MLE result of tubulin as input). FIG. 28B illustrates an image showing an MLE reconstruction with full 500 frames. FIG. 28C illustrates an rFRC map of FIG. 28A. FIG. 28D illustrates a merged image of PANEL (green channel) and ANNA-PALM result (gray channel). FIG. 28E illustrates an image showing a CARE output of GFP-tagged microtubules in live HeLa cells (raw TIRF image as input). FIG. 28F illustrates an image showing a CARE convolved back to its original low-resolution scale (top) and its RSM (bottom) result. FIG. 28G illustrates a corresponding TIRF image. FIG. 28H illustrates a merged image of PANEL (green channel) and CARE result (gray channel). FIG. 28I illustrates an image showing a TIRF2SIM result of CCPs (gene-edited SUM159 cell expressing AP2-eGFP). FIG. 28J illustrates a TIRF-SIM image. FIG. 28K illustrates an image showing a TIRF input. FIG. 28L illustrates a merged image of PANEL (green channel) and TIRF2SIM result (gray channel). FIG. 28M illustrates an image showing a Noise2Noise result of EGFP labeled Tg (sox10:megfp) zebrafish at 2 days post fertilization. FIG. 28N illustrates a ground-truth reference image generated by averaging 50 noise images with the identical content. FIG. 28O illustrates an image showing a representative noisy input. FIG. 28P illustrates a merged image of PANEL (green channel) and Noise2Noise result (gray channel).

In the case of ANNA-PALM, the sparse MLE reconstruction (containing 25 frames) is used as the input image of the network, (FIG. 28A, FIGS. 33A-33I), and the rFRC is employed in conjunction with RSM for complementation. FIGS. 33A-33C illustrate MLE reconstruction with 25 frames (FIG. 33A) and full 500 frames (FIG. 33B), and corresponding ANNA-PALM output (25 frames MLE result as input) (FIG. 33C). FIGS. 33D-33I illustrate merged MLE (gray) and ANNA-PALM (white) results (FIG. 33D), PANEL result (FIG. 33E), TIRF image (FIG. 33F), convolved back ANNA-PALM (FIG. 33G), RSM (FIG. 33H), and rFRC map (FIG. 33I). Comparing with the ground-truth dense MLE reconstruction result (containing full 500 frames, FIG. 28B), it indicated by cyan arrows that the rFRC map (FIG. 28C, white channel in FIG. 28D) successfully dissected the subtle errors. In the meantime, as pointed by the white arrows, the RSM (white channel in FIG. 28D) found the large missing structures. Based on these practical results attained, it provides that the integral PANEL map efficaciously detected all the types of errors under different scales contained in ANNA-PALM method.

In the deconvolution application of CARE20, considering the network output (FIG. 28E) and input (FIG. 28G) dissatisfied the Gaussian convolution assumption, so in this case the RSM failed to transform the output to its low-resolution scale accurately (FIG. 28F, FIGS. 34A-34F), as the probable false negative being indicated by purple circles. FIG. 34A illustrates TIRF image input. FIG. 34B illustrates CARE prediction of FIG. 34A. FIG. 34C illustrates full color-coded rFRC result. FIG. 34D illustrates the merged image of PANEL (light gray channel) and CARE result (white channel). FIG. 34E illustrates CARE prediction convolved back by the estimated RSF. FIG. 34F illustrates RSM result of FIG. 34B. RSF: Resolution scaled function. RSM: Resolution scaled error map. On the contrary, as being pointed by the cyan circles, the obvious un-biological structures generated neighboring the boundary of field-of-view are effectively detected by the rFRC map (green channel in FIG. 28H). Applying the single-frame rFRC computation strategy, it is found that the TIRF2SIM19 application (FIGS. 28I-28L) can also be evaluated by the PANEL. Displayed in the insets of FIGS. 28I-28K, the two adjoined CCPs in TIRF-SIM (indicated by two green circles in FIG. 28J) are falsely reconstructed to a single large one (indicated by one white circle in FIG. 28I) by the networks, and the rFRC map (white channel in FIG. 28L) approach accurately dissects such refined errors.

Figure 35A:
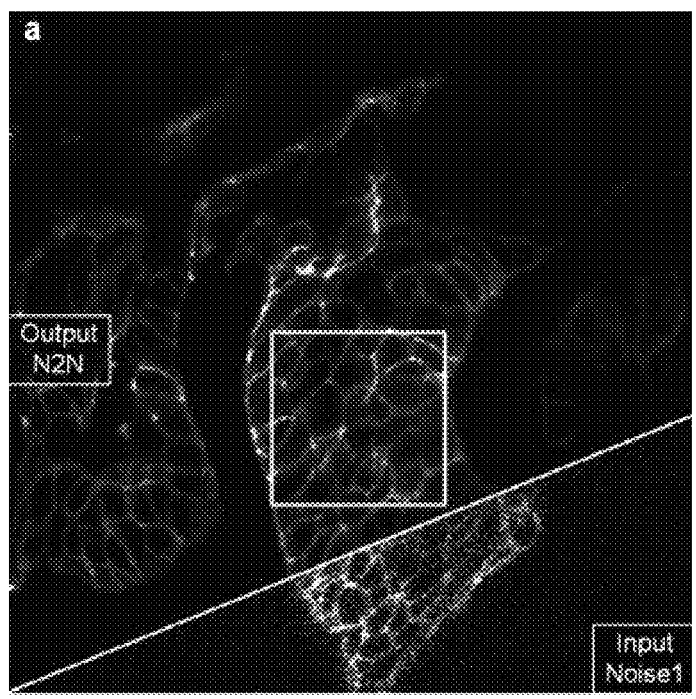
Figure 35B:
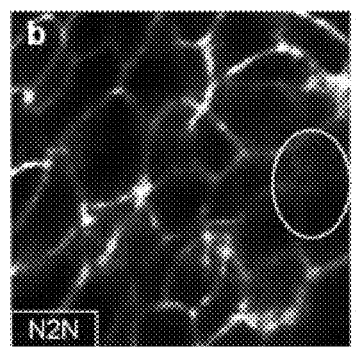
Figure 35C:
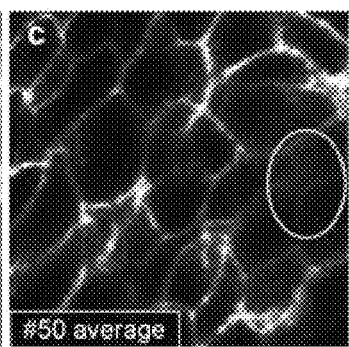
Figure 35D:
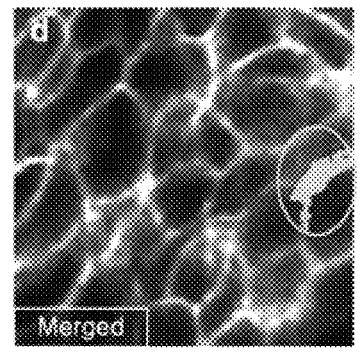
Figure 35E:
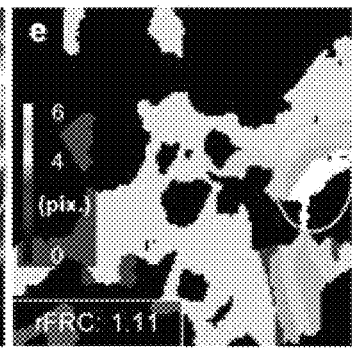

The performance of PANEL is further tested to access the performance of non-super-resolution learning-based applications, e.g., denoising task. Noise2Noise38 is a widely used unsupervised learning-based approach with its advantage in denoising noisy images with no need of clean ones. For such unsupervised learning model, the networks are only looking at the noisy image pairs during training, in which the two images with independent noise share identical details, and in other words, one image is used as the input and the other one is used as output target. In this part, the Fluorescence Microscopy Denoising (FMD)59 datasets are involved for training the network of Noise2Noise (see Method, FIGS. 28M-28P, FIGS. 35A-35E), and due to unsatisfied to the assumptions of RSM, the RSM is removed from the PANEL framework in this example evaluation. According to the reconstruction and assessment in FIGS. 28M-28P, it is clearly that the Noise2Noiseworks effectively except the region highlighted by the insets of FIGS. 28M-28P, in which the suspicious areas are pointed by white arrows, and it demonstrates that the rFRC map (white channel in FIG. 28P) can detect such type of errors accurately. FIG. 35A illustrates result (left top) after Noise2Noise (N2N) and the noisy input (right bottom, Noise1). FIG. 35B illustrates the Noise2Noise result from white box in FIG. 35A. FIG. 35C illustrates the reference image by averaging 50 noise images with the identical content. FIG. 35D illustrates the merged image of PANEL (light gray channel) and Noise2Noise result (dark gray channel). FIG. 35E illustrates the rFRC map of FIG. 35B.

As illustrated above, a comprehensive, reliable, and universal quantitative mapping of errors in super-resolution scale, independent of any referenced information, may be crucial as the computational and learning-based super-resolution techniques being emerging in bioimaging sciences. By virtue of tracing quantitative error maps up to super-resolution scale, evaluating the reconstruction quality at pixel-level may be realized, which enables the further design of the computational processes, e.g., STORM image fusion, adaptive low-pass filter, and automatic iteration determination. Besides, the proposed rFRC map may also be a superior choice to access the quality metric against the ground-truth and to estimate the local resolution map of images.

In principle, there may be exiting two major categories of reconstruction errors in computational microscopy imaging, including the model error and the data error. The model error may be mainly caused by the existing distance between the artificial created estimation model and its real model in physical world, and in case of learning-based microscopy, such distance may come from the ignorance of networks about the out-of-distribution data. The data error may be mostly introduced by joint effects of the noise condition and sampling capability of the hardware equipment, such as the sensors and cameras in microscopy systems. Based on the theory of the corresponding models, the model-related errors may be be discovered and reduced by carefully system calibration in physical imaging systems, and it can be explained away by specific designed strategy or enough training data in learning-based applications. On the other hand, data error may be fundamental model-free, which is inevitable and hard to restrain by artificial system calibration methods or explained away with more training datasets. Taken together, it may suggest that the estimation of such data error may be more crucial in biological analysis. In some embodiments, aiming to develop an absolute model-free quantitative method, the PANEL may be based on only one assumption, i.e., the model for reconstruction is unbiased. It means that the proposed PANEL method can detect the data error existed in various techniques successfully, but it may be also needed to note that it may be limited to estimate the model error.

In particular, considering the learning-based applications, the model error can be simply estimated by the ensemble disagreement of independently training repeated models on the same dataset with multiple times of random initialization and optimization processes. Moreover, as a pure data-driven approach which learns representations of training data, the model error and data error in such learning-based applications may not be mutually exclusive. The PANEL framework has been shown the possibility to detect both the model and data errors as demonstrated in FIG. 27A. The model error from predictions of the out-of-distribution test samples (rectangle as training data, tringle/circle as test data) can be detected effectively by the PANEL concept and rFRC metric (FIGS. 27B-27D). Alternatively, the data uncertainty and model uncertainty can also be estimated by applying rFRC map to the twin predictions from two inputs (from data sampling twice) and two models (from network training twice) respectively.

As a model-unrelated and reference-free metric, the PANEL method can dissect the local reconstruction quality of images from various modalities with no need of any extra prior knowledge. The PANEL may focused on detecting the data error, rather than the model error. Nevertheless, when considering data-driven approaches, the data error may be generally mixed with a part of model error, leading the PANEL potentially assessing the model error in some degree. After fully reflecting on the abilities and boundaries of corresponding approaches, the PANEL may provide a universal and reliable local reconstruction quality rating framework, and may benefit the image-based biological profiling, as well as inspire further advances in the rapidly developing field of computational microscopy imaging.

The following examples 6-11 describes new insights and extended applications for PANEL.

Example 6 Errors in SMLM, SIM, and Deconvolution

Errors in SMLM. It is found that the accuracy of SMLM is highly related to the molecular activated density in each frame. In small field of view, it can be considered as homogenous illumination (homogenous activated density), and the errors may more often happen in the complex structures, e.g., intersections of filaments (FIGS. 18A-18L). In large field of view, as the molecular activated density is related to the illumination intensity (higher intensity is corresponding to lower activated density), the errors may more often occur in the areas with low-intensity illumination (FIGS. 17G, 17H and 17P).

Errors in SIM and deconvolution. The high-frequency errors (smaller than resolution), e.g., snow-flake artifacts, in SIM or deconvolution is failed to be detected by PANEL. The error magnitudes in SIM and deconvolution are found to be related to the emission intensity of the fluorescent signals (FIGS. 29A-29I, FIGS. 30A-30I), and it is reasonable that the quality of reconstruction results of SIM and deconvolution is related to the SNRs of images, in which the SNRs are somehow proportional to the signal magnitude.

Example 7 Adaptive Low Pass Filter Based on rFRC

Figure 36A:
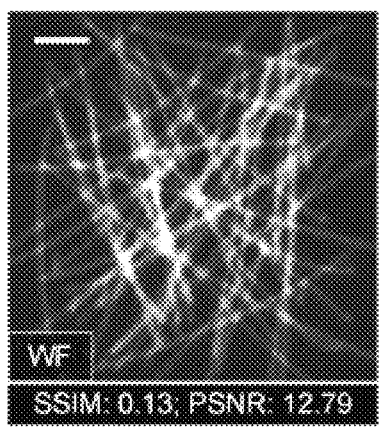
Figure 36B:
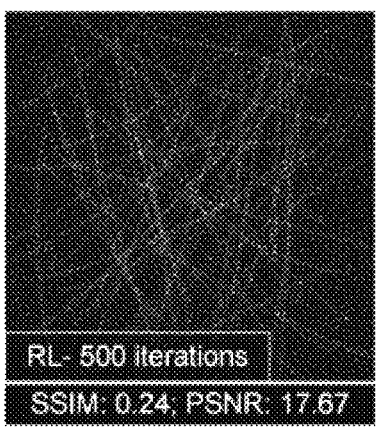
Figure 36C:
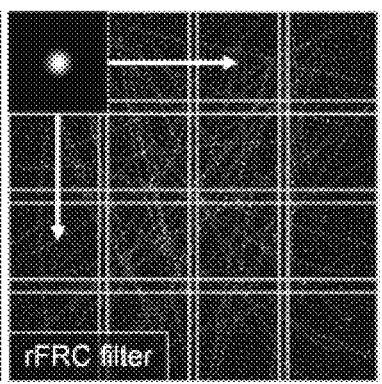
Figure 36D:
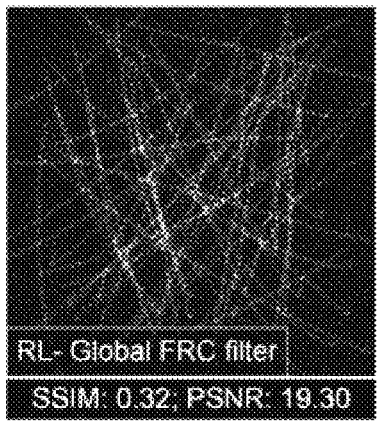
Figure 36E:
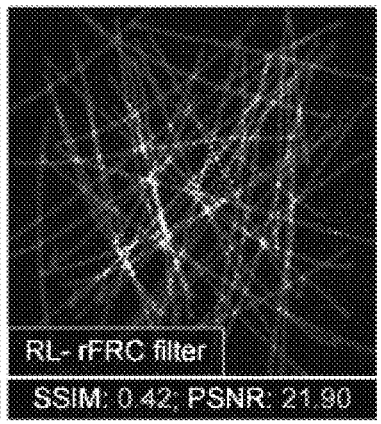
Figure 36F:
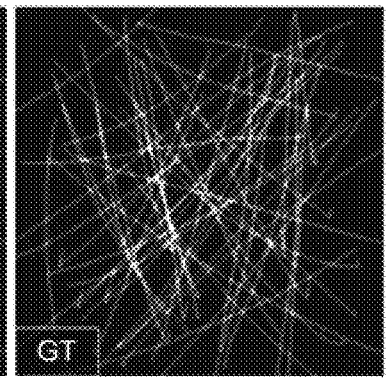

The FRC determines the reliable cut-off frequency (COF) of the images, indicating that the frequency components larger than cut-off frequency are full of noise or errors. Because the rFRC calculates the local cut-off frequency in different areas of the image, here, the local cut-off frequency for adaptively applying low-pass filters is applied to the different block-box areas within the entire image:

$$\mathcal{F}^{-1}\{\mathcal{F}(I_{x,y}) \cdot OTF(F_{x,y})\}, \tag{30}$$

where $I_{x,y}$ represents the subset image of the input image, whose center pixel is at the spatial position (x, y); and $OTF(F_{x,y})$ is the optical transfer function (OTF) with the cut-off frequency $F_{x,y}$, in which out of cut-off frequency is set as 0, and inside as 1. Considering the Richardson-Lucy deconvolution (RLD), the image quality of the reconstruction result is highly related to the corresponding local SNR, hence such reconstruction result is usually with the spatial variant cut-off frequency. FIG. 36A illustrates a simulated wide-field image. FIG. 36B illustrates an image after performing RLD with 500 iterations on the simulated wide-field (WF) image of FIG. 36A. FIG. 36C illustrates a workflow of an adaptive filter on an image, wherein the block size of filter is set as 64×64 pixels, and the overlap between adjacent block is set as 4 pixels. FIG. 36D illustrates an image after performing the global estimated cut-off frequency filter on the image of FIG. 36C. FIG. 36E illustrates an image after performing the adaptive local filter on the image of FIG. 36A. FIG. 36F illustrates the ground-truth (GT) image of FIG. 36A. The ground-truth image was convoluted with PSF (FWHM=240 nm), and involved with the Poisson and 10% Gaussian noise. The global FRC filter may not achieve an optimal result (see FIG. 36D, SSIM=0.32, PSNR=19.30), and in comparison, the designed adaptive rFRC filter is a superior choice to filter the image after Richardson-Lucy deconvolution (see FIG. 36E, SSIM=0.42, PSNR=21.90).

The global FRC value was used to estimate the OTF of the entire image, and such estimated OTF was applied in the blind Richardson-Lucy deconvolution. However, the FRC can estimate the effective OTF (the reliable frequency components), rather than the native resolution of a system. In another word, the FRC may be much influenced by the noise amplitude. The large noise amplitude may dominate the frequency components, even inside the OTF, which can influence the FRC inferring the native resolution of the system (leading to a larger resolution). The RLD needs the static OTF instead of the effective OTF of the system. Therefore, such operation introduces a natural assumption that the image to be processed by RLD is under a sufficiently high SNR.

Example 8 SMLM Fusion Based on an rFRC Map

Figure 37A:
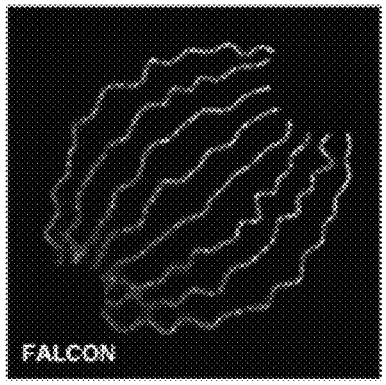
Figure 37B:
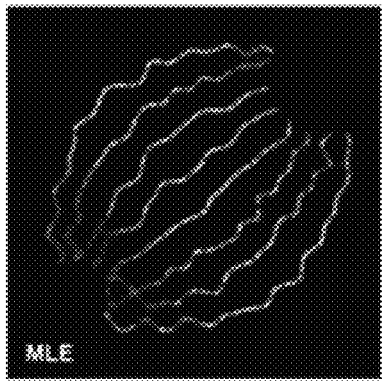
Figure 37C:
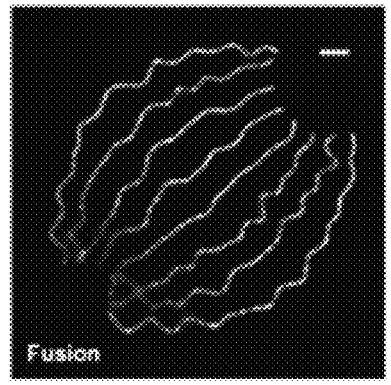
Figure 37D:
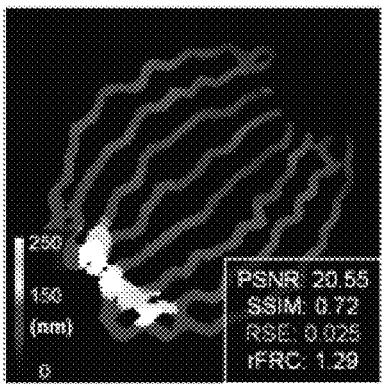
Figure 37E:
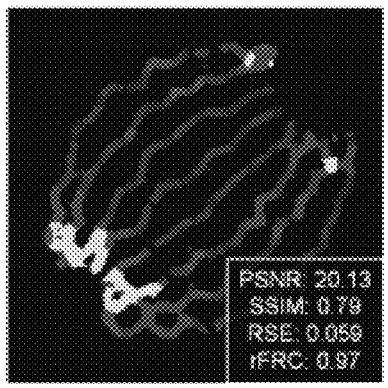
Figure 37F:
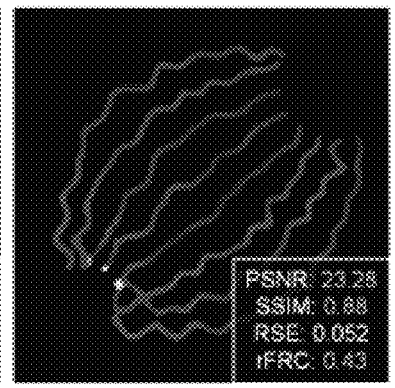
Figure 37G:
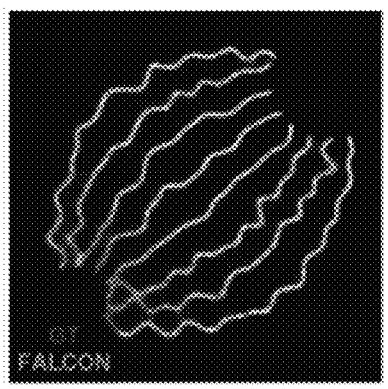
Figure 37H:
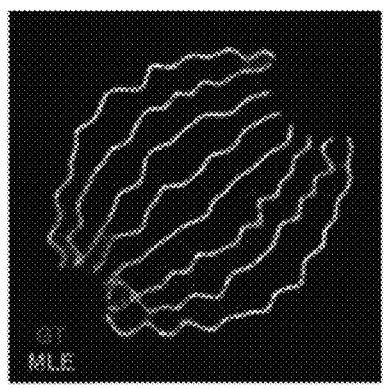
Figure 37I:
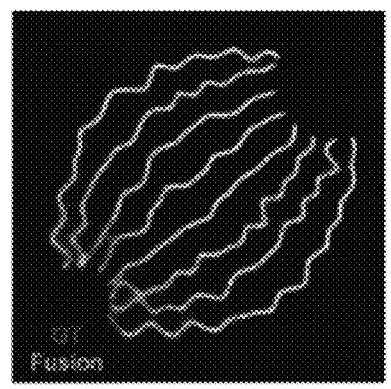

Developing such rFRC quality metric, the different localization results may be fused according to the weight of rFRC map to combine the respective advantages of different models.

$$\frac{\sum_{n=1}^{N} L_n \cdot \{G(\sigma) \otimes (\max(F_{1-N}) - F_n)\}}{\sum_{n=1}^{N} G(\sigma) \otimes (\max(F_{1-N}) - F_n)}, \tag{31}$$

where $L_n$ is the result of the $n^{th}$ localization model, and $G(Q)$ represents the Gaussian kernel with a $\sigma$ standard variance. The $\max(F_{1-n})$ is the maximum FRC value of the total N localization results and $\otimes$ is the convolution operation. The G(σ as 4 pixel) is used to slightly blur the rFRC map avoiding the sharp pixel-wise changes. The RSM estimates the errors in the low resolution scale, hence it is not suitable to assist in the SMLM fusion (see FIGS. 38A-38F). In contrast, the rFRC estimates the degree of error in the corresponding super-resolution scale, and it is taken for a superior choice to guide the fusion of SMLM (see FIGS. 37A-37I). FIG. 37A illustrates the reconstructed results using FALCON. FIG. 37B illustrates the reconstructed results using MLE models. FIG. 37C illustrates the fused result of FIGS. 37A and 37B. FIGS. 37D-37F illustrate the rFRC maps of FIGS. 37A-37C, respectively. FIGS. 37G-37I illustrate merged images with FIGS. 37A-37C (light gray) and the ground-truth (dark gray). FIGS. 38A and 38B illustrate the fused results with an rFRC map and RSM, respectively. FIGS. 38C and 38D illustrate rFRC maps of FIGS. 38A and 38B, respectively. FIG. 38E illustrates magnified views of white dashed box 1 in FIGS. 38A and 38B and the corresponding ground truth. FIG. 38F illustrates magnified views of white dashed box 2 in FIGS. 38A and 38B and the corresponding ground truth.

Example 9 Determining Iteration Times of Deconvolution Via rFRC

The optimal number of iterations of Richardson-Lucy deconvolution (RLD) is commonly determined by the artificial examination by observing on the results or the convergence of the reconstruction. However, the artificial examination is usually troublesome, which limits the automatical image analyze. On the other hand, sometimes the RLD may never run to convergence under the low SNR condition, and in this case the iteration should be shut down at an early age (before convergence) to avoid oversharping the structures and producing disconcerting artifacts. The reported rFRC is used to estimate the local reliable cut-off frequency to determine the optimal iteration times automatically. In specific, a higher reliable cut-off frequency is intend to be obtained, which indicates higher resolution and is equal to smaller rFRC value by the RLD process, so the optimal iteration should be the one with the minimum rFRC value.

The images captured by TIRF and TIRF-SIM are used as the data pair as shown in FIGS. 21G-21J and FIGS. 30A-30I. The TIRF-SIM image is used as the ground-truth which is the target of the RLD on TIRF image. As seen in the FIG. 21J, as the iteration going, the curve of PSNR is represented a quadric form, indicating that more iterations are not necessarily leading to better results. In practice, excessive iterations may induce the artifacts (white arrow in FIG. 21I and FIGS. 30B-30D) and reduce the PSNR value. In this example, considering the optimal PSNR, an "80" times is found to be the optimal number of iterations. According to our observation for "80" and "200" iterations in FIGS. 30B and 30C, "80" iterations enhance the contrast without introducing artifacts, and in contrast the "200" iterations produce the snowflake like artifacts as pointed by white arrows, which can be also validated inexistent by the referenced TIRF-SIM image (FIG. 30D). In addition, the rFRC values in FIG. 21J can determine the optimal choice of the number of iterations, and its curve is also identical to the curve of PSNR, which is calculated against the ground-truth. On the contrary, the resolution-scaled Pearson coefficient (RSP) metric failed to represent such instructive distribution.

Example 10 rFRC as an Error Mapping Method for the Data with a Ground-Truth

An rFRC is initially proposed to map the errors when the ground-truth is absent in real bio-imaging applications, and it can be also seen as a superior choice for error mapping when the data coming with the ground-truth compared to the SSIM for allowing more reasonable evaluations.

Figure 39A:
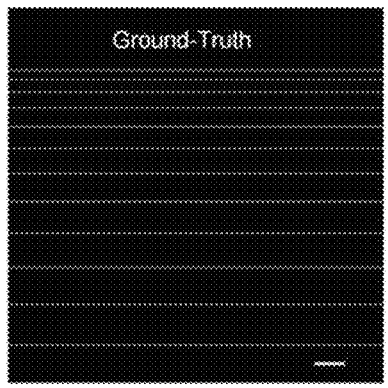
Figure 39B:
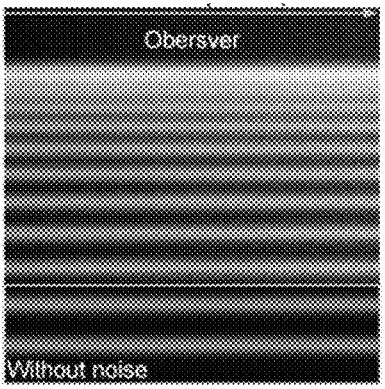
Figure 39C:
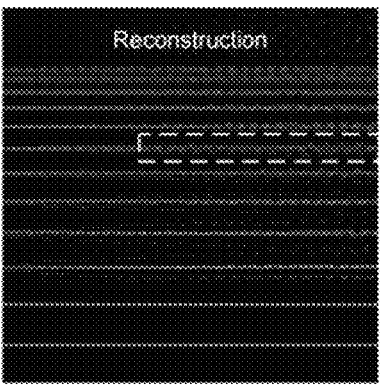
Figure 39D:
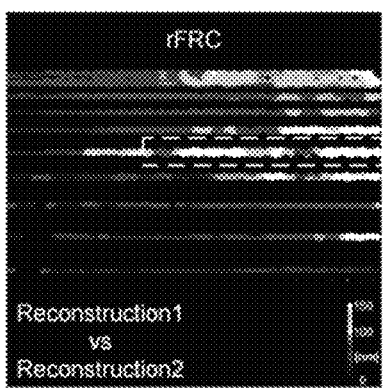
Figure 39E:
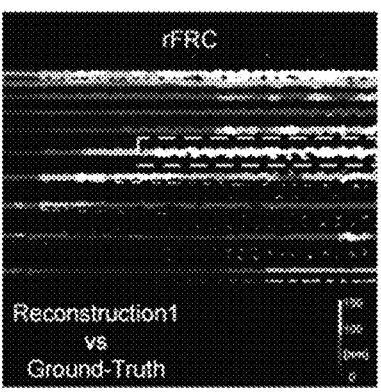
Figure 39F:
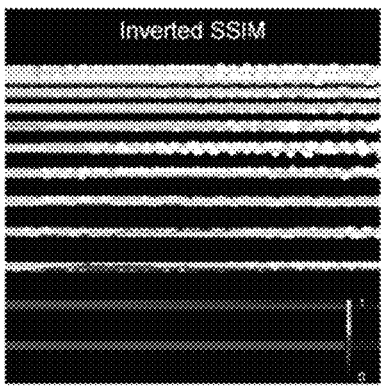

As seen in FIGS. 39A-39F, the filaments were created by different distances, and it was convoluted with a wide-field PSF (NA=1.4). Then, the gradually increased noise (along the arrow in FIG. 39B) was involved in the image in FIG. 39B. The resulting image was obtained by using Richardson-Lucy deconvolution as displayed in FIG. 39C. Compared to the ground-truth as shown in FIG. 39A, it is found that the most significant errors appeared in the white dashed box in FIG. 39B, and the rFRC map accurately detected such error as seen in FIGS. 39D and 30E. On the contrary, as presented in FIG. 39F, the SSIM, such spatial distance estimation approach induced strong false negative, made the true negative hard to dissect or even invisible. It is worth noticing that, the rFRC maps formed by Reconstruction1 and Reconstruction2, or Reconstruction1 and Ground-Truth matched perfectly, also indicating that the PANEL can find errors successfully with no need of the ground-truth. FIG. 39A illustrates a ground truth. FIG. 39B illustrates an image adding gradually increased noise. FIG. 39C illustrates a reconstructed image. FIG. 39D illustrates an rFRC map generated based on Reconstruction1 and Reconstruction2. FIG. 39E illustrates an rFRC map generated based on Reconstruction1 and ground-truth. FIG. 39F illustrates an inverted SSIM.

Example 11 Resolution as an Accompanied Metric

In addition to detecting the exact degree of errors in reconstructions, the rFRC map is also accompanied with the quantitative metric, which is the resolution. Aiming to build up an accurate and practical quantitative tool, three main contributions were realized including that no background induced false negative, more suitable color map sJet for visualization, and pixel-wise resolution mapping. To do so, the rFRC map can be used as a superior choice to evaluate resolution for not only reconstruction results but also the raw data captured by the photoelectric detector, e.g., stimulated emission depletion (STED) microscopy. Due to without background false negative, it is clear that the mean resolution of STED (FIG. 40A) "92 nm" from rFRC map in FIG. 40C and is more reasonable than "146 nm" from FRC map in FIG. 40B. In addition, the "sJet" color-map can provide visualizing the resolution distribution in a higher contrast than previously used "SQUIRREL-FRC" color map. FIG. 40A illustrates SiR-Tubulin-labeled microtubules seen under the gSTED. FIG. 40B illustrates an FRC map with 64-pixel block size coded with an SQUIRREL-FRC color map. FIG. 40C illustrates an rFRC map coded with the sJet color map.

Based on the 3σ-curve rather than the $1/7$ threshold, for determining the effective cut-off frequency, the rFRC is more stable and accurate for the local FRC resolution mapping. As showed in FIGS. 41A and 41B, the "64 nm" resolution determined by the $1/7$ threshold for the region pointed by the white arrow in the inset appeared over confident for such failed resolved filament, and the 3σ curve resulting "160 nm" resolution was obviously more moderate and reasonable. It should be emphasized that although the so-called $1/7$ threshold may be regarded as unstable in local resolution mapping, both the $1/7$ threshold and 3σ-curve based resolution mapping features in PANELJ FIJI/ImageJ plugin are provided for further potential applications. The reason is that the $1/7$ threshold is popular and has been used widely, hence an identical local resolution mapping is provided for broader user community.

Although the fixed-value threshold method was argued to be based on incorrect statistical assumptions, the 1/7 threshold has been widely used in the super-resolution field. Interestingly, the final resolution obtained with whatever criterion is approximately the same in the experiments of SMLM and the stimulated emission depletion microscopy (STED). The FRC curves were calculated between small image blocks to map local SR errors containing in the reconstructions. As shown in FIGS. 40C and 40D, for small-size image, the 1/7 threshold becomes over confident, i.e., smaller than all correlation values in the FRC curve, and fails to determine the cut-off frequency of the corresponding image (cross on FIG. 40C). In contrast, for a large-size image, the 1/7 threshold attained a similar result compared to the 3σ curve. It indicates that the 1/7 threshold is suitable for the determination of conventional global resolution, but it is not fit to local cut-off frequency determination (local resolution). On the other hand, instead of avoiding the conservative threshold choice such as 1/7 threshold in resolution determination described above, a moderate threshold for error mapping is intended to reduce the false positive. Therefore, the 3σ curve is used for its robustness and accuracy in the case of small size image blocks, as the threshold to calculate the FRC values in the PANEL.

TABLE 1

Parameters of geometrical structure simulations, in which for rectangle, $dimension_1$ is height and $dimension_2$ is width, for square, $dimension_1$ is the length of side, for triangle, $dimension_1$ is base and $dimension_2$ is height, for circle, $dimension_1$ is radius.

| Geometry | $Dimension_1$ | $Dimension_2$ | Number |
| --- | --- | --- | --- |
| Rectangle | 5~40 pixel | 5~40 pixel | 3~5 |
| Square | 20~50 pixel | \ | 3~5 |
| Triangle | 35~50 pixel | 50~100 pixel | 3~5 |
| Circle | 10~50 pixel | \ | 3~6 |

TABLE 2

Details on network architecture, loss function and training procedure, in which pixel SR: pixel super-resolution; paras.: parameters.

| | Sparse sampling | Pixel SR | Deconvolution | Noise2Noise |
| --- | --- | --- | --- | --- |
| Train patch size | 256 × 256 | 64 × 64 | 128 × 128 | 256 × 256 |
| No. of epochs | 300 | 200 | 500 | 100 |
| Batch size | 8 | 16 | 8 | 32 |
| No. of images | 5000 | 16637 | 4867 | 16000 |
| Learning rate | $10^{-4}$ | $10^{-4}$ | $10^{-4}$ | $10^{-4}$ |
| Topology | $Unet^1$ | $Unet^2$ | $Unet^1$ | $Unet^1$ |
| No. of paras. | $4.18 \times 10^7$ | $6.17 \times 10^6$ | $4.18 \times 10^7$ | $4.18 \times 10^7$ |
| Loss function | MAE | MSE | MSE | MAE |
| Optimizer | Adam | Adam | Adam | Adam |

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image processing, implemented on at least one machine each of which has at least one processor and at least one storage device, comprising:
   obtaining a first image and a second image associated with a same object, wherein the first image and the second image are generated by an image acquisition device;
   determining a plurality of first blocks of the first image and a plurality of second blocks of the second image, the plurality of second blocks and the plurality of first blocks being in one-to-one correspondence;
   determining a plurality of first characteristic values based on the plurality of first blocks and the plurality of second blocks; and
   generating a first target map associated with the first image and the second image based on the plurality of first characteristic values, the first target map illustrating reconstruction errors or artifacts of the first image and the second image, each of the first characteristic values corresponding to a pixel of the first target map;
   wherein:
   the determining a plurality of first blocks of the first image comprises determining the plurality of first blocks of the first image by performing a rolling operation on the first image;
   the determining a plurality of second blocks of the second image comprises determining the plurality of second blocks of the second image by performing a rolling operation on the second image; and
   the determining a plurality of first characteristic values based on the plurality of first blocks and the plurality of second blocks comprises:
   for each of the first blocks or each of the second blocks,
     determining a mean value of pixel values of pixels in a central region of the each first block or the each second block;
     comparing the mean value with a threshold; and
     in response to a determination that the mean value is larger than the threshold, determining a first characteristic value based on a first intermediate image corresponding to the each first block and a second intermediate image corresponding to the each second block: or in response to a determination that the mean value is smaller than the threshold, determining the first characteristic value based on a predetermined value.

2. The method of claim 1, wherein the rolling operation is performed by sliding a window across the first image or the second image.

3. The method of claim 2, wherein the sliding is performed by skipping a predetermined count of pixels across the first image or the second image.

4. The method of claim 1, wherein in response to the determination that the mean value is larger than the threshold, the first characteristic value is determined based on a correlation between the each first block and a corresponding second block.

5. The method of claim 4, wherein the first characteristic value is determined according to a process that includes:
   determining the first intermediate image in a frequency domain based on the first block;
   determining the second intermediate image in a frequency domain based on the second block;

determining a target frequency based on the first intermediate image and the second intermediate image; and
determining the first characteristic value based on the target frequency.

6. The method of claim 5, wherein the determining a target frequency based on the first intermediate image and the second intermediate image comprises:
determining a first relationship between a plurality of correlation values and a plurality of frequencies based on the first intermediate image and the second intermediate image;
determining a second relationship between the plurality of correlation values and the plurality of frequencies based on a predetermined function; and
determining the target frequency based on the first relationship and the second relationship, the target frequency corresponding to an intersection point of a first curve illustrating the first relationship and a second curve illustrating the second relationship.

7. The method of claim 6, wherein the determining a first relationship between a plurality of correlation values and a plurality of frequencies based on the first intermediate image and the second intermediate image comprises:
determining the plurality of correlation values, each of the correlation values corresponding to a frequency of the plurality of frequencies, the each correlation value being determined according to a process that includes:
determining, from the first intermediate image, a first ring image based on the frequency, the first ring image including pixels within a ring having a diameter equal to the frequency;
determining, from the second intermediate image, a second ring image based on the frequency, the second ring image including pixels within a ring having a diameter equal to the frequency; and
determining the each correlation value based on the first ring image and the second ring image.

8. The method of claim 1, wherein the obtaining a first image and a second image associated with a same object comprises:
obtaining an initial image; and
decomposing the initial image into the first image, the second image, a third image, and a fourth image.

9. The method of claim 8, further comprising:
determining a plurality of third blocks of the third image and a plurality of fourth blocks of the fourth image, the plurality of fourth blocks and the plurality of third blocks being in one-to-one correspondence;
determining a plurality of second characteristic values based on the plurality of third blocks and the plurality of fourth blocks;
generating a second target map associated with the third image and the fourth image based on the plurality of second characteristic values; and
generating a third target map based on the first target map and the second target map.

10. The method of claim 9, wherein the generating a third target map based on the first target map and the second target map comprises:
generating the third target map by averaging the first target map and the second target map; and
resizing the third target map to a size of the initial image.

11. The method of claim 8, further comprising:
extending the first image by performing a padding operation around the first image;
extending the second image by performing a padding operation around the second image;
extending the third image by performing a padding operation around the third image; and
extending the fourth image by performing a padding operation around the fourth image.

12. The method of claim 1, further comprising:
determining a reference map associated with the first image; and
determining a fourth target map by fusing the first target map and the reference map.

13. The method of claim 12, wherein the determining a reference map associated with the first image comprises:
obtaining a reference image with a resolution lower than the first image;
determining a convolution kernel based on the first image and the reference image;
determining an intermediate image based on the first image and the convolution kernel; and
determining the reference map based on a difference between the intermediate image and the reference image.

14. The method of claim 1, wherein the obtaining a first image and a second image associated with a same object comprises:
obtaining a first initial image and a second initial image associated with the same object;
generating the first image by processing the first initial image using a neural network; and
generating the second image by processing the second initial image using the neural network.

15. The method of claim 14, wherein the obtaining a first initial image and a second initial image associated with the same object comprises:
obtaining an initial image as the first initial image; and
generating the second initial image by adding noise to the first initial image.

16. The method of claim 14, wherein the obtaining a first initial image and a second initial image associated with the same object comprises:
obtaining an initial image;
generating the first initial image by adding a first noise to the initial image; and
generating the second initial image by adding a second noise to the initial image.

17. The method of claim 1, further comprising:
extending the first image or the second image by performing a padding operation around the first image or the second image.

18. A system for image processing, comprising:
at least one storage medium including a set of instructions; and
at least one processor in communication with the at least one storage medium, wherein when executing the set of instructions, the at least one processor is directed to cause the system to perform operations including:
obtaining a first image and a second image associated with a same object, wherein the first image and the second image are generated by an image acquisition device;
determining a plurality of first blocks of the first image and a plurality of second blocks of the second image, the plurality of second blocks and the plurality of first blocks being in one-to-one correspondence;
determining a plurality of first characteristic values based on the plurality of first blocks and the plurality of second blocks; and
generating a first target map associated with the first image and the second image based on the plurality of first characteristic values, the first target map illustrating reconstruction errors or artifacts of the first image and the second image, each of the first characteristic values corresponding to a pixel of the first target map;

wherein:

the determining a plurality of first blocks of the first image comprises determining the plurality of first blocks of the first image by performing a rolling operation on the first image;

the determining a plurality of second blocks of the second image comprises determining the plurality of second blocks of the second image by performing a rolling operation on the second image; and the determining a plurality of first characteristic values based on the plurality of first blocks and the plurality of second blocks comprises:

for each of the first blocks or each of the second blocks,
determining a mean value of pixel values of pixels in a central region of the each first block or the each second block;
comparing the mean value with a threshold; and
in response to a determination that the mean value is larger than the threshold, determining a first characteristic value based on a first intermediate image corresponding to the each first block and a second intermediate image corresponding to the each second block; or in response to a determination that the mean value is smaller than the threshold, determining the first characteristic value based on a predetermined value.

19. A non-transitory computer readable medium, comprising at least one set of instructions for image processing, wherein when executed by one or more processors of a computing device, the at least one set of instructions causes the computing device to perform a method, the method comprising:

obtaining a first image and a second image associated with a same object, wherein the first image and the second image are generated by an image acquisition device;

determining a plurality of first blocks of the first image and a plurality of second blocks of the second image, the plurality of second blocks and the plurality of first blocks being in one-to-one correspondence;

determining a plurality of first characteristic values based on the plurality of first blocks and the plurality of second blocks; and generating a first target map associated with the first image and the second image based on the plurality of first characteristic values, the first target map illustrating reconstruction errors or artifacts of the first image and the second image, each of the first characteristic values corresponding to a pixel of the first target map;

wherein:

the determining a plurality of first blocks of the first image comprises determining the plurality of first blocks of the first image by performing a rolling operation on the first image;

the determining a plurality of second blocks of the second image comprises determining the plurality of second blocks of the second image by performing a rolling operation on the second image; and the determining a plurality of first characteristic values based on the plurality of first blocks and the plurality of second blocks comprises:

for each of the first blocks or each of the second blocks,
determining a mean value of pixel values of pixels in a central region of the each first block or the each second block;
comparing the mean value with a threshold; and
in response to a determination that the mean value is larger than the threshold, determining a first characteristic value based on a first intermediate image corresponding to the each first block and a second intermediate image corresponding to the each second block; or in response to a determination that the mean value is smaller than the threshold, determining the first characteristic value based on a predetermined value.

* * * * *